United States Patent
Solovyev et al.

(10) Patent No.: US 11,936,900 B2
(45) Date of Patent: Mar. 19, 2024

(54) METHOD AND APPARATUS FOR MOTION VECTOR PREDICTION

(71) Applicant: Huawei Technologies Co., Ltd., Shenzhen (CN)

(72) Inventors: Timofey Mikhailovich Solovyev, Moscow (RU); Jianle Chen, Santa Clara, CA (US); Sergey Yurievich Ikonin, Moscow (RU)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 17/138,250

(22) Filed: Dec. 30, 2020

(65) Prior Publication Data

US 2021/0127128 A1    Apr. 29, 2021

Related U.S. Application Data

(63) Continuation of application No. PCT/US2019/040061, filed on Jul. 1, 2019.

(Continued)

(51) Int. Cl.
*H04N 19/52* (2014.01)
*H04N 19/169* (2014.01)

(52) U.S. Cl.
CPC ........... *H04N 19/52* (2014.11); *H04N 19/169* (2014.11)

(58) Field of Classification Search
None
See application file for complete search history.

(56) References Cited

U.S. PATENT DOCUMENTS

| | | |
|---|---|---|
| 2012/0320984 A1 | 12/2012 | Zhou |
| 2014/0016701 A1 | 1/2014 | Chen |

(Continued)

FOREIGN PATENT DOCUMENTS

| | | |
|---|---|---|
| CN | 104838656 A | 8/2015 |
| WO | 2019079611 A1 | 4/2019 |

OTHER PUBLICATIONS

Sjoberg, R., et al., "Description of SDR and HDR video coding technology proposal by Ericsson and Nokia," Joint Video Exploration Team (JVET) of ITU-T SG 16 WP 3 and ISO/IEC JTC 1/SC 29/WG 11, 10th Meeting: San Diego, CA, USA, Apr. 10-20, 2018, JVET-J0012-v1, 32 pages.

(Continued)

*Primary Examiner* — Lindsay J Uhl
(74) *Attorney, Agent, or Firm* — Conley Rose, P.C.

(57) ABSTRACT

Motion vectors (MVs) are used as predictors for prediction of an image for a current coding unit (CU) within a current video frame. The MVs are from a list of motion vector candidates (MVCs), which is generated. The list includes MVs determined from a first or second pattern, each pattern specifying MVC positions. The first MV positions are within a current video frame, while the second MV positions are for a video frame different from the current frame. The MVC list is generated for a current CU with the MV positions being relative to a position of the current CU. In particular, the MVC list is generated in dependence on a size of the current CU and a size of a grid specifying a minimum distance between two MV positions. One or more MVs as specified by the MV positions of said pattern are included into the MVC list.

20 Claims, 46 Drawing Sheets

Related U.S. Application Data

(60) Provisional application No. 62/693,345, filed on Jul. 2, 2018.

(56) References Cited

U.S. PATENT DOCUMENTS

| | | | |
|---|---|---|---|
| 2015/0163506 A1* | 6/2015 | Chon | H04N 19/513 |
| | | | 375/240.16 |
| 2016/0227218 A1 | 8/2016 | Trudeau et al. | |
| 2016/0323573 A1* | 11/2016 | Ikai | H04N 19/70 |
| 2017/0127041 A1 | 5/2017 | Bang et al. | |
| 2017/0310961 A1 | 10/2017 | Liu et al. | |
| 2018/0070100 A1 | 3/2018 | Chen et al. | |
| 2018/0098070 A1 | 4/2018 | Chuang et al. | |
| 2018/0227593 A1* | 8/2018 | Chen | H04N 19/176 |
| 2019/0246101 A1* | 8/2019 | Jin | H04N 19/176 |
| 2019/0246118 A1* | 8/2019 | Ye | H04N 19/176 |

OTHER PUBLICATIONS

Chen, Y., et al., "Description of SDR, HDR and 360 video coding technology proposal by Qualcomm and Technicolor low and high complexity versions," Joint Video Exploration Team (JVET) of ITU-T SG 16 WP 3 and ISO/IEC JTC 1/SC 29/WG 11, 10th Meeting: San Diego, US, Apr. 10-20, 2018, JVET-J0021, 43 pages.

Li, X., et al., "Description of SDR video coding technology proposal by Tencent," Joint Video Experts Team (JVET) of ITU-T SG 16 WP 3 and ISO/IEC JTC 1/SC 29/WG 11, 10th Meeting: San Diego, US, Apr. 10-20, 2018, JVET-J0029-v1, 34 pages.

Ye, J., et al. "Merge mode modification on top of Tencent's software in response to CfP," Joint Video Experts Team (JVET) of ITU-T SG 16 WP 3 and ISO/IEC JTC 1/SC 29/WG 11, 10th Meeting: San Diego, US, Apr. 10-20, 2018, JVET-J0058-v1, 4 pages.

An, J., et al., "Enhanced Merge Mode based on JEM7.0," Joint Video Experts Team (JVET) of ITU-T SG 16 WP 3 and ISO/IEC JTC 1/SC 29/WG 11, 10th Meeting: San Diego, US, Apr. 10-20, 2018, JVET-J0059-v1, 14 pages.

ITU-T H.264, "Series H: Audiovisual and Multimedia Systems, Infrastructure of audiovisual services Coding of moving video, Advanced video coding for generic audiovisual services," Apr. 2017, 812 pages.

ITU-T H.265, "Series H: Audiovisual and Multimedia Systems, Infrastructure of audiovisual services Coding of moving video, High efficiency video coding," Feb. 2018, 692 pages.

U.S. Appl. No. 62/679,009, filed May 31, 2018, 19 pages.

\* cited by examiner

METHOD AND APPARATUS FOR MOTION VECTOR PREDICTION

CROSS-REFERENCE TO RELATED APPLICATIONS

This application is a continuation application of International Patent Application No. PCT/CN2019/040061, filed on Jul. 1, 2019, which claims priority to U.S. Provisional Patent Application No. 62/693,345, filed on Jul. 2, 2018. The disclosures of the aforementioned applications are hereby incorporated by reference in their entireties.

TECHNICAL FIELD

The present disclosure relates to encoding and encoding of video images, in particular to motion prediction.

BACKGROUND

Digital video communication and storage applications are implemented by a wide range of digital devices, e.g. digital cameras, cellular radio telephones, laptops, broadcasting systems, video teleconferencing systems, etc. One of the most important and challenging tasks of these applications is video compression. The task of video compression is complex and is constrained by two contradicting parameters compression efficiency and computational complexity. Video coding standards, such as International Telecommunications Union (ITU)-T H.264/Advanced Video Coding (AVC) or ITU-T H.265/High-Efficiency Video Coding (HEVC), provide a good tradeoff between these parameters. For that reason, the support of video coding standards is a mandatory requirement for almost any video compression application.

Video compression techniques, such as inter prediction, intra prediction, and loop filters, have demonstrated to be effective and thus adopted into various video coding standards, such as H.264/AVC and H.265/HEVC.

A basic processing unit of video compression is usually called a macroblock, which is a part of a picture having size of e.g. 16×16 or 64×64 pixels. In the latest video coding standard H.265/HEVC, a so-called Coding Tree Unit (CTU) is used as a basic processing unit. The CTU is also referred to as a largest coding unit (LCU). In H.265/HEVC, CTUs are processed one by one in a scan order from the top-left to bottom-right corner of the picture. Each CTU may be further divided into smaller coding units (CU) by using e.g. a quad-tree (QT) split. A CU comprises information related to inter and intra prediction information as well as residuals.

An important part of inter prediction, e.g. in H.265/HEVC standard, is motion vector (MV) coding. MVs are usually predictively coded e.g. the by following two schemes.

A MV is constructed from a MV predictor (MVP) and a difference between MV obtained by motion estimation (ME) process and the predictor. This MV coding method in HEVC standard is called advanced MV prediction.

An MV is derived by selection from a configurable set of candidates (predictors), without encoding an MV difference. This approach is called merge mode.

For both techniques, a large set of potential prediction candidates constructed from already encoded MVs can be accounted. In HEVC standard, there are four groups of MVPs spatial, temporal, combined bi-predictive, and zero candidates. During the encoding process, the best MVP is selected from an amount of candidates and its index in candidates list is written to a bitstream. An example of locations for spatial MVP candidates (for merge mode) in the HEVC standard is shown in FIG. 6.

In the given example, MVP candidates are denoted as A0, A1, B0, B1, and B2, respectively. The locations Ai indicate the predictors to the left, the locations Bj indicate the predictors at the top of the current block. Herein, the current block is also referred to as the current CU. It should be noted that, in the general case, the candidate locations may depend on a blocks coding order. Depending on the coding order, candidates may be selected from the top, left, right, and bottom of adjacent blocks, i.e. blocks adjacent to the current block. All of the spatial MVP candidates (for merge mode and for advanced MV prediction) in HEVC standard belong to the adjacent neighboring blocks. This means that they share a border with the current block.

In the given example, MVP candidates are denoted as A0, A1, B0, B1, and B2, respectively. The locations Ai indicate the predictors to the left, the locations Bj indicate the predictors at the top of the current block. Herein, the current block is also referred to as the current CU. It should be noted that, in the general case, the candidate locations may depend on a blocks coding order. Depending on the coding order, candidates may be selected from the top, left, right, and bottom of adjacent blocks, i.e. blocks adjacent to the current block. All of the spatial MVP candidates (for merge mode and for advanced MV prediction) in HEVC standard belong to the adjacent neighboring blocks. This means that they share a border with the current block.

SUMMARY

Embodiments of the disclosure are defined by the features of the independent claims, and further advantageous implementations of the embodiments by the features of the dependent claims.

The present disclosure provides an apparatus and methods for (1) generating a list of MV candidates (MVCs) from MVs of a first pattern (long-distance MVP (LDMVP) candidates) and/or from MVs of a second pattern (temporal MVP (TMVP) candidates), (2) adding adjacent MVCs to the LDMVP candidates, (3) generating a pattern (i.e. the first and/or second pattern) relative to a position of the current CU in dependence on the size of the current CU and the grid size. Throughout the present disclosure, the term "LDMVP/TMVP positions", "first/second pattern positions", "LDMVP/TMVP pattern positions", "positions of a first/second pattern", and/or "positions of a LDMVP/TMVP pattern" are used synonymously.

According to an aspect of the present disclosure, an apparatus is provided for generating a list of MVCs, for a current CU, wherein the apparatus comprises a processing circuitry configured to include into the list of MVCs one or more MVs, determined from a first pattern specifying MV positions within a current video frame in which the current CU is located, and one or more MVs determined from a second pattern specifying MV positions in a video frame different from the current video frame.

The MVCs are used for the motion prediction for the current CU. This means that the motion information of MVs are used at the respective candidate positions for the prediction. Thus, the MV positions are positions of the corresponding vector candidate block. The block may be one pixel/sample and/or a plurality of samples corresponding to a block of samples.

In other words, a position of a MV is the location within video frame specifying one or more pixels to which the motion is assigned.

The MV positions from the first pattern are for the current video frame. This means that the first pattern has candidate positions for which motion information is available and/or is stored in a buffer. A pattern being a first pattern is referred to as a LDMVP pattern. Such a pattern has MV positions generated to capture the spatial aspect of motion information around a current CU within the current frame available at the moment of encoding/decoding.

The MV positions from the second pattern are for a video frame different from the current frame. For example, the different frame may be a frame previous (with respect to a scanning order or and encoding/decoding order) to the current frame. This means that the second pattern has candidate positions for which motion information is available and/or is stored in a buffer for those picture regions for which motion information does not exists in the current frame at the moment of encoding/decoding of the current video frame. For example, in case of an encoding/decoding order starting from the top-left to the bottom-right of a current video frame, said picture region may be the bottom-right part of the picture. A pattern being a second pattern is referred to as a TMVP pattern. Such a pattern has MV positions generated to capture the temporal aspect of motion information around a current CU within a frame different from the current frame.

Including MVC positions into the MVC list from the first pattern and the second pattern may provide an advantage of accounting for both spatial and temporal characteristics of motion information. Moreover, the use of a TMVP pattern as a second pattern may provide an advantage of obtaining motion information from those regions from a previous video frame, which is not available in said region(s) in the current frame as a result of a scanning order of encoding/decoding.

Moreover, since the first and second pattern are intended to have motion information from different picture regions, i.e. regions of available and non-available MV information, the motion prediction may be more accurate, since motion information is used both of the current frame and a prior video frame.

The MV positions of the first pattern may be with reference to a position of the current CU. The current CU position may be the top-left corner, with the positions being in units of pixels or a pixel block unit. The block unit may, for example, be a 2×2 pixel block or any other unit. In particular, in Versatile Video Coding (VVC), a 4×4 grid is used for storing motion information. In this case block unit is 4×4 pixel block.

The MV positions of the second pattern may have the same reference position as the first MV pattern positions. Alternatively, the reference positions of the TMVP pattern may be determined according to some MV position from one of the blocks neighboring the current CU.

In particular, the use of MV positions of a pattern, including the first and/or second pattern, provides an advantageous effect that only a sparse number of MV positions are used from which possible motion information is obtained and/or acquired. Thus, the use of a pattern limits number of MV position candidates, so that less read-write operations are required when accessing motion information. Thus, the sparsity of MVC positions as reflected by the pattern makes the prediction more efficient and faster.

The pattern may be any pattern suitable for determining motion information based on the MVs at the pattern positions. In other words, the pattern may be adjusted, for example, in terms of its size and/or extension within a video frame relative to the current CU and may be chosen or designed so as to have a particular structure and/or shape.

For example, patterns corresponding to LDMVP patterns may be determined or generated such that the pattern positions have a "square", "diagonal", "triangle", or "star" structure, as shown by the pattern examples of FIGS. 7 to 10. FIG. 7 shows a square LDMVP pattern 700, FIG. 8 shows a diagonal LDMVP pattern 800, FIG. 9 shows a triangle LDMVP pattern 900, and FIG. 10 shows a star LDMVP pattern 1000. Another such pattern that is particularly suitable for motion information from the top of the CU is the "sun" pattern shown in FIG. 18 that shows combined LDMVP+TMVP pattern 1800 for R=3 and Rt=1. The first pattern is not limited to the ones shown in FIG. 7 to 10 or 18, and may have any other shape/structure suitable for restricting motion information obtained at positions based on the pattern.

Thus, using a pattern, including a pattern combined of the first and/or the second pattern, may provide an advantage of making the prediction more flexible so as to use only motion information from positions restricted by the pattern positions. This may include pattern positions that may be adjacent to the CU and/or adjusted MV positions of the first pattern.

According to an aspect of the present disclosure, the processing circuitry of the apparatus is configured to include into the list of MVCs one or more MVs determined from positions adjacent to the current CU within the current video frame, different from the MV positions of the first pattern.

This means that the MVC list is extended by adjacent points providing motion information and thus contribute to the motion prediction. This may provide an advantage of making the motion prediction more accurate, because the locations of the adjacent points around the current CU for a current frame may be generated at distinction positions that may otherwise not be covered by the first pattern positions.

For example, adjacent points may be generated and included into the MVC list at positions near one or more of the edges of the current CU, as shown in FIG. 27 (which shows LDMVP pattern amended by adding six adjacent candidate points 2700) and FIG. 28 (which shows LDMVP pattern amended by adding four adjacent candidate points 2800). In this case, adjacent points are located at the left and top edge of the current CU, which are particular suitable for encoding/decoding of the current video frame.

Thus, including adjacent points into the MVC list allows for a spatial fine-tuning of the MVC list, which may improve the accuracy of thee motion prediction.

According to an aspect of the present disclosure the processing circuitry is configured to determine the first pattern including determining new MV positions for one or more MV positions of the first pattern not available and/or not stored in a buffer so as to be available and/or stored in the buffer.

This means that some positions of the first pattern may lie outside of a current video frame, i.e. the position is larger than the size of the current frame. Thus, motion information for that point does not exists. This may result also in restricting the size/extension of the pattern when the pattern is generated.

Motion information may also not be available at said position of the first pattern as a result of an encoding/decoding order performed for the CUs of the current video frame. In other words, motion information at the bottom right region of a CTU does not yet exist at a specific time as this frame region is subject to encoding/decoding at a later time. Thus, even if a position in that region is generated (i.e. is part of the first pattern), motion information is not present for that point at that time.

Moreover, motion information may also not be stored in a memory (i.e. the buffer) as that the respective information may be accessed. Such a buffer may, for example, be a line buffer which has fast read-write access times and is commonly used to store motion information of restricted regions of CTUs neighboring the current CTU for which the motion prediction is performed. Line buffers store data which are fast read and/or written for the entire buffer line in parallel.

The positions of the first pattern not entailing and/or storing motion information are discarded, but otherwise used as basis for determining new MV positions such that the new MV positions have motion information available and/or stored in the buffer.

This may provide an advantage that the new MV positions provide motion information and entail still a spatial information of the original first pattern, since the new MV positions are determined according to the discarded MV positions.

Moreover, discarding positions from the first pattern may provide an advantage of avoiding an increase of the size of the first pattern by not suitable MV positions. This reduces the storage of the first pattern.

According to an aspect of the present disclosure, the determining of the new MV positions includes assigning x positions and/or y positions of the one or more MV positions to the new MV positions and discarding the one or more MV positions from the first pattern.

Thus, the positional assigning of the discarded positions to a new MV position may be performed with respect to any of the x and/or y position components of the discarded MV positions. In other words, the position assignment may be performed in any direction.

This may provide an advantage of performing the position assignment in a very flexible manner, allowing for a fine-tuning of MVC positions of the first pattern. As a result, the prediction accuracy may be improved further due to the spatial fine-tuning of MVC positions.

Moreover, the discarding of the non-available motion information MV positions of the first pattern may provide an advantage of removing MV positions from the first pattern that are not suitable for motion prediction and/or MV prediction, since they do not have motion information available and/or is not stored in a buffer.

According to an aspect of the present disclosure, the determining includes assigning to one or more of the new MV positions having same x position or same y position new y positions or new x positions, using a predetermined prescription.

The prescription may be a function. This means that, for example, the assigned new y and/or x positions may be calculated using said function with the assigned position as input.

According to an aspect of the present disclosure, the predetermined prescription is shifting the assigned y positions or x positions of the new MV positions by a predetermined offset value.

The offset value may be a number of pixels so as to shift the y and/or x position (e.g. in pixel units) by the pixel offset by adding and/or subtracting the offset value to the adjusted y and/or x position value. Alternatively, the predetermined prescription may be a factor by which the y and/or x position may be multiplied and/or divided. Other prescriptions are possible for achieving the reassignment of the assigned positions when their x and/or y position is the same.

Thus, the reassignment of positions performed, for example, by shifting any of the x or y components of assigned positions results in a spread of those assigned positions that may have the same x and/or y position. In other words, some of the discarded positions may be located at the same position after the position assignment. The component-wise reassignment of the assigned positions having the same x or y position is spreading these positions to different locations, which are still available and/or stored in a buffer.

This may provide an advantage that position redundancy is avoided as some candidate positions may be located at the same position and thus would provide the same motion information. Spreading of assigned positions thus increases the number of candidate positions that may have different motion information as they are at different positions. Thus, the prediction is performed more accurately with a sufficiently larger number of MVC positions.

According to an aspect of the present disclosure, the determining of the second pattern includes reflecting one or more of the MV positions of the first pattern with reference to a reflection line.

The reflection line refers to a line passing through two (pixel) positions of a current video frame, with said line dissecting a frame (e.g. the current frame) into two regions of available motion information (in scanning order or encoding/decoding order) and non-available motion information. This means that, for example, according to common encoding/decoding order the top-left part of the picture/frame entail available motion information, while the bottom-right picture art has no available motion information.

Determining the second pattern by mirroring one or more MV positions of the first pattern may provide an advantage of low complexity in generating the second pattern.

According to an aspect of the present disclosure, the processing circuitry is configured to generate a pattern relative to a position of the current CU in dependence on a size of the current CU, a size of a grid specifying a minimum distance between two MV positions belonging to the pattern, wherein the pattern specifies positions of MVs, and said pattern is the first pattern and/or the second pattern.

The size of a current CU may be the width or height of the CU. The grid size may be the minim distance between MV positions of a pattern, i.e. the first or second pattern, along the x or y axis given in terms of the respective grid spacing Gx and Gy.

According to an aspect of the present disclosure, the processing circuitry is configured to determine the second pattern and/or the first pattern in dependence on at least one of an iteration value specifying a size of the second pattern and/or the first pattern on the grid, a minimal size configurable for a CU, and a maximal size configurable for a CU.

Generating a pattern, including the first and/or second pattern, in dependence on CU size, grid parameters, and/or iteration value may provide an advantage of generating a pattern of any size and/or shape for a current CU within the current frame (first pattern) and/or for a previous frame (second pattern) in a flexible manner. In other words, a pattern may be tuned so as to be optimal for motion prediction. This means that, for example, the size and/or shape of the first pattern may be optimized for the spatial motion characteristics of the current frame (LDMVP pattern), while the size and/or shape of the second pattern may be optimized for the temporal characteristics of the previous frame (TMVP pattern).

According to an aspect of the present disclosure, an apparatus is provided for generating a list of MVCs, for a current CU, the apparatus comprising a processing circuitry configured to determine a pattern specifying positions of MVs, relative to a position of the current CU at least in dependence on a size of the current CU, and a size of a grid specifying a minimum distance between two MV positions belonging to said pattern, and include into the list of MVCs one or more MVs specified by the MV positions of said pattern.

According to an aspect of the present disclosure, the processing circuitry is configured to determine the pattern positions in dependence on a first iteration value and/or a minimal or maximal size configurable for a CU.

The first iteration value (or iteration value in general) determines the size of a pattern. The size of a pattern means the extent of the pattern positions in terms of their largest distance relative to the current CU position. In the present disclosure, the current CU position taken as the reference position is the top-left position of the current CU.

The distance may be defined in units of pixels. The distance may be calculated using a metric, such as a Euclidian metric or any other metric suitable for distance. The size of a pattern may be also determined by the grid size. The grid size refers to a minimal distance between MV positions belonging to a pattern.

The determined pattern may be a spatial pattern (i.e. LDMVP pattern) and/or a temporal pattern (i.e. TMVP pattern). A pattern defines one or more positions of MVCs around a current CU and entails a limited number of candidate positions, so that a pattern may be sparse.

As result of the sparsity of the pattern, using a pattern to include therefrom based on the pattern candidate positions one or more MVs into the MVC list may provide an advantage that less read-write operations may be required when accessing motion information. Thus, the sparsity of MVC positions as reflected by the pattern makes the prediction more efficient and faster.

According to an aspect of the present disclosure, the processing circuitry is configured to adapt the grid size in dependence on the size of the current CU and/or a minimum and maximum value of the grid size.

Generating a pattern, including a first and/or a second pattern, in dependence on CU size, grid parameters, and/or (first) iteration value, may provide an advantage of generating a pattern of any size and/or shape for a current CU in a flexible manner. In other words, a pattern may be tuned so as to be optimal for motion prediction. This means that, for example, the size and/or shape of the first pattern may be optimized for the spatial motion characteristics of the current frame (LDMVP pattern), while the size and/or shape of the second pattern may be optimized for the temporal characteristics of the previous frame (TMVP pattern).

According to an aspect of the present disclosure, the processing circuitry is configured to determine adjacent positions specifying MV positions within the current video frame different from the first pattern and to combine the adjacent points with the first pattern.

The determining of adjacent MV positions different from the first pattern and combining them with the first pattern may provide an advantage of a spatial fine-tuning of the first pattern and thus improving the accuracy of the motion prediction. This is because the locations of adjacent points may be chosen specifically, for example, in those regions around the current CU particularly suitable for motion prediction, but are not covered by the first pattern. Examples of such adjacent points are shown in FIGS. 27 and 28, with said points located at the left and top edge of the current CU.

Once the MVC positions are determined using any of the above embodiments of the present disclosure, it is checked whether the MVs for these candidate positions are already included in the MVC list. If not, then the MV is included into the list.

According to an aspect of the present disclosure, an encoder is provided for encoding a current CU, of a current video frame comprising the apparatus for generating a list of MVCs, according to any of the above aspects of the present disclosure, an inter-prediction unit (PU) for determining prediction of the current CU according to at least one MV, out of the MVC list, and a compression unit for encoding the current CU by using the prediction of the CU.

According to an aspect of the present disclosure, a decoder is provided for decoding a current CU, of a video frame comprising the apparatus for generating a list of MVCs, according to any of the above aspects of the present disclosure, an inter-PU for determining prediction of the current CU according to at least one MV, out of the MVC list, and a decompression unit for decoding the current CU by using the prediction of the CU.

The MVCs may be used for motion prediction utilizing motion information from the MVs obtained at the MVC positions. The current CU may be encoded and/or decoded by calculating a difference between the CU and the prediction. Alternatively or in addition, an index to the list of MVCs may be encoded, e.g. even if there is no residual since the prediction is already close to the CU, i.e. the residual is nearly zero. In principle, the index to the list may be also determined implicitly at the encoder and the decoder side.

According to an aspect of the present disclosure, a method is provided for generating a list of MVCs, for a current CU, comprising the steps of including into the list of MVCs one or more MVs, determined from a first pattern specifying MV positions within a current video frame in which the current CU is located, one or more MVs determined from a second pattern specifying MV positions in a video frame different from the current video frame.

According to an aspect of the present disclosure, a method is provided for generating a list of MVCs, for a current CU, comprising the steps of determining a pattern specifying positions of MVs, relative to a position of the current CU at least in dependence on a size of the current CU, and a size of a grid specifying a minimum distance between two MV positions belonging to said pattern, and including into the list one or more of the MVs specified by the MV positions of said pattern.

According to an aspect of the present disclosure a computer-readable non-transitory medium is provided for storing a program, including instructions which when executed on a processor cause the processor to perform the method steps according to any of the previous methods.

Details of one or more embodiments are set forth in the accompanying drawings and the description below. Other features, objects, and advantages will be apparent from the description, drawings, and claims.

BRIEF DESCRIPTION OF THE DRAWINGS

In the following embodiments of the disclosure are described in more detail with reference to the attached figures and drawings below.

Figure 1A:
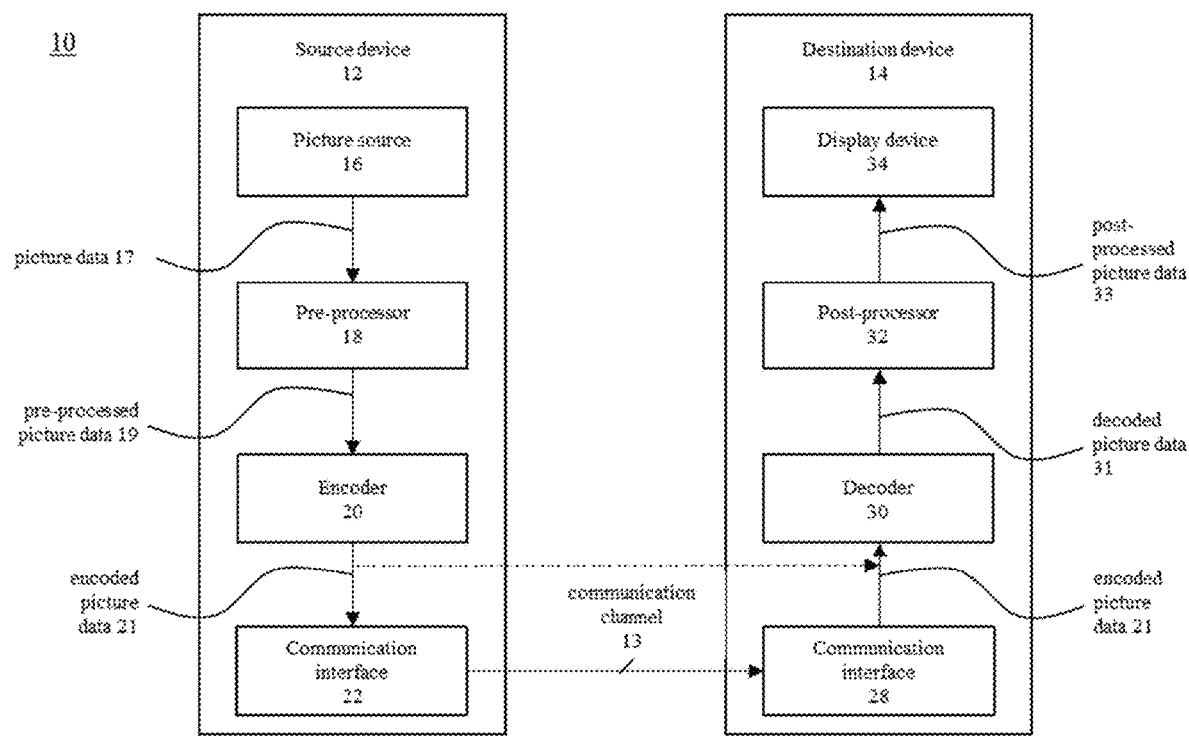
FIG. 1A is a block diagram showing an example of a video coding system configured to implement embodiments of the disclosure.

In the following identical reference signs refer to identical or at least functionally equivalent features if not explicitly specified otherwise.

DETAILED DESCRIPTION

In the following description, reference is made to the accompanying figures, which form part of the disclosure, and which show, by way of illustration, specific aspects of embodiments of the disclosure or specific aspects in which embodiments of the present disclosure may be used. It is understood that embodiments of the disclosure may be used in other aspects and comprise structural or logical changes not depicted in the figures. The following detailed description, therefore, is not to be taken in a limiting sense, and the scope of the present disclosure is defined by the appended claims.

For instance, it is understood that a disclosure in connection with a described method may also hold true for a corresponding device or system configured to perform the method and vice versa. For example, if one or a plurality of specific method steps are described, a corresponding device may include one or a plurality of units, e.g. functional units, to perform the described one or plurality of method steps (e.g. one unit performing the one or plurality of steps, or a plurality of units each performing one or more of the plurality of steps), even if such one or more units are not explicitly described or illustrated in the figures. On the other hand, for example, if a specific apparatus is described based on one or a plurality of units, e.g. functional units, a corresponding method may include one step to perform the functionality of the one or plurality of units (e.g. one step performing the functionality of the one or plurality of units, or a plurality of steps each performing the functionality of one or more of the plurality of units), even if such one or plurality of steps are not explicitly described or illustrated in the figures. Further, it is understood that the features of the various exemplary embodiments and/or aspects described herein may be combined with each other, unless specifically noted otherwise.

Video coding typically refers to the processing of a sequence of pictures, which form the video or video sequence. Instead of the term "picture" the term "frame" or "image" may be used as synonyms in the field of video coding. Video coding (or coding in general) comprises two parts video encoding and video decoding. Video encoding is performed at the source side, typically comprising processing (e.g. by compression) the original video pictures to reduce the amount of data required for representing the video pictures (for more efficient storage and/or transmission). Video decoding is performed at the destination side and typically comprises the inverse processing compared to the encoder to reconstruct the video pictures. Embodiments referring to "coding" of video pictures (or pictures in general) shall be understood to relate to "encoding" or "decoding" of video pictures or respective video sequences. The combination of the encoding part and the decoding part is also referred to as coding and decoding using a coder-decoder (CODEC).

In case of lossless video coding, the original video pictures can be reconstructed, i.e. the reconstructed video pictures have the same quality as the original video pictures (assuming no transmission loss or other data loss during storage or transmission). In case of lossy video coding, further compression, e.g. by quantization, is performed, to reduce the amount of data representing the video pictures, which cannot be completely reconstructed at the decoder, i.e. the quality of the reconstructed video pictures is lower or worse compared to the quality of the original video pictures.

Several video coding standards belong to the group of "lossy hybrid video codecs" (i.e. combine spatial and temporal prediction in the sample domain and two-dimensional (2D) transform coding for applying quantization in the transform domain). Each picture of a video sequence is typically partitioned into a set of non-overlapping blocks and the coding is typically performed on a block level. In other words, at the encoder the video is typically processed, i.e. encoded, on a block (video block) level, e.g. by using spatial (intra picture) prediction and/or temporal (inter picture) prediction to generate a prediction block, subtracting the prediction block from the current block (block currently processed/to be processed) to obtain a residual block, transforming the residual block and quantizing the residual block in the transform domain to reduce the amount of data to be transmitted (compression), whereas at the decoder the inverse processing compared to the encoder is applied to the encoded or compressed block to reconstruct the current block for representation. Furthermore, the encoder duplicates the decoder processing loop such that both will generate identical predictions (e.g. intra- and inter predictions) and/or re-constructions for processing, i.e. coding, the subsequent blocks.

In the following embodiments of a video coding system 10, a video encoder 20 and a video decoder 30 are described based on FIGS. 1 to 3.

FIG. 1A is a schematic block diagram illustrating an example coding system 10, e.g. a video coding system 10 (or short coding system 10) that may utilize techniques of this present application. Video encoder 20 (or short encoder 20) and video decoder 30 (or short decoder 30) of video coding system 10 represent examples of devices that may be configured to perform techniques in accordance with various examples described in the present application.

As shown in FIG. 1A, the coding system 10 comprises a source device 12 configured to provide encoded picture data 21 e.g. to a destination device 14 for decoding the encoded picture data 13.

The source device 12 comprises an encoder 20, and may additionally, i.e. optionally, comprise a picture source 16, a pre-processor (or pre-processing unit) 18, e.g. a picture pre-processor 18, and a communication interface or communication unit 22.

The picture source 16 may comprise or be any kind of picture capturing device, for example a camera for capturing a real-world picture, and/or any kind of a picture generating device, for example a computer-graphics processor for generating a computer animated picture, or any kind of other device for obtaining and/or providing a real-world picture, a computer generated picture (e.g. a screen content, a virtual reality (VR) picture) and/or any combination thereof (e.g. an augmented reality (AR) picture). The picture source may be any kind of memory or storage storing any of the aforementioned pictures.

In distinction to the pre-processor 18 and the processing performed by the pre-processing unit 18, the picture or picture data 17 may also be referred to as raw picture or raw picture data 17.

Pre-processor 18 is configured to receive the (raw) picture data 17 and to perform pre-processing on the picture data 17 to obtain a pre-processed picture 19 or pre-processed picture data 19. Pre-processing performed by the pre-processor 18 may, e.g., comprise trimming, color format conversion (e.g. from red, green, blue (RGB) to YCbCr), color correction, or de-noising. It can be understood that the pre-processing unit 18 may be optional component.

The video encoder 20 is configured to receive the pre-processed picture data 19 and provide encoded picture data 21 (further details will be described below, e.g., based on FIG. 2).

Communication interface 22 of the source device 12 may be configured to receive the encoded picture data 21 and to transmit the encoded picture data 21 (or any further processed version thereof) over communication channel 13 to another device, e.g. the destination device 14 or any other device, for storage or direct reconstruction.

The destination device 14 comprises a decoder 30 (e.g. a video decoder 30), and may additionally, i.e. optionally, comprise a communication interface or communication unit 28, a post-processor 32 (or post-processing unit 32) and a display device 34.

The communication interface 28 of the destination device 14 is configured receive the encoded picture data 21 (or any further processed version thereof), e.g. directly from the source device 12 or from any other source, e.g. a storage device, e.g. an encoded picture data storage device, and provide the encoded picture data 21 to the decoder 30.

The communication interface 22 and the communication interface 28 may be configured to transmit or receive the encoded picture data 21 or encoded data 13 via a direct communication link between the source device 12 and the destination device 14, e.g. a direct wired or wireless connection, or via any kind of network, e.g. a wired or wireless network or any combination thereof, or any kind of private and public network, or any kind of combination thereof.

The communication interface 22 may be, e.g., configured to package the encoded picture data 21 into an appropriate format, e.g. packets, and/or process the encoded picture data using any kind of transmission encoding or processing for transmission over a communication link or communication network.

The communication interface 28, forming the counterpart of the communication interface 22, may be, e.g., configured to receive the transmitted data and process the transmission data using any kind of corresponding transmission decoding or processing and/or de-packaging to obtain the encoded picture data 21.

Both, communication interface 22 and communication interface 28 may be configured as unidirectional communication interfaces as indicated by the arrow for the communication channel 13 in FIG. 1A pointing from the source device 12 to the destination device 14, or bi-directional communication interfaces, and may be configured, e.g. to send and receive messages, e.g. to set up a connection, to acknowledge and exchange any other information related to the communication link and/or data transmission, e.g. encoded picture data transmission.

The decoder 30 is configured to receive the encoded picture data 21 and provide decoded picture data 31 or a decoded picture 31 (further details will be described below, e.g., based on FIG. 3 or FIG. 5).

The post-processor 32 of destination device 14 is configured to post-process the decoded picture data 31 (also called reconstructed picture data), e.g. the decoded picture 31, to obtain post-processed picture data 33, e.g. a post-processed picture 33. The post-processing performed by the post-processing unit 32 may comprise, e.g. color format conversion (e.g. from YCbCr to RGB), color correction, trimming, or re-sampling, or any other processing, e.g. for preparing the decoded picture data 31 for display, e.g. by display device 34.

The display device 34 of the destination device 14 is configured to receive the post-processed picture data 33 for displaying the picture, e.g. to a user or viewer. The display device 34 may be or comprise any kind of display for representing the reconstructed picture, e.g. an integrated or external display or monitor. The displays may, e.g. comprise liquid-crystal displays (LCD), organic light-emitting diodes (OLED) displays, plasma displays, projectors, micro light-emitting diode (LED) displays, liquid crystal on silicon (LCoS), digital light processor (DLP) or any kind of other display.

Although FIG. 1A depicts the source device 12 and the destination device 14 as separate devices, embodiments of devices may also comprise both or both functionalities, the source device 12 or corresponding functionality and the destination device 14 or corresponding functionality. In such embodiments the source device 12 or corresponding functionality and the destination device 14 or corresponding functionality may be implemented using the same hardware and/or software or by separate hardware and/or software or any combination thereof.

As will be apparent for the skilled person based on the description, the existence and (exact) split of functionalities of the different units or functionalities within the source device 12 and/or destination device 14 as shown in FIG. 1A may vary depending on the actual device and application.

Figure 1B:
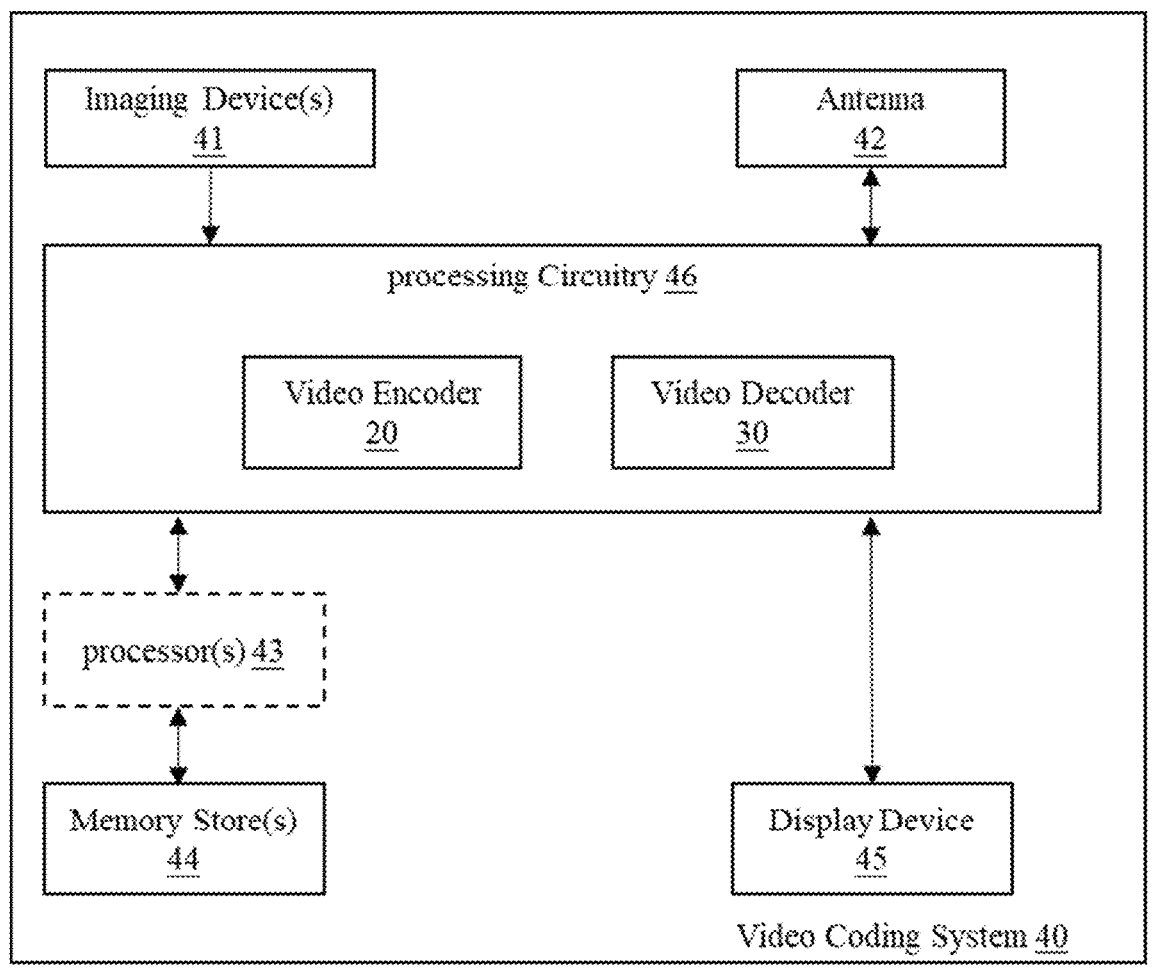
FIG. 1B is a block diagram showing another example of a video coding system configured to implement embodiments of the disclosure.

The encoder 20 (e.g. a video encoder 20) or the decoder 30 (e.g. a video decoder 30) or both encoder 20 and decoder 30 may be implemented via processing circuitry as shown in FIG. 1B, such as one or more microprocessors, digital signal processors (DSPs), application-specific integrated circuits (ASICs), field-programmable gate arrays (FPGAs), discrete logic, hardware, video coding dedicated or any combinations thereof. The encoder 20 may be implemented via processing circuitry 46 to embody the various modules as discussed with respect to encoder 20 of FIG. 2 and/or any other encoder system or subsystem described herein. The decoder 30 may be implemented via processing circuitry 46 to embody the various modules as discussed with respect to decoder 30 of FIG. 3 and/or any other decoder system or subsystem described herein. The processing circuitry may be configured to perform the various operations as discussed later. As shown in FIG. 5, if the techniques are implemented partially in software, a device may store instructions for the software in a suitable, non-transitory computer-readable storage medium and may execute the instructions in hardware using one or more processors to perform the techniques of this disclosure. Either of video encoder 20 and video decoder 30 may be integrated as part of a combined CODEC in a single device, for example, as shown in FIG. 1B.

Source device 12 and destination device 14 may comprise any of a wide range of devices, including any kind of handheld or stationary devices, e.g. notebook or laptop computers, mobile phones, smart phones, tablets or tablet computers, cameras, desktop computers, set-top boxes, televisions, display devices, digital media players, video gaming consoles, video streaming devices (such as content services servers or content delivery servers), broadcast receiver device, broadcast transmitter device, or the like and may use no or any kind of operating system. In some cases, the source device 12 and the destination device 14 may be equipped for wireless communication. Thus, the source device 12 and the destination device 14 may be wireless communication devices.

In some cases, video coding system 10 illustrated in FIG. 1A is merely an example and the techniques of the present application may apply to video coding settings (e.g., video encoding or video decoding) that do not necessarily include any data communication between the encoding and decoding devices. In other examples, data is retrieved from a local memory, streamed over a network, or the like. A video encoding device may encode and store data to memory, and/or a video decoding device may retrieve and decode data from memory. In some examples, the encoding and decoding is performed by devices that do not communicate with one another, but simply encode data to memory and/or retrieve and decode data from memory.

For convenience of description, embodiments of the disclosure are described herein, for example, by reference to HEVC or to the reference software of VVC, the next generation video coding standard developed by the Joint Collaboration Team on Video Coding (JCT-VC) of ITU-T Video Coding Experts Group (VCEG) and International Organization for Standardization (ISO)/International Electrotechnical Commission (IEC) Motion Picture Experts Group (MPEG). One of ordinary skill in the art will understand that embodiments of the disclosure are not limited to HEVC or VVC.

Encoder and Encoding Method.

Figure 2:
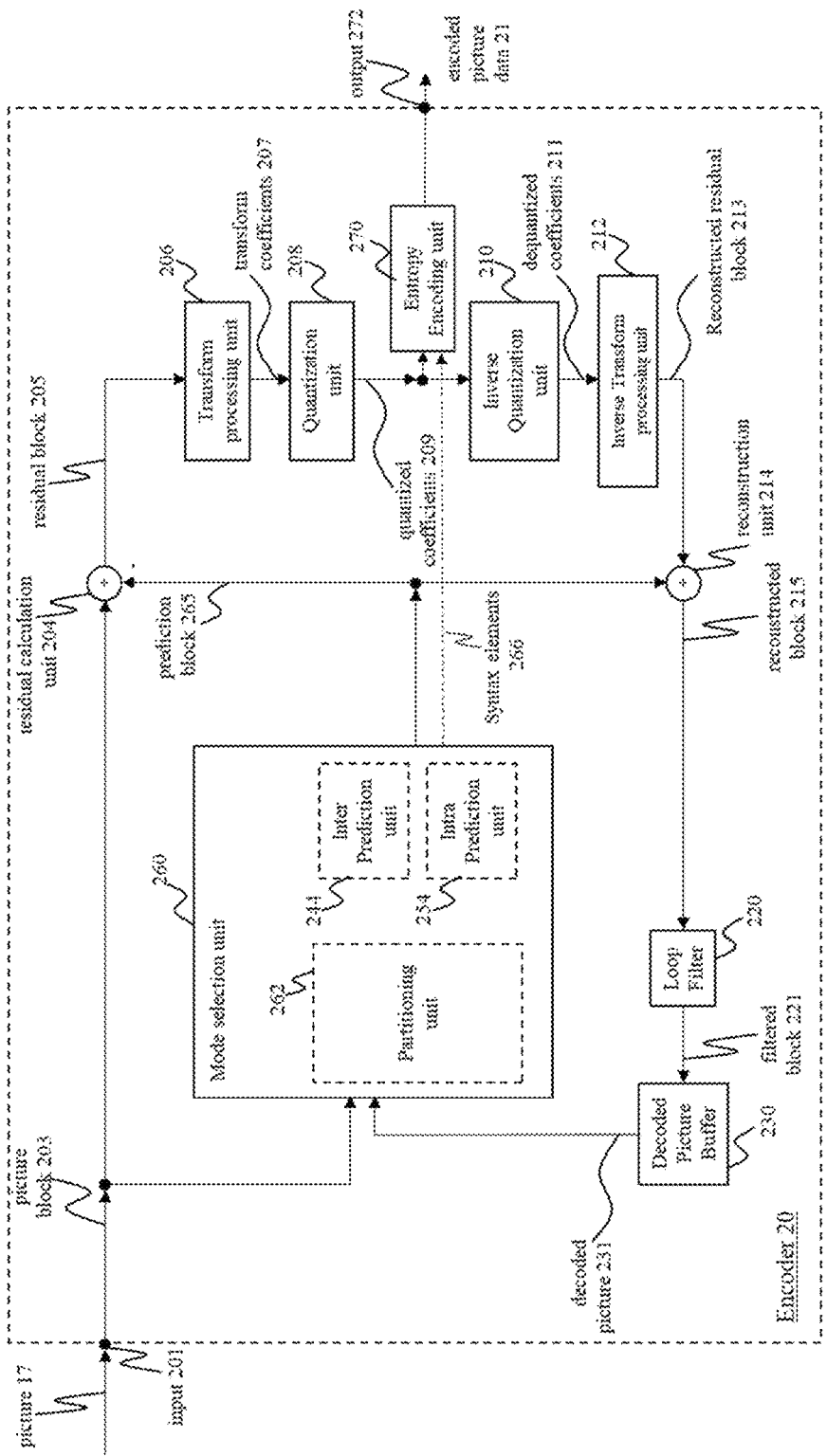
FIG. 2 is a block diagram showing an example of a video encoder configured to implement embodiments of the disclosure.

FIG. 2 shows a schematic block diagram of an example video encoder 20 that is configured to implement the techniques of the present application. In the example of FIG. 2, the video encoder 20 comprises an input 201 (or input interface 201), a residual calculation unit 204, a transform processing unit 206, a quantization unit 208, an inverse quantization unit 210, and inverse transform processing unit 212, a reconstruction unit 214, a loop filter unit 220, a decoded picture buffer (DPB) 230, a mode selection unit 260, an entropy encoding unit 270 and an output 272 (or output interface 272). The mode selection unit 260 may include an inter PU 244, an intra PU 254 and a partitioning unit 262. Inter PU 244 may include a ME unit and a motion compensation (MC) unit (not shown). A video encoder 20 as shown in FIG. 2 may also be referred to as hybrid video encoder or a video encoder according to a hybrid video codec.

Figure 3:
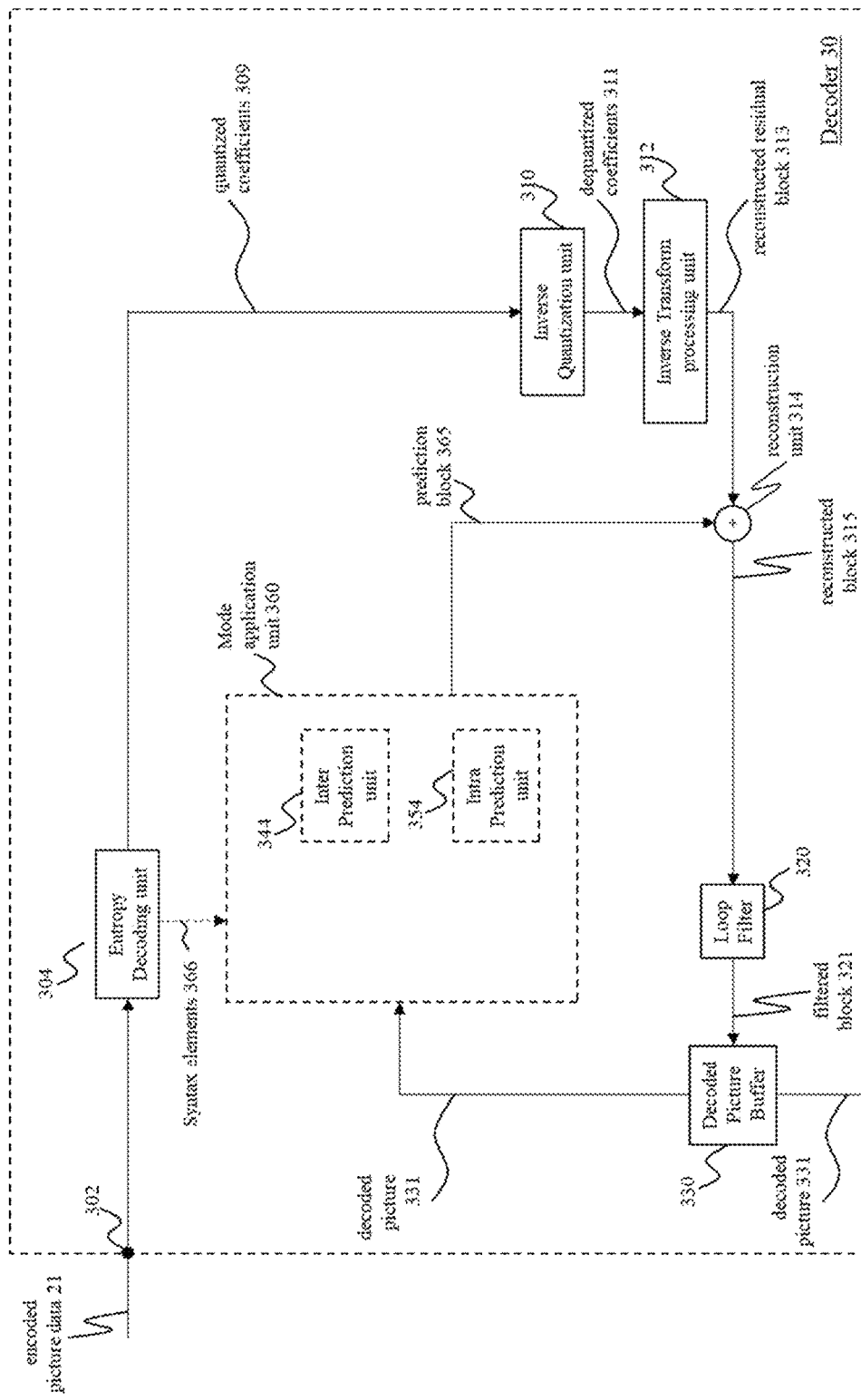
FIG. 3 is a block diagram showing an example structure of a video decoder configured to implement embodiments of the disclosure.

The residual calculation unit 204, the transform processing unit 206, the quantization unit 208, the mode selection unit 260 may be referred to as forming a forward signal path of the encoder 20, whereas the inverse quantization unit 210, the inverse transform processing unit 212, the reconstruction unit 214, the buffer 216, the loop filter 220, the DPB 230, the inter PU 244 and the intra-PU 254 may be referred to as forming a backward signal path of the video encoder 20, wherein the backward signal path of the video encoder 20 corresponds to the signal path of the decoder (see video decoder 30 in FIG. 3). The inverse quantization unit 210, the inverse transform processing unit 212, the reconstruction unit 214, the loop filter 220, the DPB 230, the inter PU 244 and the intra-PU 254 are also referred to forming the "built-in decoder" of video encoder 20.

Pictures & Picture Partitioning (Pictures and Blocks).

The encoder 20 may be configured to receive, e.g. via input 201, a picture 17 (or picture data 17), e.g. picture of a sequence of pictures forming a video or video sequence. The received picture or picture data may also be a pre-processed picture 19 (or pre-processed picture data 19). For sake of simplicity the following description refers to the picture 17. The picture 17 may also be referred to as current picture or picture to be coded (in particular in video coding to distinguish the current picture from other pictures, e.g. previously encoded and/or decoded pictures of the same video sequence, i.e. the video sequence which also comprises the current picture).

A (digital) picture is or can be regarded as a 2D array or matrix of samples with intensity values. A sample in the array may also be referred to as pixel. The number of samples in horizontal and vertical direction (or axis) of the array or picture define the size and/or resolution of the picture. For representation of color, typically three color components are employed, i.e. the picture may be represented or include three sample arrays. In RBG format or color space a picture comprises a corresponding RGB sample array. However, in video coding each pixel is typically represented in a luminance and chrominance format or color space, e.g. YCbCr, which comprises a luminance component indicated by Y (sometimes also L is used instead) and two chrominance components indicated by Cb and Cr. The luminance (or short luma) component Y represents the brightness or grey level intensity (e.g. like in a grey-scale picture), while the two chrominance (or short chroma) components Cb and Cr represent the chromaticity or color information components. Accordingly, a picture in YCbCr format comprises a luminance sample array of luminance sample values (Y), and two chrominance sample arrays of chrominance values (Cb and Cr). Pictures in RGB format may be converted or transformed into YCbCr format and vice versa, the process is also known as color transformation or conversion. If a picture is monochrome, the picture may comprise only a luminance sample array. Accordingly, a picture may be, for example, an array of luma samples in monochrome format or an array of luma samples and two corresponding arrays of chroma samples in 4:2:0, 4:2:2, and 4:4:4 color format.

Embodiments of the video encoder 20 may comprise a picture partitioning unit (not depicted in FIG. 2) configured to partition the picture 17 into a plurality of (typically non-overlapping) picture blocks 203. These blocks may also be referred to as root blocks, macro blocks (H.264/AVC) or coding tree blocks (CTB) or CTUs (H.265/HEVC and VVC). The picture partitioning unit may be configured to use the same block size for all pictures of a video sequence and the corresponding grid defining the block size, or to change the block size between pictures or subsets or groups of pictures, and partition each picture into the corresponding blocks.

In further embodiments, the video encoder may be configured to receive directly a block 203 of the picture 17, e.g. one, several or all blocks forming the picture 17. The picture block 203 may also be referred to as current picture block or picture block to be coded.

Like the picture 17, the picture block 203 again is or can be regarded as a 2D array or matrix of samples with intensity values (sample values), although of smaller dimension than the picture 17. In other words, the block 203 may comprise, e.g., one sample array (e.g. a luma array in case of a monochrome picture 17, or a luma or chroma array in case of a color picture) or three sample arrays (e.g. a luma and two chroma arrays in case of a color picture 17) or any other number and/or kind of arrays depending on the color format applied. The number of samples in horizontal and vertical direction (or axis) of the block 203 define the size of block 203. Accordingly, a block may, for example, an M×N (M-column by N-row) array of samples, or an M×N array of transform coefficients.

Embodiments of the video encoder 20 as shown in FIG. 2 may be configured to encode the picture 17 block by block, e.g. the encoding and prediction is performed per block 203.

Embodiments of the video encoder 20 as shown in FIG. 2 may be further configured to partition and/or encode the picture by using slices (also referred to as video slices), wherein a picture may be partitioned into or encoded using one or more slices (typically non-overlapping), and each slice may comprise one or more blocks (e.g. CTUs).

Embodiments of the video encoder 20 as shown in FIG. 2 may be further configured to partition and/or encode the picture by using tile groups (also referred to as video tile groups) and/or tiles (also referred to as video tiles), wherein a picture may be partitioned into or encoded using one or more tile groups (typically non-overlapping), and each tile group may comprise, e.g. one or more blocks (e.g. CTUs) or one or more tiles, wherein each tile, e.g. may be of rectangular shape and may comprise one or more blocks (e.g. CTUs), e.g. complete or fractional blocks.

Residual Calculation.

The residual calculation unit 204 may be configured to calculate a residual block 205 (also referred to as residual 205) based on the picture block 203 and a prediction block 265 (further details about the prediction block 265 are provided later), e.g. by subtracting sample values of the prediction block 265 from sample values of the picture block 203, sample by sample (pixel by pixel) to obtain the residual block 205 in the sample domain.

Transform.

The transform processing unit 206 may be configured to apply a transform, e.g. a discrete cosine transform (DCT) or discrete sine transform (DST), on the sample values of the residual block 205 to obtain transform coefficients 207 in a transform domain. The transform coefficients 207 may also be referred to as transform residual coefficients and represent the residual block 205 in the transform domain.

The transform processing unit 206 may be configured to apply integer approximations of DCT/DST, such as the transforms specified for H.265/HEVC. Compared to an orthogonal DCT transform, such integer approximations are typically scaled by a certain factor. In order to preserve the norm of the residual block which is processed by forward and inverse transforms, additional scaling factors are applied as part of the transform process. The scaling factors are typically chosen based on certain constraints like scaling factors being a power of two for shift operations, bit depth of the transform coefficients, tradeoff between accuracy and implementation costs, etc. Specific scaling factors are, for example, specified for the inverse transform, e.g. by inverse transform processing unit 212 (and the corresponding inverse transform, e.g. by inverse transform processing unit 312 at video decoder 30) and corresponding scaling factors for the forward transform, e.g. by transform processing unit 206, at an encoder 20 may be specified accordingly.

Embodiments of the video encoder 20 (respectively transform processing unit 206) may be configured to output transform parameters, e.g. a type of transform or transforms, e.g. directly or encoded or compressed via the entropy encoding unit 270, so that, e.g., the video decoder 30 may receive and use the transform parameters for decoding.

Quantization

The quantization unit 208 may be configured to quantize the transform coefficients 207 to obtain quantized coefficients 209, e.g. by applying scalar quantization or vector quantization. The quantized coefficients 209 may also be referred to as quantized transform coefficients 209 or quantized residual coefficients 209.

The quantization process may reduce the bit depth associated with some or all of the transform coefficients 207. For example, an n-bit transform coefficient may be rounded down to an m-bit Transform coefficient during quantization, where n is greater than m. The degree of quantization may be modified by adjusting a quantization parameter (QP). For example, for scalar quantization, different scaling may be applied to achieve finer or coarser quantization. Smaller quantization step sizes correspond to finer quantization, whereas larger quantization step sizes correspond to coarser quantization. The applicable quantization step size may be indicated by a QP. The QP may for example be an index to a predefined set of applicable quantization step sizes. For example, small QP s may correspond to fine quantization (small quantization step sizes) and large QPs may correspond to coarse quantization (large quantization step sizes) or vice versa. The quantization may include division by a quantization step size and a corresponding and/or the inverse dequantization, e.g. by inverse quantization unit 210, may include multiplication by the quantization step size. Embodiments according to some standards, e.g. HEVC, may be configured to use a QP to determine the quantization step size. Generally, the quantization step size may be calculated based on a QP using a fixed-point approximation of an equation including division. Additional scaling factors may be introduced for quantization and dequantization to restore the norm of the residual block, which might get modified because of the scaling used in the fixed-point approximation of the equation for quantization step size and QP. In one example implementation, the scaling of the inverse transform and dequantization might be combined. Alternatively, customized quantization tables may be used and signaled from an encoder to a decoder, e.g. in a bitstream. The quantization is a lossy operation, wherein the loss increases with increasing quantization step sizes.

Embodiments of the video encoder 20 (respectively quantization unit 208) may be configured to output QP, e.g. directly or encoded via the entropy encoding unit 270, so that, e.g., the video decoder 30 may receive and apply the QPs for decoding.

Inverse Quantization

The inverse quantization unit 210 is configured to apply the inverse quantization of the quantization unit 208 on the quantized coefficients to obtain dequantized coefficients 211, e.g. by applying the inverse of the quantization scheme applied by the quantization unit 208 based on or using the same quantization step size as the quantization unit 208. The dequantized coefficients 211 may also be referred to as dequantized residual coefficients 211 and correspond—although typically not identical to the transform coefficients due to the loss by quantization—to the transform coefficients 207.

Inverse Transform

The inverse transform processing unit 212 is configured to apply the inverse transform of the transform applied by the transform processing unit 206, e.g. an inverse DCT or inverse DST or other inverse transforms, to obtain a reconstructed residual block 213 (or corresponding dequantized coefficients 213) in the sample domain. The reconstructed residual block 213 may also be referred to as transform block (TB) 213.

Reconstruction

The reconstruction unit 214 (e.g. adder or summer 214) is configured to add the TB 213 (i.e. reconstructed residual block 213) to the prediction block 265 to obtain a reconstructed block 215 in the sample domain, e.g. by adding—sample by sample—the sample values of the reconstructed residual block 213 and the sample values of the prediction block 265.

Filtering.

The loop filter unit 220 (or short "loop filter" 220), is configured to filter the reconstructed block 215 to obtain a filtered block 221, or in general, to filter reconstructed samples to obtain filtered samples. The loop filter unit is, e.g., configured to smooth pixel transitions, or otherwise improve the video quality. The loop filter unit 220 may comprise one or more loop filters such as a de-blocking filter, a sample-adaptive offset (SAO) filter or one or more other filters, e.g. a bilateral filter, an adaptive loop filter (ALF), a sharpening, a smoothing filter or a collaborative filter, or any combination thereof. Although the loop filter unit 220 is shown in FIG. 2 as being an in-loop filter, in other configurations, the loop filter unit 220 may be implemented as a post loop filter. The filtered block 221 may also be referred to as filtered reconstructed block 221.

Embodiments of the video encoder 20 (respectively loop filter unit 220) may be configured to output loop filter parameters (such as SAO information), e.g. directly or encoded via the entropy encoding unit 270, so that, e.g., a decoder 30 may receive and apply the same loop filter parameters or respective loop filters for decoding.

DPB.

The DPB 230 may be a memory that stores reference pictures, or in general reference picture data, for encoding video data by video encoder 20. The DPB 230 may be formed by any of a variety of memory devices, such as dynamic random-access memory (DRAM), including synchronous DRAM (SDRAM), magneto-resistive random access memory (MRAM), resistive random access memory (RRAM), or other types of memory devices. The DPB 230 may be configured to store one or more filtered blocks 221. The DPB 230 may be further configured to store other previously filtered blocks, e.g. previously reconstructed and filtered blocks 221, of the same current picture or of different pictures, e.g. previously reconstructed pictures, and may provide complete previously reconstructed, i.e. decoded, pictures (and corresponding reference blocks and samples)

and/or a partially reconstructed current picture (and corresponding reference blocks and samples), for example for inter prediction. The DPB 230 may be also configured to store one or more unfiltered reconstructed blocks 215, or in general unfiltered reconstructed samples, e.g. if the reconstructed block 215 is not filtered by loop filter unit 220, or any other further processed version of the reconstructed blocks or samples.

Mode Selection (Partitioning & Prediction).

The mode selection unit 260 comprises partitioning unit 262, inter-PU 244 and intra-PU 254, and is configured to receive or obtain original picture data, e.g. an original block 203 (current block 203 of the current picture 17), and reconstructed picture data, e.g. filtered and/or unfiltered reconstructed samples or blocks of the same (current) picture and/or from one or a plurality of previously decoded pictures, e.g. from DPB 230 or other buffers (e.g. line buffer, not shown). The reconstructed picture data is used as reference picture data for prediction, e.g. inter-prediction or intra-prediction, to obtain a prediction block 265 or predictor 265.

Mode selection unit 260 may be configured to determine or select a partitioning for a current block prediction mode (including no partitioning) and a prediction mode (e.g. an intra or inter prediction mode) and generate a corresponding prediction block 265, which is used for the calculation of the residual block 205 and for the reconstruction of the reconstructed block 215.

Embodiments of the mode selection unit 260 may be configured to select the partitioning and the prediction mode (e.g. from those supported by or available for mode selection unit 260), which provide the best match or in other words the minimum residual (minimum residual means better compression for transmission or storage), or a minimum signaling overhead (minimum signaling overhead means better compression for transmission or storage), or which considers or balances both. The mode selection unit 260 may be configured to determine the partitioning and prediction mode based on rate distortion optimization (RDO), i.e. select the prediction mode which provides a minimum rate distortion. Terms like "best", "minimum", "optimum" etc. in this context do not necessarily refer to an overall "best", "minimum", "optimum", etc. but may also refer to the fulfillment of a termination or selection criterion like a value exceeding or falling below a threshold or other constraints leading potentially to a "sub-optimum selection" but reducing complexity and processing time.

In other words, the partitioning unit 262 may be configured to partition the block 203 into smaller block partitions or sub-blocks (which form again blocks), e.g. iteratively using QT-partitioning, binary partitioning (BT) or triple-tree-partitioning (TT) or any combination thereof, and to perform, e.g., the prediction for each of the block partitions or sub-blocks, wherein the mode selection comprises the selection of the tree-structure of the partitioned block 203 and the prediction modes are applied to each of the block partitions or sub-blocks.

In the following the partitioning (e.g. by partitioning unit 260) and prediction processing (by inter-PU 244 and intra-PU 254) performed by an example video encoder 20 will be explained in more detail.

Partitioning

The partitioning unit 262 may partition (or split) a current block 203 into smaller partitions, e.g. smaller blocks of square or rectangular size. These smaller blocks (which may also be referred to as sub-blocks) may be further partitioned into even smaller partitions. This is also referred to tree-partitioning or hierarchical tree-partitioning, wherein a root block, e.g. at root tree-level 0 (hierarchy-level 0, depth 0), may be recursively partitioned, e.g. partitioned into two or more blocks of a next lower tree-level, e.g. nodes at tree-level 1 (hierarchy-level 1, depth 1), wherein these blocks may be again partitioned into two or more blocks of a next lower level, e.g. tree-level 2 (hierarchy-level 2, depth 2), etc. until the partitioning is terminated, e.g. because a termination criterion is fulfilled, e.g. a maximum tree depth or minimum block size is reached. Blocks which are not further partitioned are also referred to as leaf-blocks or leaf nodes of the tree. A tree using partitioning into two partitions is referred to as BT, a tree using partitioning into three partitions is referred to as TT, and a tree using partitioning into four partitions is referred to as QT.

As mentioned before, the term "block" as used herein may be a portion, in particular a square or rectangular portion, of a picture. With reference, for example, to HEVC and VVC, the block may be or correspond to a CTU, a CU, PU, and transform unit (TU) and/or to the corresponding blocks, e.g. a CTB, a coding block (CB), a TB or prediction block.

For example, a CTU may be or comprise a CTB of luma samples, two corresponding CTBs of chroma samples of a picture that has three sample arrays, or a CTB of samples of a monochrome picture or a picture that is coded using three separate color planes and syntax structures used to code the samples. Correspondingly, a CTB may be an N×N block of samples for some value of N such that the division of a component into CTBs is a partitioning. A CU may be or comprise a CB of luma samples, two corresponding CBs of chroma samples of a picture that has three sample arrays, or a CB of samples of a monochrome picture or a picture that is coded using three separate color planes and syntax structures used to code the samples. Correspondingly a CB may be an M×N block of samples for some values of M and N such that the division of a CTB into CBs is a partitioning.

In embodiments, e.g., according to HEVC, a CTU may be split into CUs by using a QT structure denoted as coding tree. The decision whether to code a picture area using inter-picture (temporal) or intra-picture (spatial) prediction is made at the CU level. Each CU can be further split into one, two or four PUs according to the PU splitting type. Inside one PU, the same prediction process is applied and the relevant information is transmitted to the decoder on a PU basis. After obtaining the residual block by applying the prediction process based on the PU splitting type, a CU can be partitioned into TUs according to another QT structure similar to the coding tree for the CU.

In embodiments, e.g., according to the latest video coding standard currently in development, which is referred to as VVC, a combined QT and BT (QTBT) partitioning is for example used to partition a CB. In the QTBT block structure, a CU can have either a square or rectangular shape. For example, a CTU is first partitioned by a QT structure. The QT leaf nodes are further partitioned by a BT or TT structure. The partitioning tree leaf nodes are called CUs, and that segmentation is used for prediction and transform processing without any further partitioning. This means that the CU, PU and TU have the same block size in the QTBT CB structure. In parallel, multiple partition, for example, TT partition may be used together with the QTBT block structure.

In one example, the mode selection unit 260 of video encoder 20 may be configured to perform any combination of the partitioning techniques described herein.

As described above, the video encoder 20 is configured to determine or select the best or an optimum prediction mode from a set of (e.g. pre-determined) prediction modes. The set of prediction modes may comprise, e.g., intra-prediction modes and/or inter-prediction modes.

Intra-Prediction

The set of intra-prediction modes may comprise 35 different intra-prediction modes, e.g. non-directional modes like DC (or mean) mode and planar mode, or directional modes, e.g. as defined in HEVC, or may comprise 67 different intra-prediction modes, e.g. non-directional modes like DC (or mean) mode and planar mode, or directional modes, e.g. as defined for VVC.

The intra-PU 254 is configured to use reconstructed samples of neighboring blocks of the same current picture to generate an intra-prediction block 265 according to an intra-prediction mode of the set of intra-prediction modes.

The intra PU 254 (or in general the mode selection unit 260) is further configured to output intra-prediction parameters (or in general information indicative of the selected intra prediction mode for the block) to the entropy encoding unit 270 in form of syntax elements 266 for inclusion into the encoded picture data 21, so that, e.g., the video decoder 30 may receive and use the prediction parameters for decoding.

Inter-Prediction.

The set of (or possible) inter-prediction modes depends on the available reference pictures (i.e. previous at least partially decoded pictures, e.g. stored in DBP 230) and other inter-prediction parameters, e.g. whether the whole reference picture or only a part, e.g. a search window area around the area of the current block, of the reference picture is used for searching for a best matching reference block, and/or e.g. whether pixel interpolation is applied, e.g. half/semi-pixel and/or quarter-pixel interpolation, or not.

Additional to the above prediction modes, skip mode and/or direct mode may be applied.

The inter PU 244 may include a ME unit and a MC unit (both not shown in FIG. 2). The ME unit may be configured to receive or obtain the picture block 203 (current picture block 203 of the current picture 17) and a decoded picture 231, or at least one or a plurality of previously reconstructed blocks, e.g. reconstructed blocks of one or a plurality of other/different previously decoded pictures 231, for ME. E.g. a video sequence may comprise the current picture and the previously decoded pictures 231, or in other words, the current picture and the previously decoded pictures 231 may be part of or form a sequence of pictures forming a video sequence.

The encoder 20 may, e.g., be configured to select a reference block from a plurality of reference blocks of the same or different pictures of the plurality of other pictures and provide a reference picture (or reference picture index) and/or an offset (spatial offset) between the position (x, y coordinates) of the reference block and the position of the current block as inter prediction parameters to the ME unit. This offset is also called MV.

The MC unit is configured to obtain, e.g. receive, an inter prediction parameter and to perform inter prediction based on or using the inter prediction parameter to obtain an inter prediction block 265. MC, performed by the MC unit, may involve fetching or generating the prediction block based on the motion/block vector determined by ME, possibly performing interpolations to sub-pixel precision. Interpolation filtering may generate additional pixel samples from known pixel samples, thus potentially increasing the number of candidate prediction blocks that may be used to code a picture block. Upon receiving the MV for the PU of the current picture block, the MC unit may locate the prediction block to which the MV points in one of the reference picture lists.

The MC unit may also generate syntax elements associated with the blocks and video slices for use by video decoder 30 in decoding the picture blocks of the video slice. In addition or as an alternative to slices and respective syntax elements, tile groups and/or tiles and respective syntax elements may be generated or used.

Entropy Coding

The entropy encoding unit 270 is configured to apply, for example, an entropy encoding algorithm or scheme (e.g. a variable length coding (VLC) scheme, an context adaptive VLC scheme (CAVLC), an arithmetic coding scheme, a binarization, a context adaptive binary arithmetic coding (CABAC), syntax-based context-adaptive binary arithmetic coding (SBAC), probability interval partitioning entropy (PIPE) coding or another entropy encoding methodology or technique) or bypass (no compression) on the quantized coefficients 209, inter prediction parameters, intra prediction parameters, loop filter parameters and/or other syntax elements to obtain encoded picture data 21 which can be output via the output 272, e.g. in the form of an encoded bitstream 21, so that, e.g., the video decoder 30 may receive and use the parameters for decoding. The encoded bitstream 21 may be transmitted to video decoder 30, or stored in a memory for later transmission or retrieval by video decoder 30.

Other structural variations of the video encoder 20 can be used to encode the video stream. For example, a non-transform-based encoder 20 can quantize the residual signal directly without the transform processing unit 206 for certain blocks or frames. In another implementation, an encoder 20 can have the quantization unit 208 and the inverse quantization unit 210 combined into a single unit.

Decoder and Decoding Method

FIG. 3 shows an example of a video decoder 30 that is configured to implement the techniques of this present application. The video decoder 30 is configured to receive encoded picture data 21 (e.g. encoded bitstream 21), e.g. encoded by encoder 20, to obtain a decoded picture 331. The encoded picture data or bitstream comprises information for decoding the encoded picture data, e.g. data that represents picture blocks of an encoded video slice (and/or tile groups or tiles) and associated syntax elements.

In the example of FIG. 3, the decoder 30 comprises an entropy decoding unit 304, an inverse quantization unit 310, an inverse transform processing unit 312, a reconstruction unit 314 (e.g. a summer 314), a loop filter 320, a DBP 330, a mode application unit 360, an inter PU 344 and an intra PU 354. Inter PU 344 may be or include a MC unit. Video decoder 30 may, in some examples, perform a decoding pass generally reciprocal to the encoding pass described with respect to video encoder 100 from FIG. 2.

As explained with regard to the encoder 20, the inverse quantization unit 210, the inverse transform processing unit 212, the reconstruction unit 214 the loop filter 220, the DPB 230, the inter PU 344 and the intra PU 354 are also referred to as forming the "built-in decoder" of video encoder 20. Accordingly, the inverse quantization unit 310 may be identical in function to the inverse quantization unit 110, the inverse transform processing unit 312 may be identical in function to the inverse transform processing unit 212, the reconstruction unit 314 may be identical in function to reconstruction unit 214, the loop filter 320 may be identical in function to the loop filter 220, and the DPB 330 may be identical in function to the DPB 230. Therefore, the explanations provided for the respective units and functions of the video 20 encoder apply correspondingly to the respective units and functions of the video decoder 30.

Entropy Decoding

The entropy decoding unit 304 is configured to parse the bitstream 21 (or in general encoded picture data 21) and perform, for example, entropy decoding to the encoded picture data 21 to obtain, e.g., quantized coefficients 309 and/or decoded coding parameters (not shown in FIG. 3), e.g. any or all of inter prediction parameters (e.g. reference picture index and MV), intra prediction parameter (e.g. intra prediction mode or index), transform parameters, QPs, loop filter parameters, and/or other syntax elements. Entropy decoding unit 304 may be configured to apply the decoding algorithms or schemes corresponding to the encoding schemes as described with regard to the entropy encoding unit 270 of the encoder 20. Entropy decoding unit 304 may be further configured to provide inter prediction parameters, intra prediction parameter and/or other syntax elements to the mode application unit 360 and other parameters to other units of the decoder 30. Video decoder 30 may receive the syntax elements at the video slice level and/or the video block level. In addition or as an alternative to slices and respective syntax elements, tile groups and/or tiles and respective syntax elements may be received and/or used.

Inverse Quantization

The inverse quantization unit 310 may be configured to receive QPs (or in general information related to the inverse quantization) and quantized coefficients from the encoded picture data 21 (e.g. by parsing and/or decoding, e.g. by entropy decoding unit 304) and to apply based on the QPs an inverse quantization on the decoded quantized coefficients 309 to obtain dequantized coefficients 311, which may also be referred to as transform coefficients 311. The inverse quantization process may include use of a QP determined by video encoder 20 for each video block in the video slice (or tile or tile group) to determine a degree of quantization and, likewise, a degree of inverse quantization that should be applied.

Inverse Transform.

Inverse transform processing unit 312 may be configured to receive dequantized coefficients 311, also referred to as transform coefficients 311, and to apply a transform to the dequantized coefficients 311 in order to obtain reconstructed residual blocks 213 in the sample domain. The reconstructed residual blocks 213 may also be referred to as TBs 313. The transform may be an inverse transform, e.g., an inverse DCT, an inverse DST, an inverse integer transform, or a conceptually similar inverse transform process. The inverse transform processing unit 312 may be further configured to receive transform parameters or corresponding information from the encoded picture data 21 (e.g. by parsing and/or decoding, e.g. by entropy decoding unit 304) to determine the transform to be applied to the dequantized coefficients 311.

Reconstruction.

The reconstruction unit 314 (e.g. adder or summer 314) may be configured to add the reconstructed residual block 313, to the prediction block 365 to obtain a reconstructed block 315 in the sample domain, e.g. by adding the sample values of the reconstructed residual block 313 and the sample values of the prediction block 365.

Filtering

The loop filter unit 320 (either in the coding loop or after the coding loop) is configured to filter the reconstructed block 315 to obtain a filtered block 321, e.g. to smooth pixel transitions, or otherwise improve the video quality. The loop filter unit 320 may comprise one or more loop filters such as a de-blocking filter, a SAO filter or one or more other filters, e.g. a bilateral filter, an ALF, a sharpening, smoothing filters or collaborative filters, or any combination thereof. Although the loop filter unit 320 is shown in FIG. 3 as being an in loop filter, in other configurations, the loop filter unit 320 may be implemented as a post loop filter.

DPB

The decoded video blocks 321 of a picture are then stored in DPB 330, which stores the decoded pictures 331 as reference pictures for subsequent MC for other pictures and/or for output respectively display.

The decoder 30 is configured to output the decoded picture 311, e.g. via output 312, for presentation or viewing to a user.

Prediction

The inter PU 344 may be identical to the inter PU 244 (in particular to the MC unit) and the intra PU 354 may be identical to the inter PU 254 in function, and performs split or partitioning decisions and prediction based on the partitioning and/or prediction parameters or respective information received from the encoded picture data 21 (e.g. by parsing and/or decoding, e.g. by entropy decoding unit 304). Mode application unit 360 may be configured to perform the prediction (intra or inter prediction) per block based on reconstructed pictures, blocks or respective samples (filtered or unfiltered) to obtain the prediction block 365.

When the video slice is coded as an intra coded (I) slice, intra PU 354 of mode application unit 360 is configured to generate prediction block 365 for a picture block of the current video slice based on a signaled intra prediction mode and data from previously decoded blocks of the current picture. When the video picture is coded as an inter coded (i.e., B, or P) slice, inter PU 344 (e.g. MC unit) of mode application unit 360 is configured to produce prediction blocks 365 for a video block of the current video slice based on the MVs and other syntax elements received from entropy decoding unit 304. For inter prediction, the prediction blocks may be produced from one of the reference pictures within one of the reference picture lists. Video decoder 30 may construct the reference frame lists, List 0 and List 1, using default construction techniques based on reference pictures stored in DPB 330. The same or similar may be applied for or by embodiments using tile groups (e.g. video tile groups) and/or tiles (e.g. video tiles) in addition or alternatively to slices (e.g. video slices), e.g. a video may be coded using I, P or B tile groups and/or tiles.

Mode application unit 360 is configured to determine the prediction information for a video block of the current video slice by parsing the MVs or related information and other syntax elements, and uses the prediction information to produce the prediction blocks for the current video block being decoded. For example, the mode application unit 360 uses some of the received syntax elements to determine a prediction mode (e.g., intra or inter prediction) used to code the video blocks of the video slice, an inter prediction slice type (e.g., B slice, P slice, or GPB slice), construction information for one or more of the reference picture lists for the slice, MVs for each inter encoded video block of the slice, inter prediction status for each inter coded video block of the slice, and other information to decode the video blocks in the current video slice. The same or similar may be applied for or by embodiments using tile groups (e.g. video tile groups) and/or tiles (e.g. video tiles) in addition or alternatively to slices (e.g. video slices), e.g. a video may be coded using I, P or B tile groups and/or tiles.

Embodiments of the video decoder 30 as shown in FIG. 3 may be configured to partition and/or decode the picture by using slices (also referred to as video slices), wherein a picture may be partitioned into or decoded using one or more slices (typically non-overlapping), and each slice may comprise one or more blocks (e.g. CTUs).

Embodiments of the video decoder 30 as shown in FIG. 3 may be configured to partition and/or decode the picture by using tile groups (also referred to as video tile groups) and/or tiles (also referred to as video tiles), wherein a picture may be partitioned into or decoded using one or more tile groups (typically non-overlapping), and each tile group may comprise, e.g. one or more blocks (e.g. CTUs) or one or more tiles, wherein each tile, e.g. may be of rectangular shape and may comprise one or more blocks (e.g. CTUs), e.g. complete or fractional blocks.

Other variations of the video decoder 30 can be used to decode the encoded picture data 21. For example, the decoder 30 can produce the output video stream without the loop filtering unit 320. For example, a non-transform-based decoder 30 can inverse-quantize the residual signal directly without the inverse-transform processing unit 312 for certain blocks or frames. In another implementation, the video decoder 30 can have the inverse-quantization unit 310 and the inverse-transform processing unit 312 combined into a single unit.

It should be understood that, in the encoder 20 and the decoder 30, a processing result of a current step may be further processed and then output to the next step. For example, after interpolation filtering, MV derivation or loop filtering, a further operation, such as Clip or shift, may be performed on the processing result of the interpolation filtering, MV derivation or loop filtering.

It should be noted that further operations may be applied to the derived MVs of current block (including but not limit to control point MVs of affine mode, sub-block MVs in affine, planar, advanced TMVP (ATMVP) modes, temporal MVs, and so on). For example, the value of MV is constrained to a predefined range according to its representing bit. If the representing bit of MV is bitDepth, then the range is $-2^{(bitDepth-1)} \sim 2^{(bitDepth-1)}-1$, where "^" means exponentiation. For example, if bitDepth is set equal to 16, the range is $-32768 \sim 32767$, if bitDepth is set equal to 18, the range is $-131072 \sim 131071$. For example, the value of the derived MV (e.g. the MVs of four 4×4 sub-blocks within one 8×8 block) is constrained such that the max difference between integer parts of the four 4×4 sub-block MVs is no more than N pixels, such as no more than 1 pixel. Here provides two methods for constraining the MV according to the bitDepth.

Method 1, remove the overflow most significant bit (MSB) by flowing operations:

$$ux=(mvx+2^{bitDepth})\%2^{bitDepth} \quad (1)$$

$$mvx=(ux>=2^{bitDepth-1})?(ux-2^{bitDepth}):ux \quad (2)$$

$$uy=(mvy+2^{bitDepth})\%2^{bitDepth} \quad (3)$$

$$mvy=(uy>=2^{bitDepth-1})?(uy-2^{bitDepth}):uy \quad (4)$$

where mvx is a horizontal component of a MV of an image block or a sub-block, mvy is a vertical component of a MV of an image block or a sub-block, and ux and uy indicates an intermediate value.

For example, if the value of mvx is −32769, after applying formula (1) and (2), the resulting value is 32767. In computer system, decimal numbers are stored as two's complement. The two's complement of −32769 is 1,0111,1111, 1111,1111 (17 bits), then the MSB is discarded, so the resulting two's complement is 0111,1111,1111,1111 (decimal number is 32767), which is the same as the output by applying formula (1) and (2).

The operations may be applied during the sum of mvp and mvd, as shown in formula (5) to (8):

$$ux=(mvpx+mvdx+2^{bitDepth})\%2^{bitDepth} \quad (5)$$

$$mvx=(ux>=2^{bitDepth-1})?(ux-2^{bitDepth}):ux \quad (6)$$

$$uy=(mvpy+mvdy+2^{bitDepth})\%2^{bitDepth} \quad (7)$$

$$mvy=(uy>=2^{bitDepth-1})?(uy-2^{bitDepth}):uy \quad (8).$$

Method 2, remove the overflow MSB by clipping the value, as follows:

$$vx=Clip3(-2^{bitDepth-1},2^{bitDepth-1}-1,vx),$$

$$vy=Clip3(-2^{bitDepth-1},2^{bitDepth-1}-1,vy),$$

where vx is a horizontal component of a MV of an image block or a sub-block, vy is a vertical component of a MV of an image block or a sub-block, x, y and z respectively correspond to three input value of the MV clipping process, and the definition of function Clip3 is as follow:

$$Clip3(x, y, z) = \begin{cases} x; & z < x \\ y; & z > y \\ z; & \text{otherwise} \end{cases}.$$

Figure 4:
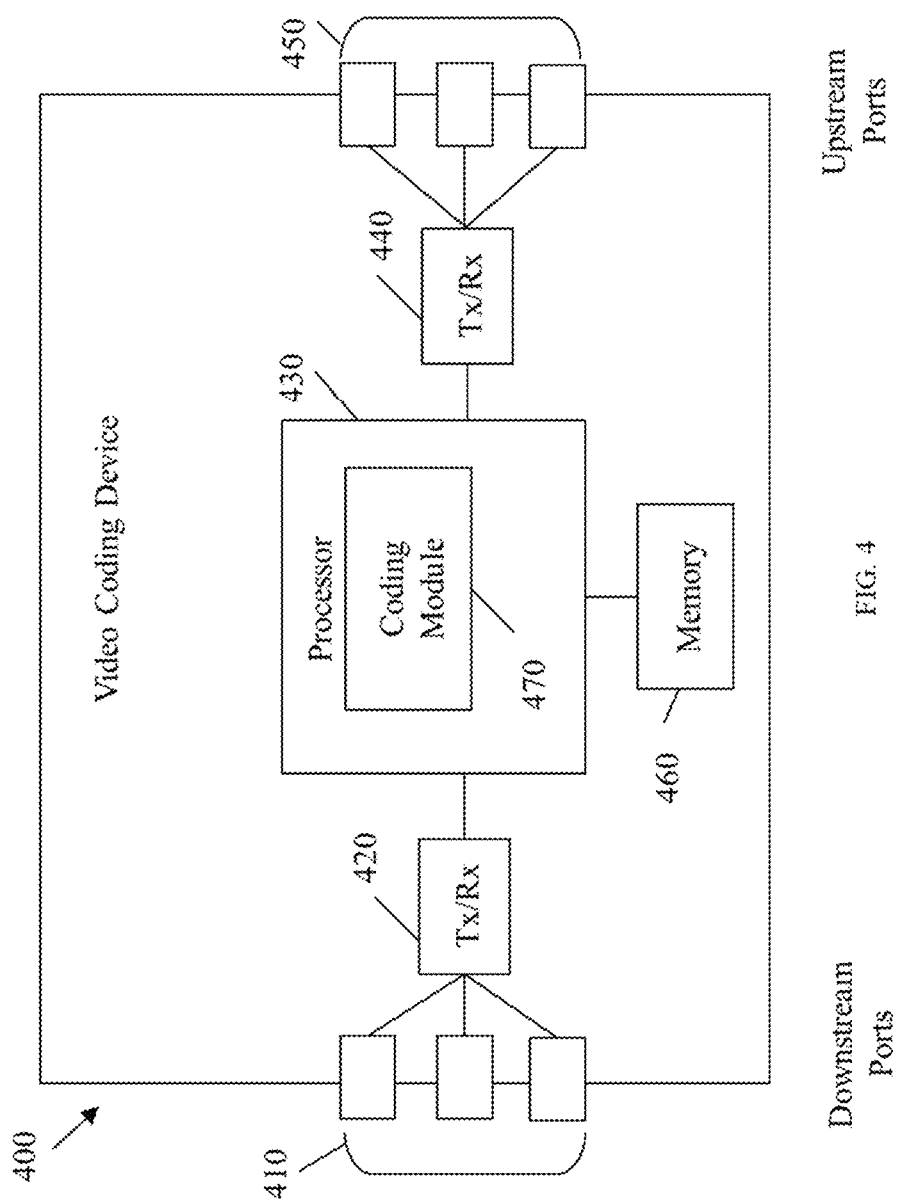
FIG. 4 is a block diagram illustrating an example of an encoding apparatus or a decoding apparatus.

FIG. 4 is a schematic diagram of a video coding device 400 according to an embodiment of the disclosure. The video coding device 400 is suitable for implementing the disclosed embodiments as described herein. In an embodiment, the video coding device 400 may be a decoder such as video decoder 30 of FIG. 1A or an encoder such as video encoder 20 of FIG. 1A.

The video coding device 400 comprises ingress ports 410 (or input ports 410) and receiver units (Rx) 420 for receiving data, a processor, logic unit, or central processing unit (CPU) 430 to process the data, transmitter units (Tx) 440 and egress ports 450 (or output ports 450) for transmitting the data, and a memory 460 for storing the data. The video coding device 400 may also comprise optical-to-electrical (OE) components and electrical-to-optical (EO) components coupled to the ingress ports 410, the Rx 420, the Tx 440, and the egress ports 450 for egress or ingress of optical or electrical signals.

The processor 430 is implemented by hardware and software. The processor 430 may be implemented as one or more CPU chips, cores (e.g., as a multi-core processor), FPGAs, ASICs, and DSPs. The processor 430 is in communication with the ingress ports 410, Rx 420, Tx 440, egress ports 450, and memory 460. The processor 430 comprises a coding module 470. The coding module 470 implements the disclosed embodiments described above. For instance, the coding module 470 implements, processes, prepares, or provides the various coding operations. The inclusion of the coding module 470 therefore provides a substantial improvement to the functionality of the video coding device 400 and effects a transformation of the video coding device 400 to a different state. Alternatively, the coding module 470 is implemented as instructions stored in the memory 460 and executed by the processor 430.

The memory 460 may comprise one or more disks, tape drives, and solid-state drives and may be used as an overflow data storage device, to store programs when such programs are selected for execution, and to store instructions and data that are read during program execution. The memory 460 may be, for example, volatile and/or non-volatile and may be a read-only memory (ROM), random access memory (RAM), ternary content-addressable memory (TCAM), and/or static random-access memory (SRAM).

Figure 5:
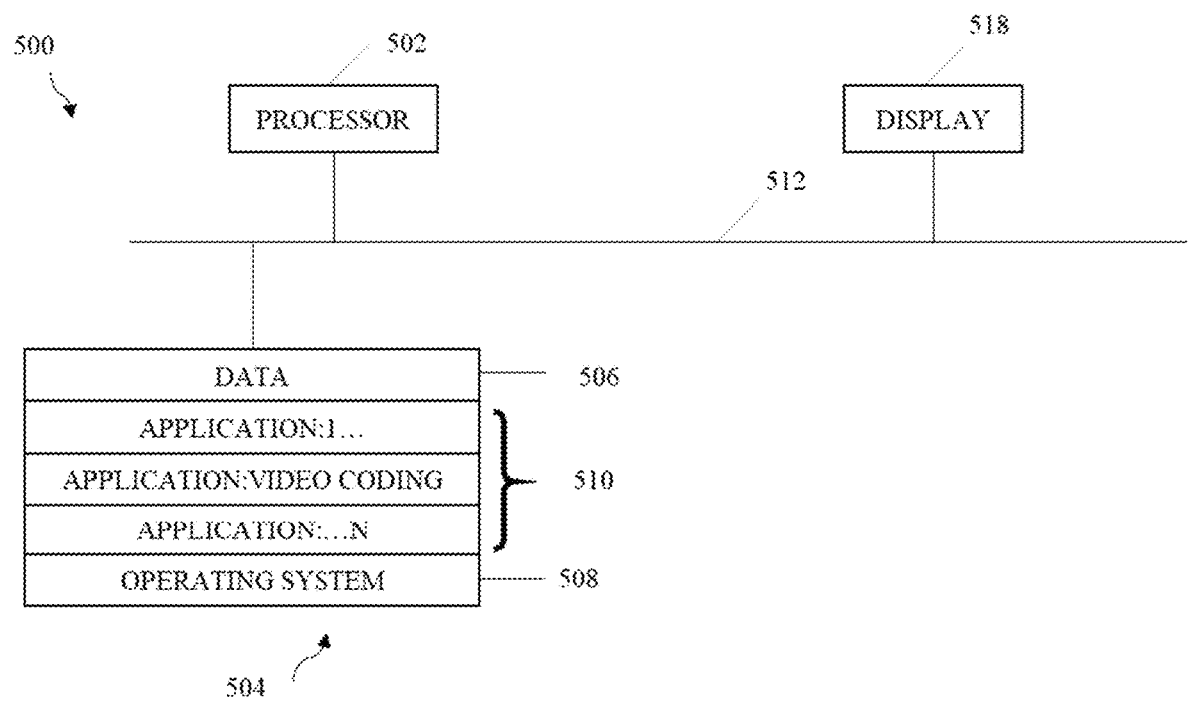
FIG. 5 is a block diagram illustrating another example of an encoding apparatus or a decoding apparatus.

FIG. 5 is a simplified block diagram of an apparatus 500 that may be used as either or both of the source device 12 and the destination device 14 from FIG. 1 according to an exemplary embodiment.

A processor 502 in the apparatus 500 can be a CPU. Alternatively, the processor 502 can be any other type of device, or multiple devices, capable of manipulating or processing information now-existing or hereafter developed. Although the disclosed implementations can be practiced with a single processor as shown, e.g., the processor 502, advantages in speed and efficiency can be achieved using more than one processor.

A memory 504 in the apparatus 500 can be a ROM device or a RAM device in an implementation. Any other suitable type of storage device can be used as the memory 504. The memory 504 can include code and data 506 that is accessed by the processor 502 using a bus 512. The memory 504 can further include an operating system 508 and application programs 510, the application programs 510 including at least one program that permits the processor 502 to perform the methods described here. For example, the application programs 510 can include applications 1 through N, which further include a video coding application that performs the methods described here.

The apparatus 500 can also include one or more output devices, such as a display 518. The display 518 may be, in one example, a touch sensitive display that combines a display with a touch sensitive element that is operable to sense touch inputs. The display 518 can be coupled to the processor 502 via the bus 512.

Although depicted here as a single bus, the bus 512 of the apparatus 500 can be composed of multiple buses. Further, the secondary storage 514 can be directly coupled to the other components of the apparatus 500 or can be accessed via a network and can comprise a single integrated unit such as a memory card or multiple units such as multiple memory cards. The apparatus 500 can thus be implemented in a wide variety of configurations.

In proposals to VVC standardization such as JVET-J0012, JVET-J0021, JVET-J0029, JVET-J0058, and JVET-J0059, for example, the use of motion information from non-adjustment blocks has been proposed. In the present disclosure, spatial MVP candidates that are captured from such blocks are denoted as LDMVP candidates. The positions of LDMVP candidates are usually obtained using some pattern.

The generation of a LDMVP list requires access to a significant amount of motion information of non-adjustment CUs. That may be critical in case of MVP position is outside of current CTU. Indeed, currently processed CTU information may be stored in a cache while the previously processed CTU may be stored in an external memory. Thus, retrieving information from another than the current CTU may require access to the external memory that increases the delay and the power consumption. Furthermore, retrieving motion information from e.g. the top CTU may be more complex than capturing motion information from the left CTU, which is previous in the processing order and may be also stored in the cache.

Due to these reasons, a modification of the LDMVP pattern may be advantageous in order to limit the access to other CTUs.

Depending on the encoding/decoding order, some of the motion information may not be available in some parts of a current video frame at the moment of encoding/decoding of the current video frame.

Due to this reason, it may be advantageous to use motion information from a video frame different from the current frame, that has been encoded/decoded prior to the current frame, so that motion information is available also at those locations the current frame does not provide such motion information.

The corresponding candidate positions from where the motion information is not available from the current frame belong to TMVP. These TMVP positions are to be generated. The one or more TMVP candidate positions are referred to a TMVP pattern.

Both patterns, LDMVP and TMVP, may be combined so as to build a list of MVCs (MVC list). A pattern may be subject to modifications, which means that some candidate positions may be changed and/or discarded. Moreover, the LDMVP pattern may be amended by adjacent positions, which may not be part of the original LDMVP pattern.

In this disclosure, a LDMVP pattern is defined as a set of offsets (e.g. in pixels or other basic units) relative to the position of the current block. The position of a current block means the position of the top left sample of the current block. In other words, an offset or offset value refers to a position relative to a reference position. A TMVP pattern is defined likewise in terms of offsets relative to the position of the current block.

In the present disclosure, the above-mentioned position of the top-left sample of the current block or CU is used as reference position. The reference position is, however, not restricted to the top-left sample position. Alternatively, any other sample position may be used as a reference. This includes, for example, the sample positions at the top-right, bottom-left, and/or bottom-right of the current CU. Another option is using as reference position a sample position along any of the top, bottom, left, and/or right edges of the current CU.

Figure 11:
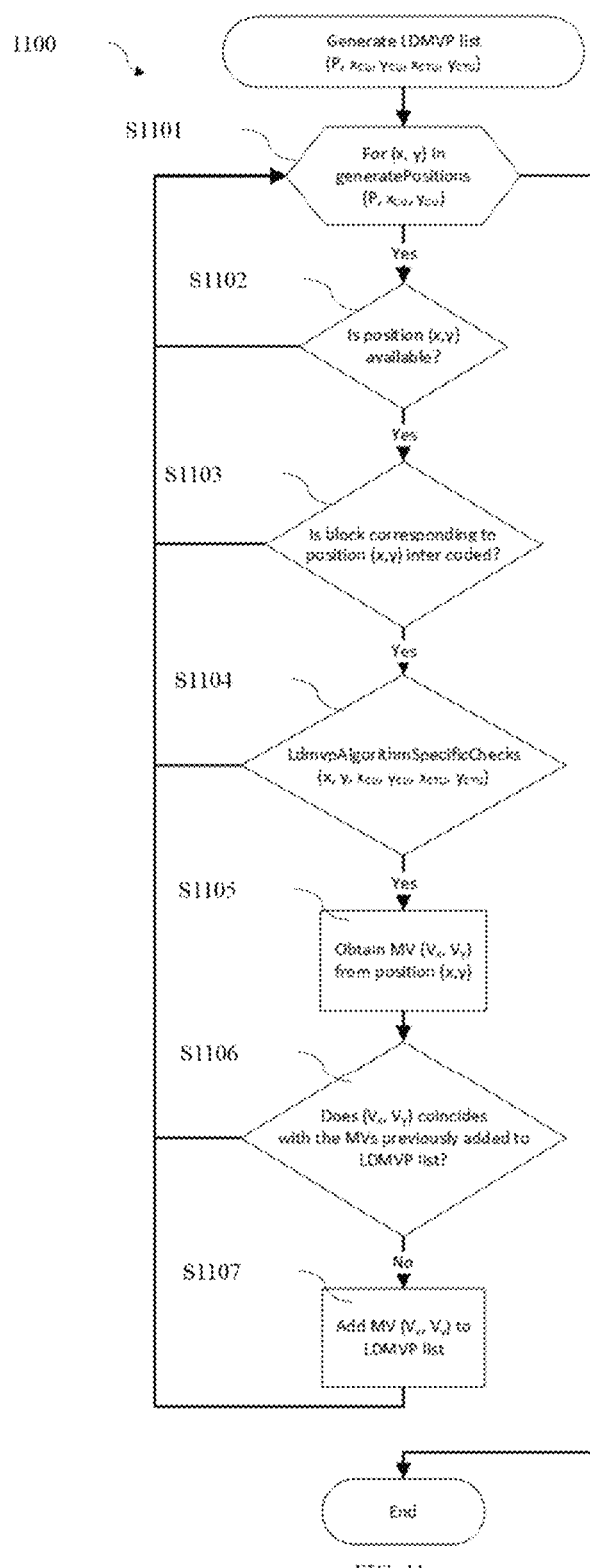
FIG. 11 is a flowchart of the LDMVP list generation algorithm.

Some positions defined by the pattern, and hence the corresponding motion information, may not be available, because they are, for example, outside of a current picture or current slice, or may correspond to intra coded units or may be rejected for some other reasons. Therefore, the set of candidate's positions is a subset of the positions defined by the pattern. Going through the candidate's position set according to the predefined order, a final LDMVP candidates list is generated. A block scheme of the LDMVP list generation algorithm 1100 is depicted in FIG. 11. The input parameters for this algorithm are pattern P, CU position (xCU, yCU) and CTU position (xCTU, yCTU).

Hereinafter, it's assumed that the CTU width and height are predefined parameters available in the LDMVP algorithms. The output of the LDMVP list generation algorithm is a LDMVP candidates list. The procedure generatePositions (P, xCU, yCU) generates positions (x,y), using (xCU, yCU) as a basic point and offsets from the pattern P in order depending on candidate priorities. The priority here refers to the order of the candidates in which they are inserted into the MVC list. Before adding new candidate to the list, it's checked that the new candidate does not coincide with the candidates that are already in the list. For some modifications of the LDMVP algorithms, additional checks may be performed using the procedure LdmvpAlgorithmSpecificChecks (P, xCU, yCU, xCTU, yCTU).

In the following, the method steps of the LDMVP list generation algorithm is briefly summarized with reference to the flowchart of FIG. 11. In step S1101, it is checked whether a position (x,y) belongs to a pattern relative to a current CU position (xcu,ycu). In step S1102, it is checked whether the position (x,y) is available. If not, then the next position (x,y) is used. If yes, it is then checked whether a block corresponding to the position (x,y) is inter-coded (step S1103). If not, then the next positon (x,y) is subject to the above mentioned two tests of steps S1101 and S1102. If yes, the position (x,y) may be subject to specific checks performed (step S1104) by the procedure LDMVPAlgorithmSpecificChecks, which as input parameters x,y,xcu,ycu,xctu, and yctu. In step S1105, motion information is then obtained for the position (x,y). This means that a MV is obtained for the position (x,y). It is then checked (step S1106), whether the obtained MV with components Vx and Vy coincides with any of the MVs added previously to the LDMVP list. If the MV is the same with any of the previous MV in the list, then a next position (x,y) is subject to the checks starting from step S1101. If the MV is not in the list, the MV is added into the LDMVP list (step S1107). When all positions (x,y) have been checked through the steps S1101 to S1107, the algorithm ends and provides the LDMVP list as output. The check of step S1106 of whether an obtained MV coincides with the MVs already in the MVC list is also referred to as full pruning. This means that an obtained MV is checked against all of the MVs already in the MVC list.

The flowchart of the LDMVP list generation algorithm shown in FIG. 11 is an exemplary implementation. For example, in the flowcharts of FIGS. 35 and/or 41 with the procedures additionalChecks and/or replacePosition (discussed further below) being inserted into the flowchart of the LDMVP list generation algorithm, step 1106 may be optionally skipped entirely. This means that all of the MVs corresponding to the MVC positions may be included into the MVC list. Alternatively, step S1106 may be performed partly. This means that, for example, an obtained MV is checked against a part of the MVs already in the MVC list. This partial check refers to partial pruning. In one example, the partial pruning may be performed against the MVs of the MVC list (e.g. a number of N MVs), which have been included most recent.

The following embodiments of the present disclosure describe apparatus(es) and method(s) for (1) generating a pattern, including a spatial LDMVP pattern as a first pattern and/or a TMVP pattern as a second pattern, for (2) the generation of an MVC candidate list, including one or more MVCs of the TMVP pattern and/or the LDMVP pattern, and (3) altering further LDMVP pattern positions for those candidate positions for which motion information is not available and/or is not stored in a buffer.

First Embodiment

According to a first embodiment, an apparatus is provided for generating a list of MVCs, for a current CU, by determining a pattern specifying positions of MVs, relative to a position of the current CU. The pattern is determined at least in dependence on a size of the current CU, and a size of a grid specifying a minimum distance between two MV positions belonging to the pattern. One or more MVs specified by the MV positions of the pattern are included into the list of MVCs.

The size of the current CU may be the width and/or height of the current CU. The size of the grid may be determined by the grid spacing Gx and/or Gy, specifying a minimal distance between two positions belonging to the pattern. The grid sizes Gx and Gy may be in units of pixels. For example, Gx=4, means that the grid size along the x direction of the current frame has the amount of four pixels.

The pattern positions may be positions of MVCs of a first pattern or a second pattern. In the present disclosure, the first pattern refers to the spatial LDMVP pattern, while the second pattern refers to the TMVP pattern. However, the terms "first" and "second" are mere labels to differ among the LDMVP and TMVP pattern. Thus, the terms "first" and "second" have no limiting meaning in the present disclosure.

According to an embodiment, the pattern positions are determined in dependence on a first iteration value and/or a minimal or maximal size configurable for a CU.

The first iteration value refers to the number of iterations. The iteration value/number R may be predefined, may depend on the grid size or the maximum CU size. For example, in case of some hardware requirements with regard to the size of pattern in pixels, the number of iterations is determined by dividing of the pixel size by the grid size or the maximum CU size. In general, the number R may be recalculated "on the fly", depending on the CU size.

The minimal size for a CU may be 4×4 for VVC. For example, in current VVC, 4×4 blocks are used for intra-prediction, whereas for inter-prediction, a minimum luma block size may be 8×4 or 4×8. Alternatively, a 4×4 Luma blocks may be used only for Affine mode. In this mode, 4 adjacent Chroma blocks corresponding to one Luma block have the same MVs, so that a minimal Chroma block in VVC (considering inter prediction) is also 4×4. The grid size for motion information storage is still 4×4 for VVC.

The maximum size may be, for example, the maximum value of Gx and Gy, i.e. Max(Gx,Gy), with the values of Gx and/or Gy depending on the CU size.

For constructing the pattern, the following parameters may be used CU width w, CU height h, horizontal grid size Gx, vertical grid size Gy, number of iterations R, minimal horizontal offset minw, minimal vertical offset minh.

The output of this procedure is a set S of offsets defining positions of the pattern relative to the CU position. In the present disclosure, the position of the current block refers to the position of a top left sample of the current block.

Figure 12:
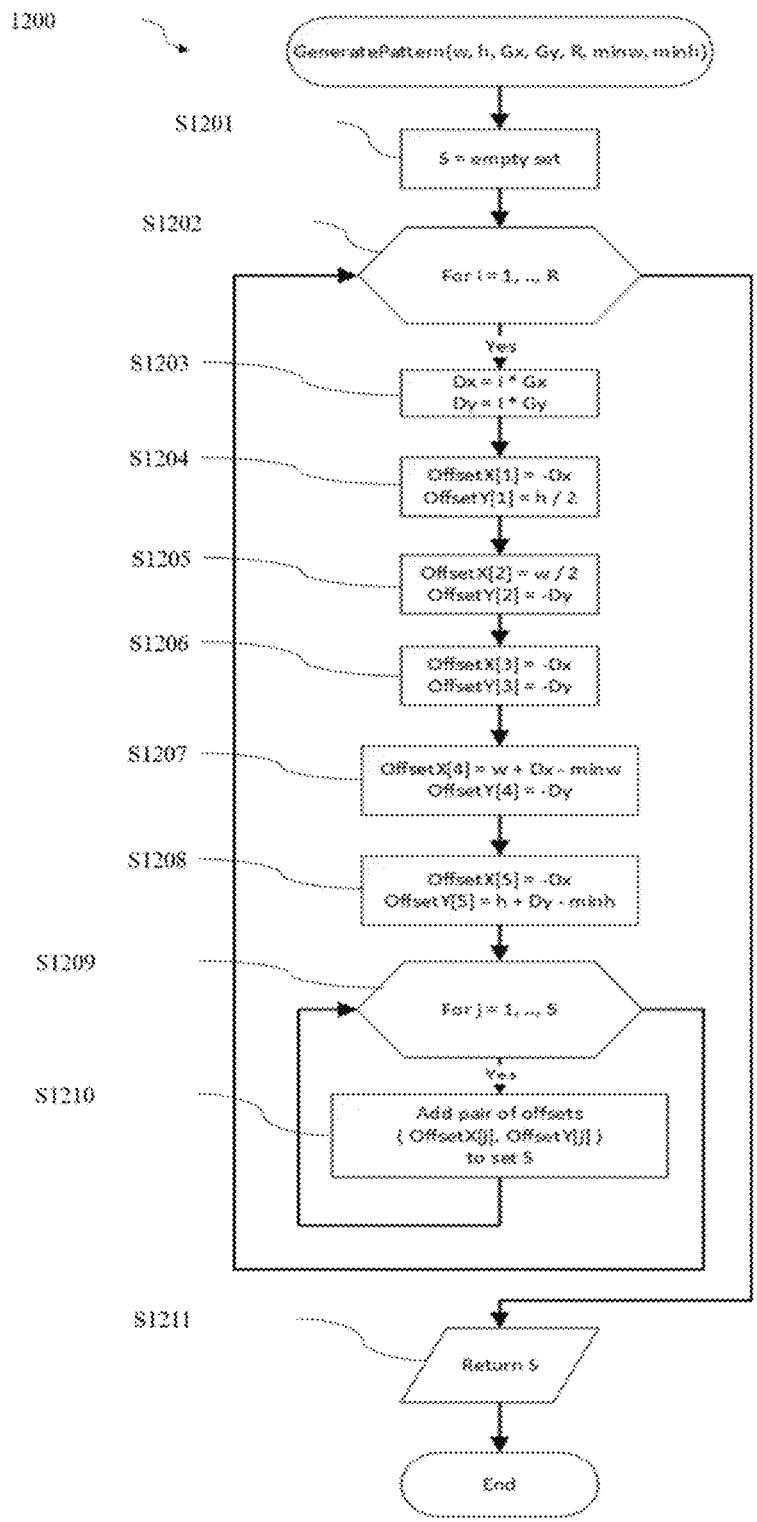
FIG. 12 is a flowchart of the PatternGeneration procedure.

The GeneratePattern (w, h, Gx, Gy, R, minw, minh) procedure 1200 is depicted in FIG. 12. The grid size Gx and Gy can be, for example, 4, 8, 16, 32, 64 or more. Gx and Gy may depend on the block size, i.e. the size of the current block/CU. For example, Gx may be equal to w and Gy may be equal to h of the current CU.

The number of iterations R may be for example 1, 2, 3, 4 or more. The value of the iteration number R may depend on the size of the CU. In one example, a larger R value is used for the CU with big size and a smaller R value is used for the small size CU.

The iteration number or iteration value R determines the size of a pattern. The size of a pattern means the extent of the pattern positions in terms of their largest distance relative to the current CU position. In the present disclosure, the current CU position taken as the reference position is the top-left position of the current CU. The distance may be defined in units of pixels. The distance may be calculated using a metric, such as a Euclidian metric. The size of a pattern may be also determined by the grid size. The grid size refers to a minimal distance between MV positions belonging to a pattern.

Thus, iteration value R and grid size along the x and y direction, Gx and Gy, determine the size of the pattern. The iteration value determines how many pattern positions are created along a certain direction. The direction may be along the x-axis only, the y-axis only, and/or along the x- and y-axis combined.

The minimal horizontal offset minw may be, for example, equal to the minimum CU width or minimum inter-CU width or equal to 4, 8 or more. The minimal vertical offset minw may be, for example, equal to the minimum CU height or minimum inter-CU height or equal to 4, 8 or more. For some codecs, the minimum CU width/height and minimum inter-CU width/height may be different.

With the above input parameters, a LDMVP pattern may be generated as a first pattern by the procedure GeneratePattern to generate a set S of LDMVP candidate positions as follows.

Initially, the set S is empty (step S1201). In step S1202, the subsequent steps are executed R times. At each iteration step "i", the increments Dx and Dy are determined depending on the grid size Gx and Gy (step S1203). This means that at each iteration step, a candidate position is determined with respect to the reference position. Here, the reference position is the top-left position of the current CU. Alternatively, any other position may be used a reference.

In one exemplary embodiment of the present disclosure, the pattern generated consists of five pattern "arms" j=1, . . . , 5, represented in the flowchart of FIG. 12 by the offset components OffsetX(1) to OffsetX(5) and OffsetY(1) to OffsetY(5). At each iteration step "i", the pair {OffsetX(j),OffsetY(j)} thus defines a candidate position of the j-th pattern "arm". The term "arm" means a subset of candidate positions of the pattern generated along a certain direction. The direction is specified in terms of the Dx, Dy increments and the input parameters. The candidate positions of an "arm" may be referred to as a series, defining a subset of candidate positions Sj for the j-th arm.

In the example of FIG. 12, the respective candidate positions are determined for each "arm" j=1, . . . , 5 in steps S1204 to S1208. In steps S1209 and S1210, the offset x-y components are included into the set S as an offset pair {OffsetX(j),OffsetY(j)}. The final set S is provided as output in step S1211.

Figure 13:
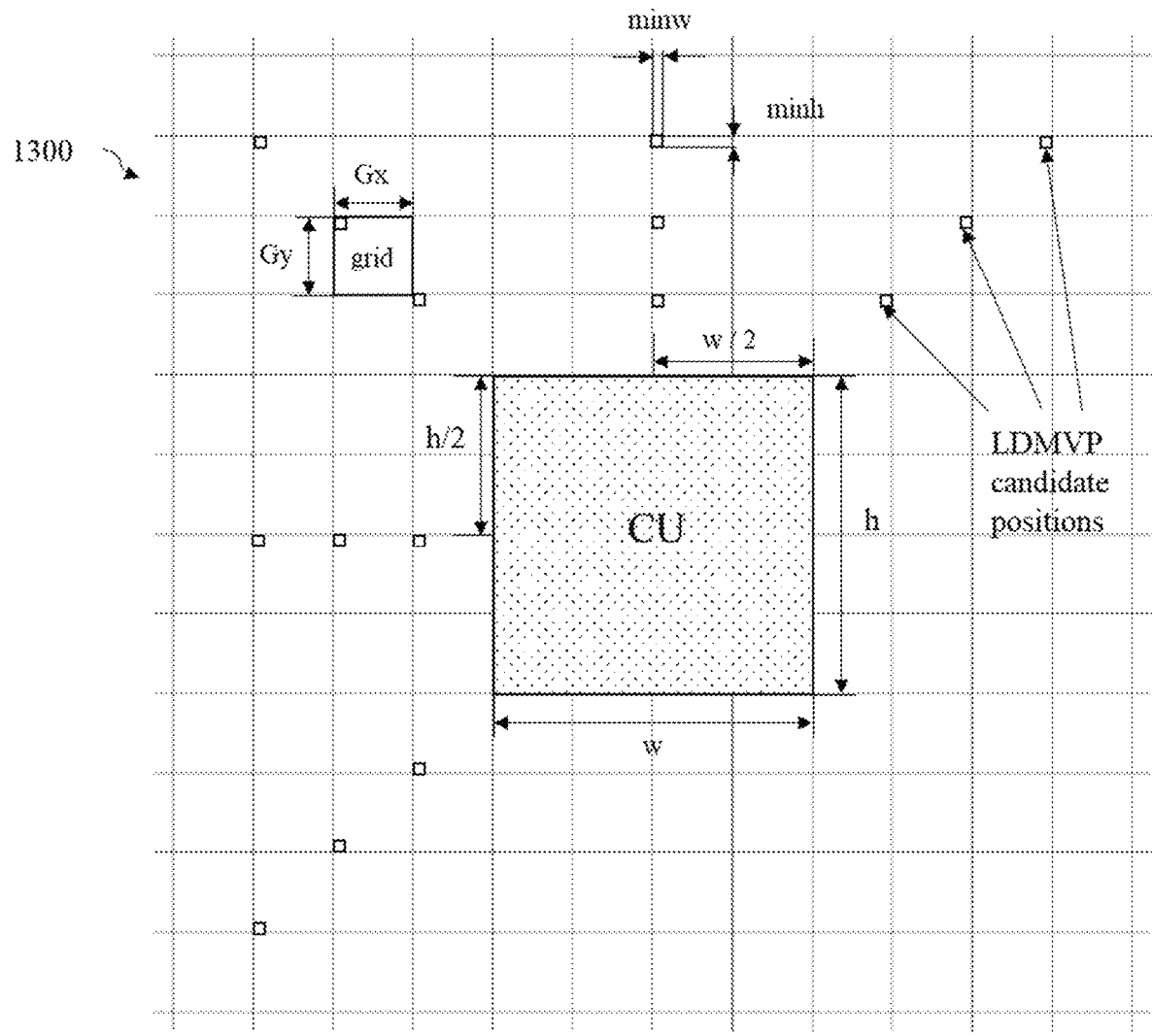
FIG. 13 is an example of a LDMVP "sun" pattern generated by the PatternGeneration procedure for three iterations R=3.
Figure 14:
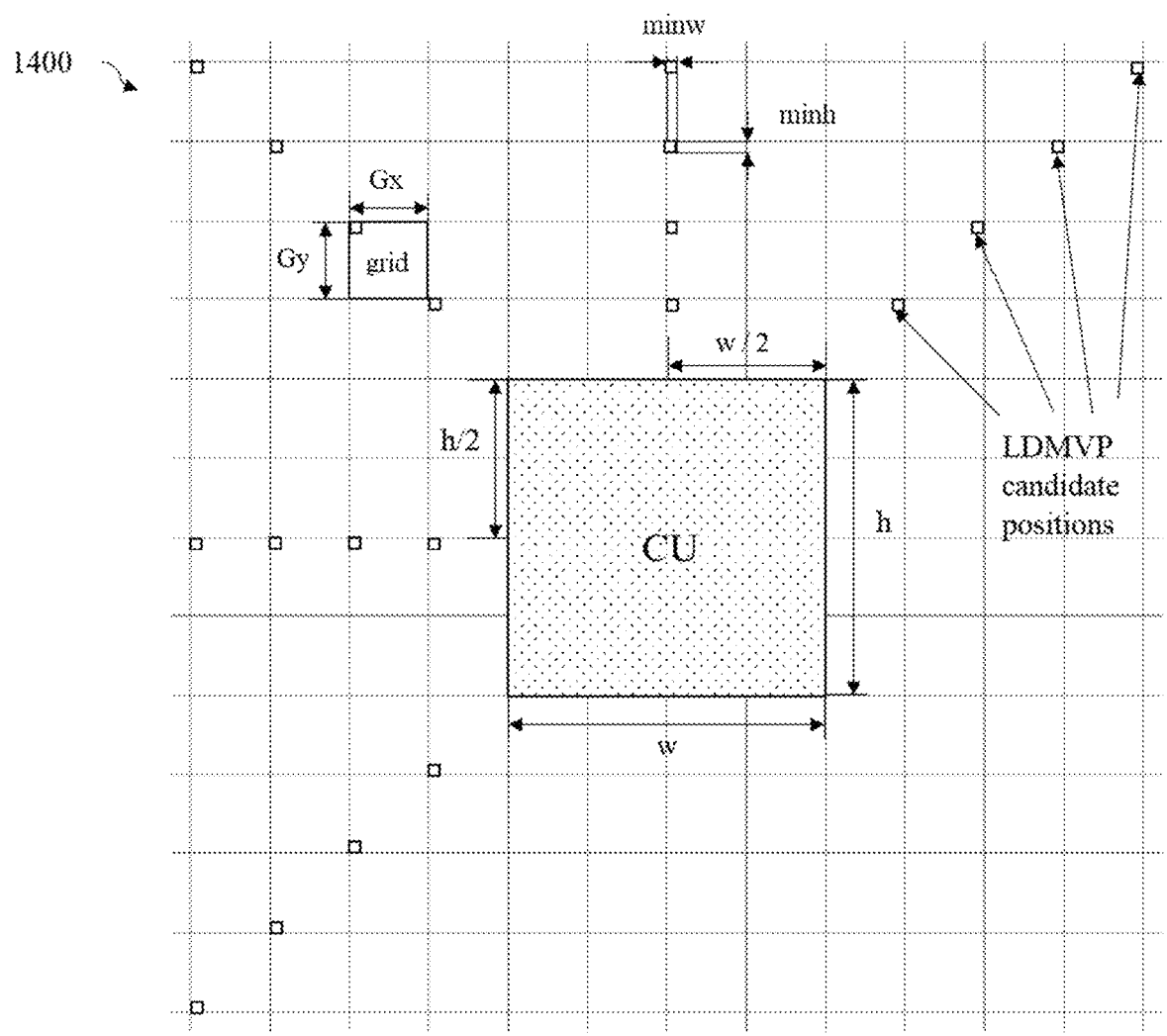
FIG. 14 is an example of a LDMVP "sun" pattern generated by the PatternGeneration procedure for four iterations R=4.

An example of a generated pattern using the above procedure GeneratePattern(w, h, Gx, Gy, R, minw, minh) is shown in FIG. 13, using the parameters w=128, h=128, Gx=32, Gy=32, R=3, minw=4, minh=4. Another example is shown in FIG. 14 for w=128, h=128, Gx=32, Gy=32, R=4, minw=4, minh=4.

The pattern generated using the directions of the pattern "arms" as described above with reference to FIG. 12 have in common that the MV pattern positions are located at the top-left, top, top-right, left, and bottom-left parts neighboring the current CU. As may be discerned from FIG. 13 ("sun" LDMVP pattern 1300 for R=3) and FIG. 14 ("sun" LDMVP pattern 1400 for R=4), each series contains three or four candidate positions corresponding to the iteration value of R=3 or R=4, respectively. This illustrates how the first iteration value R determines the size of the pattern.

In the present disclosure, a pattern with the "arm" directions generated by the GeneratePattern procedure described above, is referred to as "sun" pattern.

Figure 15:
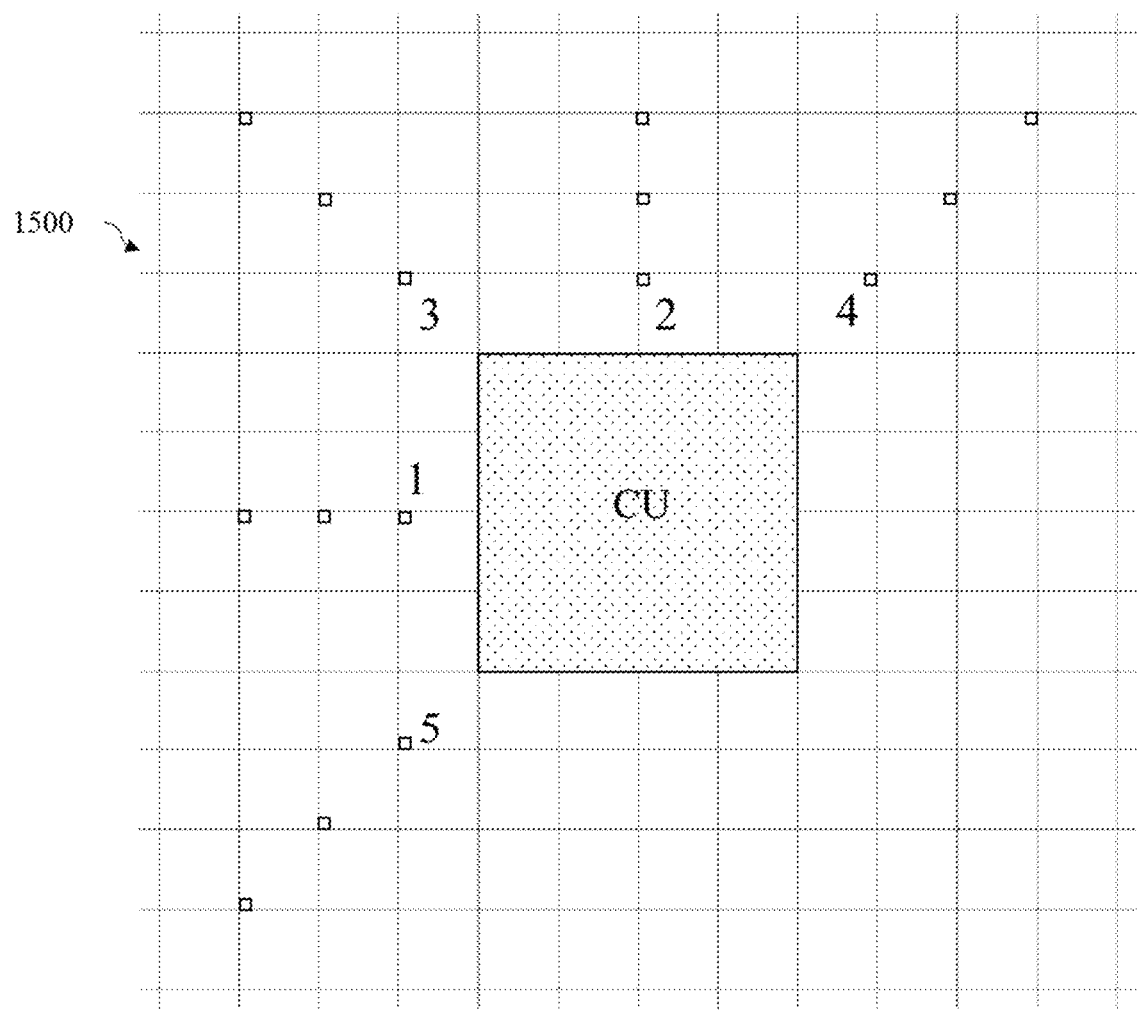
FIG. 15 is an example of the candidates order at iteration 1 for the "sun" pattern positions generated by the PatternGeneration procedure for R=3.
Figure 16:
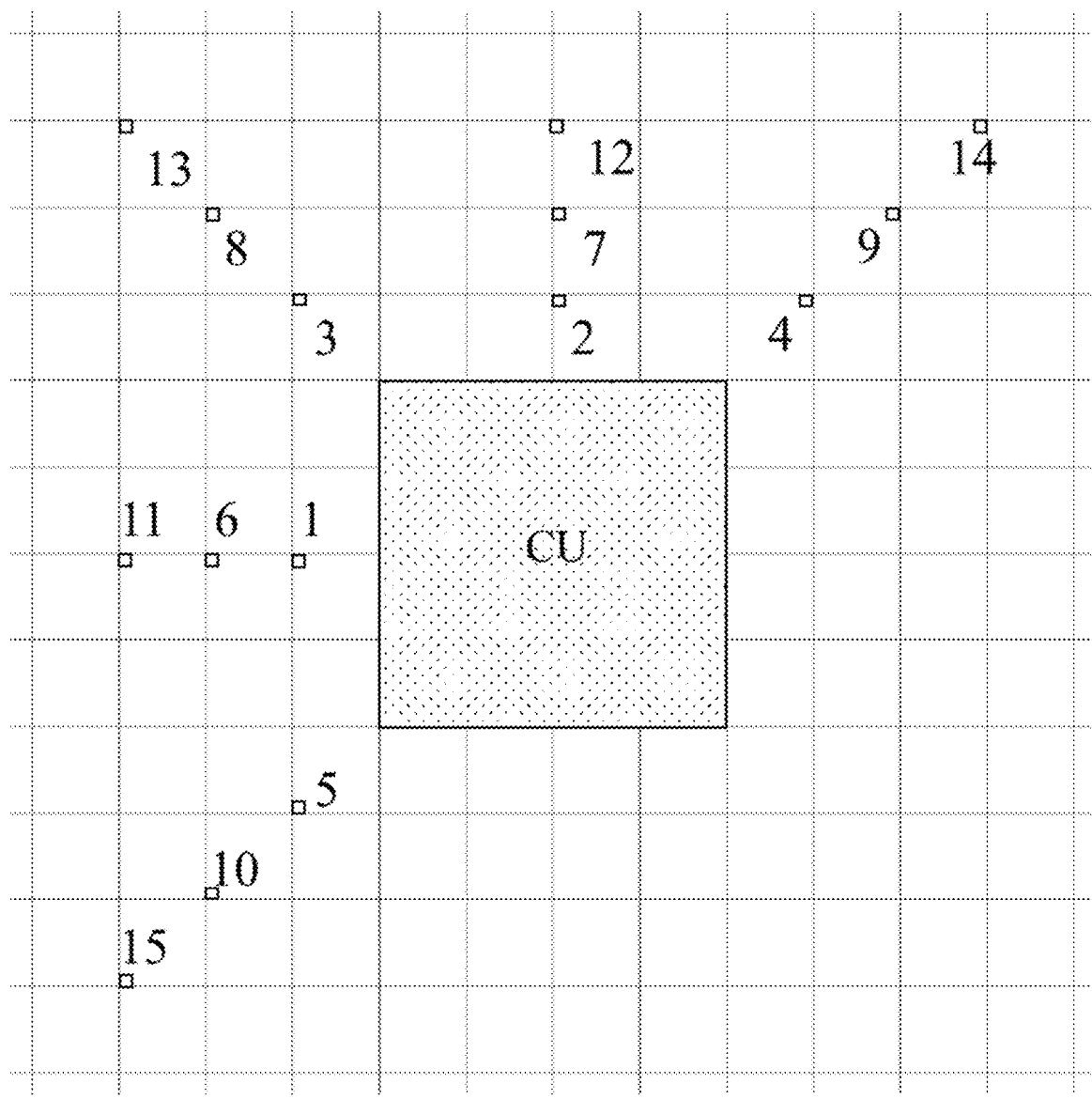
FIG. 16 is an example of the candidates order at iteration 3 for the "sun" pattern positions generated by the PatternGeneration procedure for R=4.

The final LDMVP candidate list is generated, using the candidates from the set S. The pairs of offset values for each of the arms may be added to the set S in various ways, depending on the arm index "j" and/or the iteration number "i". For example, the candidates obtained in iteration 1 may be added first to the list, followed by candidates obtained in iteration 2 and so on. The order of adding the candidates within one iteration may be, for example, clockwise or counterclockwise. FIG. 15 ("sun" LDMVP pattern candidate order 1500 at iteration 1 (R=3)) and FIG. 16 ("sun" LDMVP pattern candidate order 1600 at iteration 3 (R=4)) show examples of candidate ordering for one iteration and three iterations respectively, with the order being based on probabilities of suitable motion sources.

Compared to existing search patterns, the proposed "sun" patterns of the present disclosure remove those positions that are less likely to provide useful motion information and/or MV information.

This may provide an advantage of reducing the number of candidate positions and retaining coding gain.

According to an embodiment, the processing circuitry is configured to adapt the grid size in dependence on the size of the current CU and/or a minimum and maximum value of the grid size.

This means that the horizontal grid size Gx and vertical grid size Gy may depend on the CU size. For example, Gx may be equal to w and Gy may be equal to h. If the number of iterations R is fixed, the pattern size will be small for the small blocks and huge for the big blocks. Having a too small pattern size causes a coding loss, because the search range is rather small. Having a too big pattern size requires access to a big amount of motion information that may not be located in a cache, which may cause problems for software and hardware implementations. This problem may be solved by imposing further restrictions on the grid size.

The minimum and maximum value of the grid size are referred to the parameters minGridSize and maxGridSize.

In one exemplary embodiment of the present disclosure, the grid size depends on the block size and two parameters minGridSize and maxGridSize. This means that the grid size Gx is obtained as minGridSize, if the CU width w is less than minGridSize. It is obtained as maxGridSize, if the CU width w is greater than maxGridSize, and as w in the other cases. The same prescription may be applied for Gy. The value of minGridSize may be, for example, 4, 8 or 16. The value of maxGridSize may be, for example, 32, or 64.

In order to prevent that the patterns are too small or too big, another approach for an adaptive grid size may be used instead of fixing the number of iterations R, the search range is fixed. A search range may be defined as the maximum distance from the CU to the candidate positions in a horizontal and vertical direction. For example, for the pattern depicted in FIG. 18, the search range is restricted to 3*max (Gx, Gy). For the pattern depicted in FIG. 19 which shows combined LDMVP+TMVP pattern 1900 for R=3 and Rt=2, the search range is restricted to 4*max(Gx, Gy). The number of iterations R may be calculated as searchRange/max(Gx, Gy).

The drawback of this method is that the number of iterations R is too big for the small blocks. For example, for the search range 128 and a 4×4 block, R is equal to 32. Hence, if the pattern contains 5 positions for each iteration as pattern depicted in FIG. 18, the number of candidate positions in this case is equal to 32*5=160.

This problem may be solved, by restricting an iteration number restriction as proposed. The maximum number of iterations Rmax may be 4, 5, 6, 7, 8 or more. Thus, the number of iterations R is calculated as min(Rmax, searchRange/max(Gx, Gy)). For most cases, the encoding performance with a restriction of Rmax=8 is close to the performance of the unrestricted version. But the final number of checked positions in the pattern in this case may be reduced, for example, from 160 to 40.

For example, the restrictions may be the as follows minGridSize=8, maxGridSize=64, and Rmax=6. In this case, for example, for a CU having a size of 4×128 and a searchRange=128, Gx is equal to 8, Gy is equal to 64, and R=2. For a CU having a size of 4×4 and a searchRange=128, Gx is equal to 8, Gy is equal to 8, and R=6.

In case of using the adaptive grid size technique discussed above, the grid may be rectangular if Gx is not equal to Gy. The software and hardware implementation of the LDMVP algorithm may be further simplified by the use of square grids. The side of the square G=Gx=Gy may be calculated depending on the CU width w and CU height h. The square side G may be calculated, for example, using the following equations:

$G=\max(w,h)$.

$G=\min(w,h)$.

$G=(w+h+1)\gg 1$ ($\gg x$ means right shift of integer value, that is the same as integer division on $2x$).

$G=(w+h)\gg 1$.

G is set equal to a value with power of two that is nearest to $(w+h+1)\gg 1$.

G is set equal to a value with power of two that is nearest to $(w+h)\gg 1$.

$1\ll((k+r+1)\gg 1)$ with $w=2k, h=2r$ ($\ll x$ means left shift of integer value that is the same as multiplying by $2x$).

$1\ll((k+r)\gg 1)$ with $w=2k, h=2r$.

A pattern generated according to the first embodiment may be a spatial LDMVP pattern. In this disclosure, a LDMVP pattern is referred to as a first pattern.

According to an embodiment, the processing circuitry of the apparatus is configured to determine adjacent positions specifying MV positions within the current video frame different from the first pattern and to combine the adjacent points with the first pattern.

Figure 6:
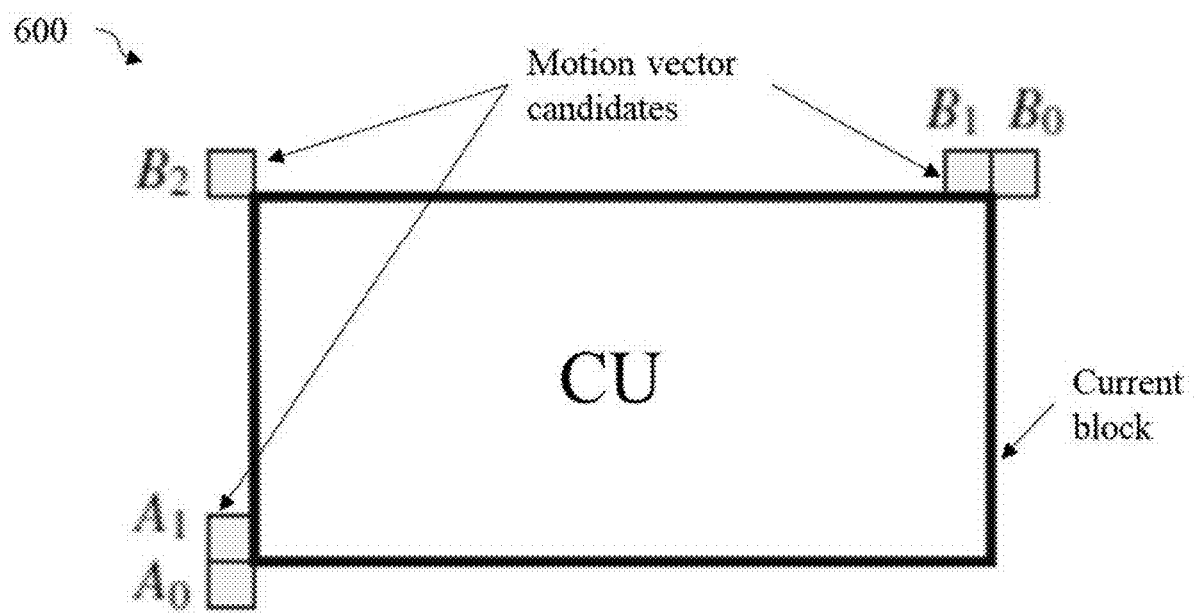
FIG. 6 is an example of locations for spatial MVP candidates (for merge mode) in the HEVC standard.
Figure 7:
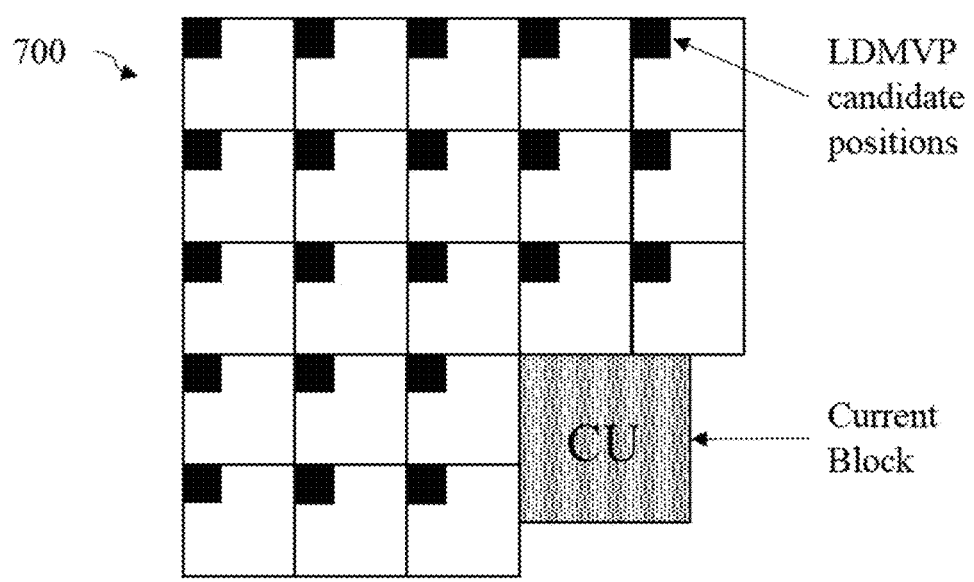
FIG. 7 is an example of a LDMVP pattern referred to as "square" LDMVP pattern.

This means that, in addition to the conventional adjacent merge candidates shown in FIG. 6 that shows MVP candidates 600, other adjacent candidates may be added to the LDMVP candidates. The adjacent candidate positions are therefore also spatial candidate points, since they are located around the CU at those positions where motion information is available at the moment of encoding/decoding.

Thus, a pattern such as the LDMVP pattern generated by the procedure GeneratePattern and amended by adjacent MVC points may be considered as a new LDMVP pattern.

Figure 27:
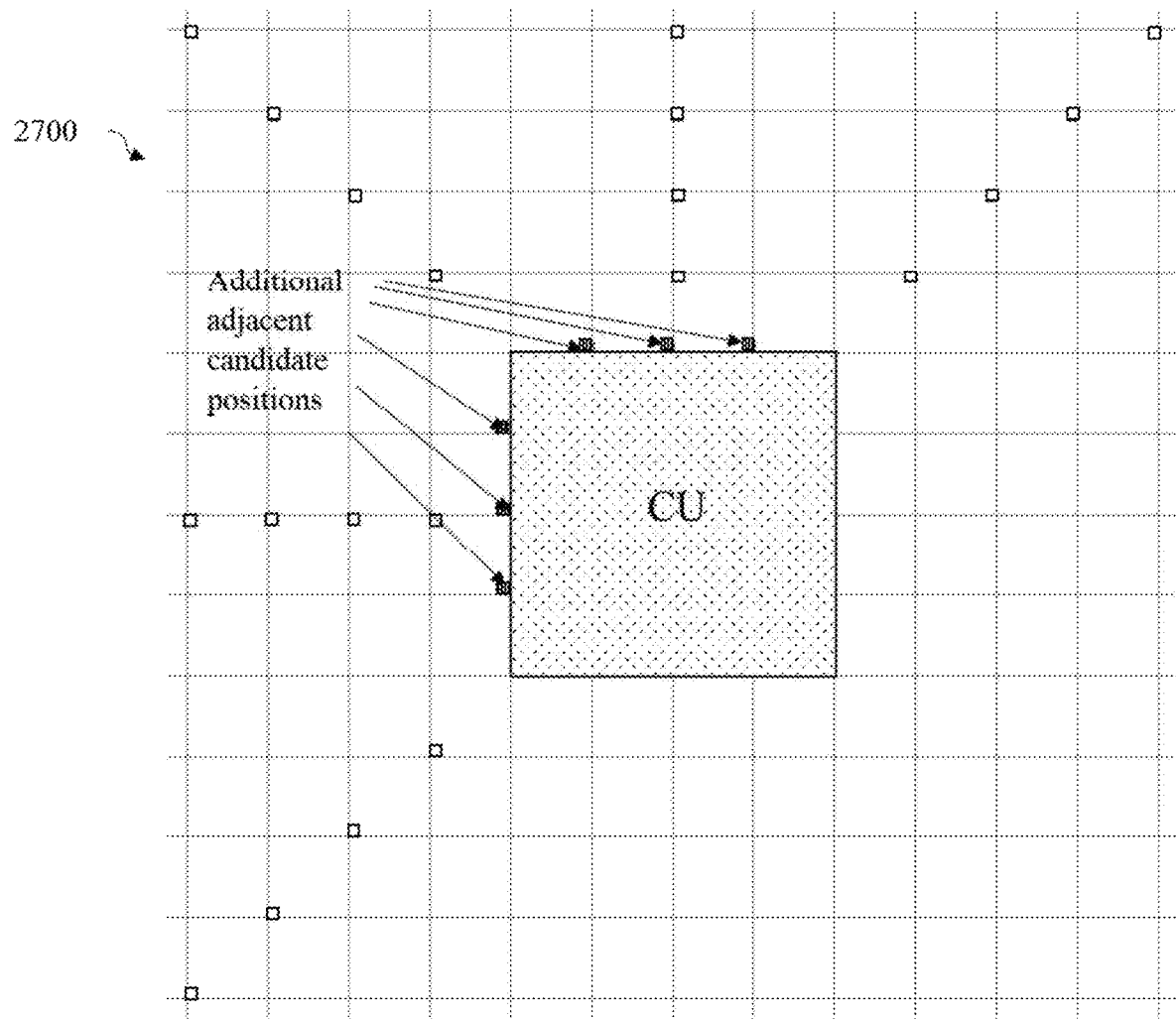
FIG. 27 is an example of a LDMVP pattern amended by adding six adjacent candidate points.
Figure 28:
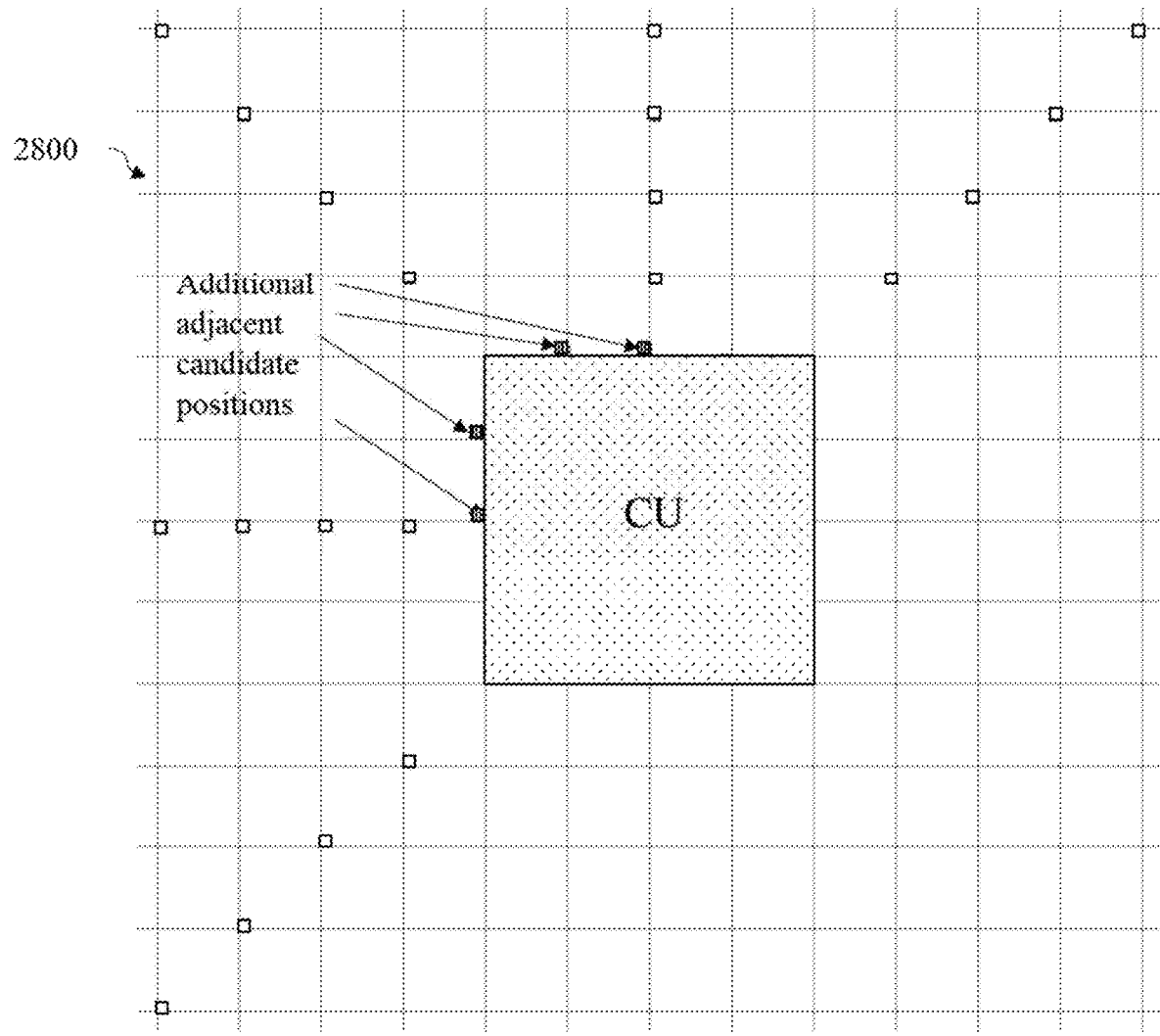
FIG. 28 is an example of a LDMVP pattern amended by adding four adjacent candidate points.

The examples of patterns containing both LDMVP and the additional adjacent candidates are depicted in FIGS. 27 and 28, with the adjacent candidates located at the left and top of the current CU, where motion information is available at the moment of encoding/decoding a current video frame.

A pattern generated according to the first embodiment may also be a TMVP pattern. In this disclosure, a TMVP pattern is referred to as a second pattern.

The use of a TMVP pattern, possibly combined with a LDMVP pattern, is motivated from the circumstance that LDMVP patterns in most cases, such as the LDMVP patterns shown in FIGS. 8 to 11 or the "sun" pattern of the present disclosure, do not contain MVCs from the right side and from the bottom of the current CU. This is because the CUs are normally traversed in a raster order.

Consequently, the motion information from the right and from the bottom is not available at the moment of encoding/decoding of the current CU. Thus, a LDMVP pattern may provide motion information for a CU in a current video frame, since the candidate positions are located in the top-left, top, top-right, left, and/or bottom-left part with respect to the position of the current CU. In order to use also motion information not available at the instance of encoding/decoding, additional TMVP candidates (described in H.265/HEVC standard) are added to the MVC list.

These candidates use motion information from the previous frame, which is different from the current video frame and for which motion information is available for the entire frame in general. Consequently, the positions of TMVP candidates may be located on the right side and/or at the bottom of the current CU. The term TMVP refers to TMVPs to reflect that the positions and respectively the motion information may be taken from a video frame, for example, a previous video frame different from the current video frame.

Since the TMVP candidate positions are expected to be from the bottom and the right side of the current CU, the TMVP pattern (i.e. second pattern) is different from the LDMVP pattern (i.e. first pattern).

In one exemplary embodiment, the TMVP pattern may be generated by a procedure GeneratePatternTmvp(w, h, Gx, Gy, Rt, minw, minh), with the parameters CU width w, CU height h, horizontal grid size Gx, vertical grid size Gy, number of iterations R, number of iterations Rt (for TMVP candidates), minimal horizontal offset minw, and minimal vertical offset minh.

Thus, a TMVP pattern is also generated in dependence on an iteration value and/or a minimal or maximal size configurable for a CU.

The iteration value Rt of the TMVP pattern may be equal or different from the iteration value R used for the LDMVP pattern. This means that the size of the TMVP pattern may be different from the size of the LDMVP pattern.

This may provide an advantage of adapting the size of each pattern and thus the range from which motion information may be used with respect to the current CU position.

Figure 17:
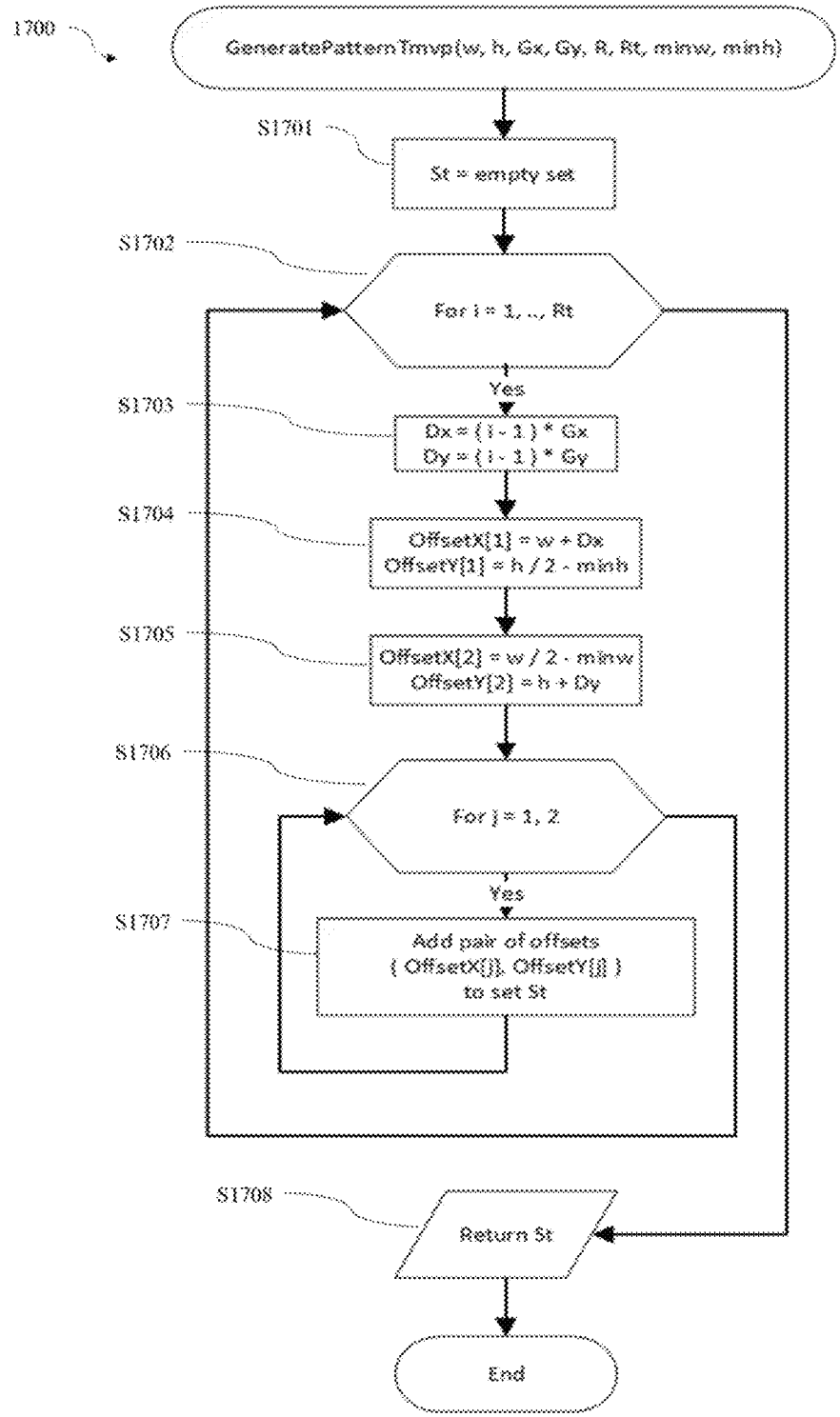
FIG. 17 is a flowchart of the GeneratePatternTMVP procedure.

An example of the GeneratePatternTmvp(w, h, Gx, Gy, Rt, minw, minh) procedure 1700 implementation is depicted in FIG. 17. The manner in which TMVP candidate positions are generated in similar to the procedure GeneratePattern for the LDMVP pattern. The procedure provides a set St of TMVP candidate points.

With the above input parameters, a TMVP pattern may be generated as a second pattern by the procedure GeneratePatternTmvp to generate a set St of TMVP candidate positions as follows.

Initially, the set St is empty (step S1701). In step S1702, the subsequent steps are executed Rt times. At each iteration step "i", the increments Dx and Dy are determined depending on the grid size Gx and Gy (step S1703). This means that at each iteration step, a TMVP candidate position is determined with respect to the reference position, which is here the top-left position of the current CU.

In one exemplary embodiment of the present disclosure, the TMVP pattern generated consists of two pattern "arms" j=1, ..., 2, represented in the flowchart of FIG. 17 by the offset components OffsetX(1) to OffsetX(2) and OffsetY(1) to OffsetY(2). At each iteration step "i", the pair {OffsetX(j),OffsetY(j)} thus defines a TMVP candidate position of the j-th pattern "arm". Similar to the LDMVP pattern generated by the GeneratePattern procedure discussed above, the term "arm" refers to a subset of candidate positions of the pattern generated along a certain direction. The direction is specified in terms of the Dx, Dy increments and the input parameters of the GeneratePatternTmvp procedure. The TMVP candidate positions of an "arm" may be referred to as a series, defining a subset of candidate positions Stj for the j-th arm.

In the example of FIG. 17, the respective candidate positions are determined for each "arm" j=1, . . . , 2 in steps S1704 to S1705. In steps S1706 and S1707, the offset x-y components are included into the set St as an offset pair {OffsetX(j),OffsetY(j)}. The final set St is provided as output in step S1708.

Figure 18:
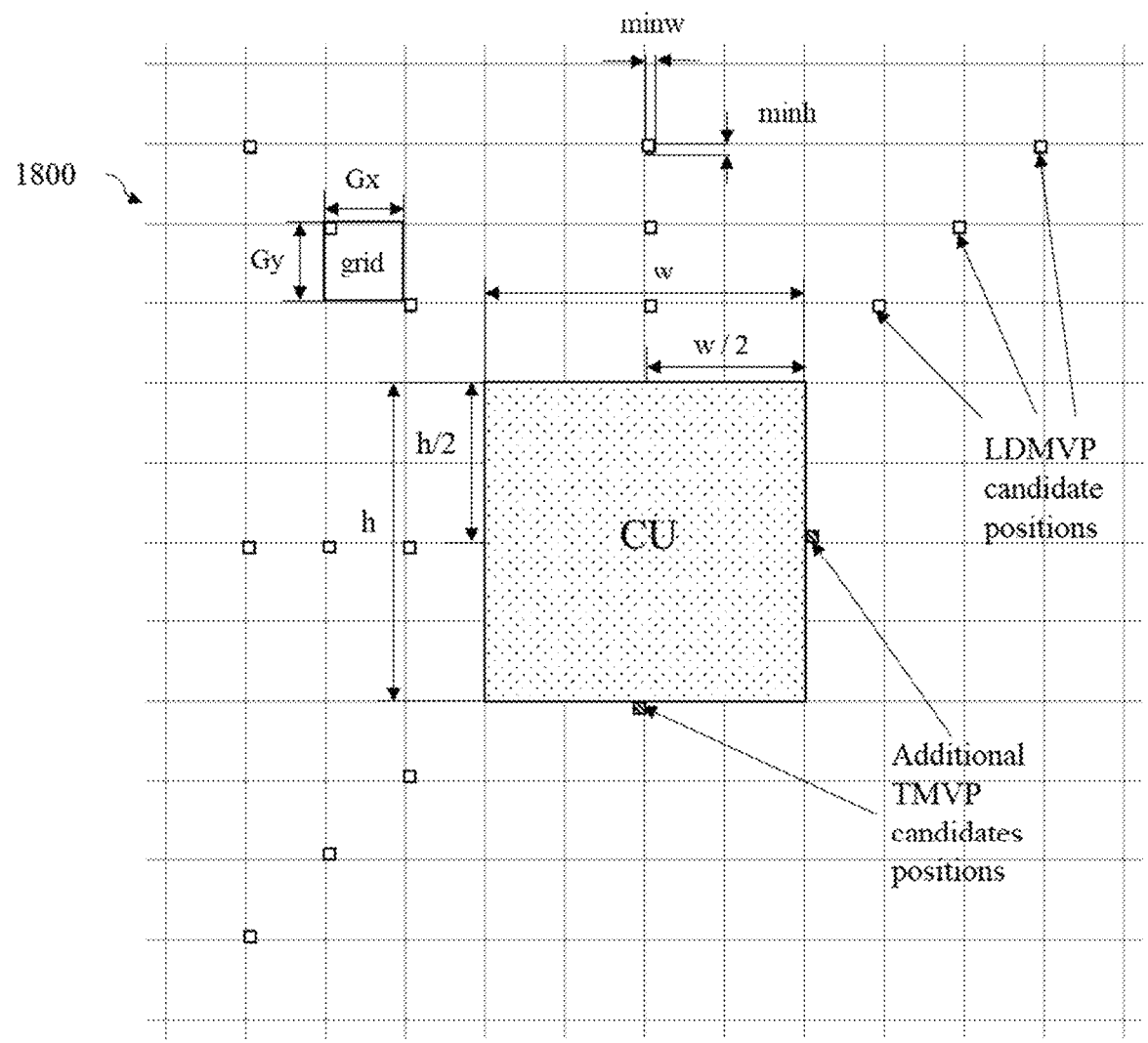
FIG. 18 is an example of a pattern combined from LDMVP pattern positions for three iterations R=3 and TMVP pattern positions for one iteration Rt=1.
Figure 19:
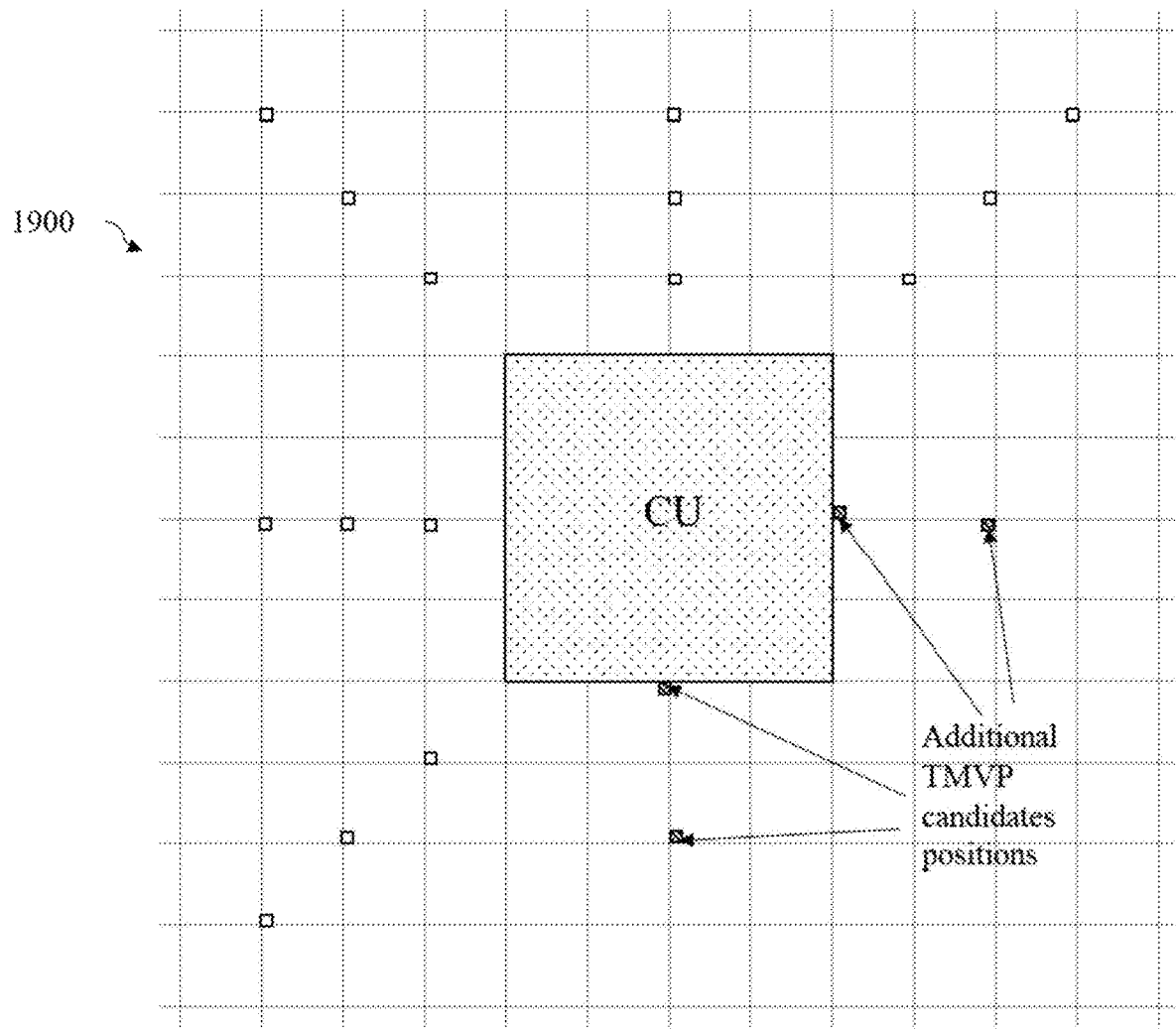
FIG. 19 is an example of a pattern combined from LDMVP pattern positions for three iterations R=3 and TMVP pattern positions for two iterations Rt=2.
Figure 20:
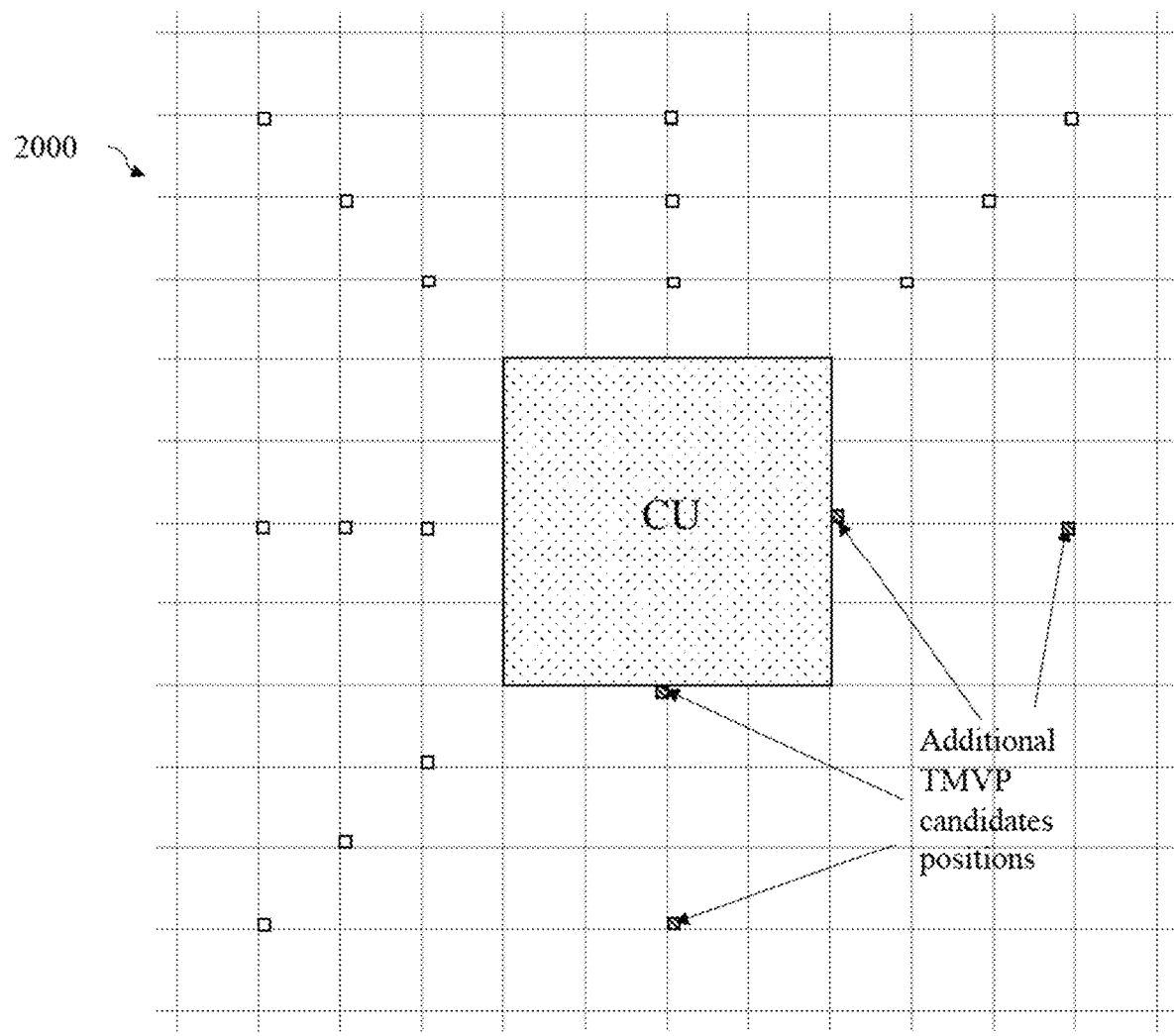
FIG. 20 is a second example of a pattern combined from LDMVP pattern positions for three iterations R=3 and TMVP pattern positions for two iterations Rt=2.

FIGS. 18 to 21 show examples of TMVP patterns, together with LDMVP patterns. FIG. 20 shows combined LDMVP+TMVP pattern 2000 for R=3 and Rt=2

Second Embodiment

In the first embodiment of the present disclosure, a pattern is generated which may be a first pattern (i.e. a LDMVP pattern) and/or a second pattern (i.e. a TMVP pattern). These patterns may now be used individually and/or through combining the first and second pattern, and include MVCs from the patterns into a MVC list.

According to a second embodiment of the present disclosure, an apparatus is provided for generating a list of MVCs, for a current CU. The apparatus comprises a processing circuitry configured to include into the list of MVCs one or more MVs, determined from a first pattern specifying MV positions within a current video frame in which the current CU is located, and one or more MVs determined from a second pattern specifying MV positions in a video frame different from the current video frame.

The generated MVC list may have one or more MVCs. The MVC list may not include all MVCs from the first pattern and/or second pattern. This means that a subset of MVCs from the first pattern and/or second pattern may be included into the MVC list. This may include also that none of the MVCs may be included from the first pattern and/or second pattern. This means that the MVC list may be empty and/or includes, for example, MVCs from the second pattern only or first pattern only.

The first pattern of MV positions within the current video frame may be a spatial LDMVP pattern. The second pattern of MV positions within a video frame different from the current frame may be a TMVP pattern.

The MVC list may be a common list for the spatial MVCs and the temporal MVCs. The common list may be also referred to as a merge list or AMVP (advanced MV prediction) list. AMVP is a predictive MV coding technique. The procedure is as follows CODEC construct a MVPs list and the index in this list is signaled. Together with the index the difference between the MVP and coded MV (also referred to as MV difference (MVD)) is signaled.

In one exemplary embodiment, the AMVP list may also include other candidates, such as so-called bi-combined candidates, pairwise candidates etc. Similar applies to the merge list, which may also include other candidates e.g. bi-combined candidates, pairwise candidates etc.

The first and second pattern may be a sub-pattern of a single joint-pattern.

The MV positions within the current frame may be with reference to a position of the current CU located within the current frame. In the present disclosure, the reference position of the CU may be the top-left corner of the current CU.

The MV positions in the frame different from the current frame may be with reference to the current CU. This means that MV positions of the first pattern and the second pattern have the same reference position ("basic position").

Alternatively, the MV positions of the second pattern (i.e. TMVP pattern) may have a "basic position" determined according to some MV position, for example, from one of blocks neighboring the current CU. In other words, the reference position of a TMVP pattern and the reference position of a LDMVP pattern may be different. The same approach is used in VVC in the ATMVP technique (also known as subblock-based temporal motion vector prediction (SbTMVP)). For example, an offset between basic positions of the first pattern and the second pattern may be set according to the first MV in the MVC list (in most cases, it is a candidate corresponding to one of adjacent blocks).

A video frame different from a current video frame may be a frame that has been encoded/decoded prior to the current frame. This means that said different frame is previously processed (i.e. encoded/decoded) and may be stored in a buffer. The different frame prior to a current frame may be a previous frame to the current frame or following in the displaying order.

A combined pattern consisting of LDMVP and TMVP candidates, i.e. the candidate positions of the first pattern (LDMVP) and the second pattern (TMVP), is shown in FIGS. 18 to 21. The combined/joint pattern is constructed through consistent application of the respective procedures GeneratePattern(w, h, Gx, Gy, R, minw, minh) and GeneratePatternTmvp(w, h, Gx, Gy, Rt, minw, minh) procedures with the parameters CU width w, CU height h, horizontal grid size Gx, vertical grid size Gy, number of iterations R, number of iterations Rt (for TMVP candidates), minimal horizontal offset minw, and minimal vertical offset minh.

These are the procedures corresponding to the apparatus and method to generate a pattern according to the first embodiment, with their respective implementations shown by the flowcharts in FIGS. 12 and 17.

The iteration value Rt of the TMVP pattern may be equal or different from the iteration value R of the LDMVP pattern. This means that the size of the TMVP pattern may be different from the size of the LDMVP pattern.

This may provide an advantage of adapting the size of each pattern and thus the range from which motion information may be used with respect to the current CU position.

The output of these procedures is two sets set S contains the offsets for the spatial LDMVP candidates for the current video frame (first pattern) and the set St contains the offsets for the additional TMVP candidates for a different video frame (second pattern).

The term "Offsets" means position offsets relative to the CU position (position of the current block means the position of a top left sample of the current block).

Figure 21:
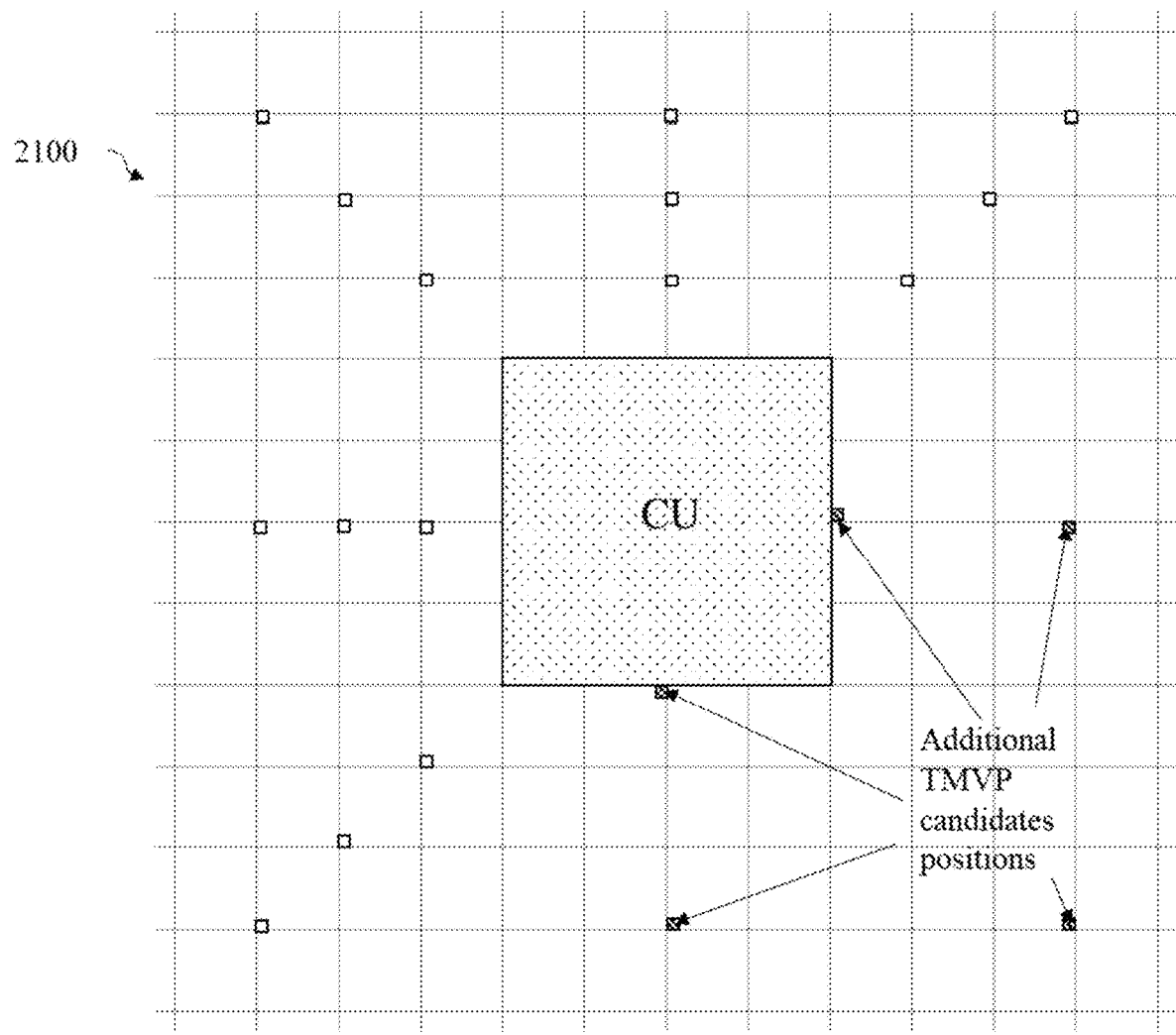
FIG. 21 is a third example of a pattern combined from LDMVP pattern positions for three iterations R=3 and TMVP pattern positions for two iterations Rt=2.

The result of applying the GeneratePattern(w, h, Gx, Gy, R, minw, minh) and GeneratePatternTmvp(w, h, Gx, Gy, Rt, minw, minh) procedures with the parameters Gx=32, Gy=32, R=3, Rt=1, minw=4, minh=4, so as to obtain a combined pattern including candidate positions of the LDMVP pattern (first pattern) and TMVP pattern (second pattern), is depicted in FIG. 18. Further examples of combined LDMVP and TMVP patterns are depicted in FIGS. 19 to 21.

The final candidate list is generated using the candidates from the sets S and St. The candidate positions from the set S of the LDMVP pattern and set St of the TMVP pattern may be combined in any order.

For example, the candidate positions may be combined according to the following order:
  Candidates obtained on iteration 1 of procedure GeneratePatternTmvp, Candidates obtained on iteration 1 of procedure GeneratePattern, Candidates obtained on iteration 2 of procedure GeneratePatternTmvp, Candidates obtained on iteration 2 of procedure GeneratePattern, and so on.

Figure 22:
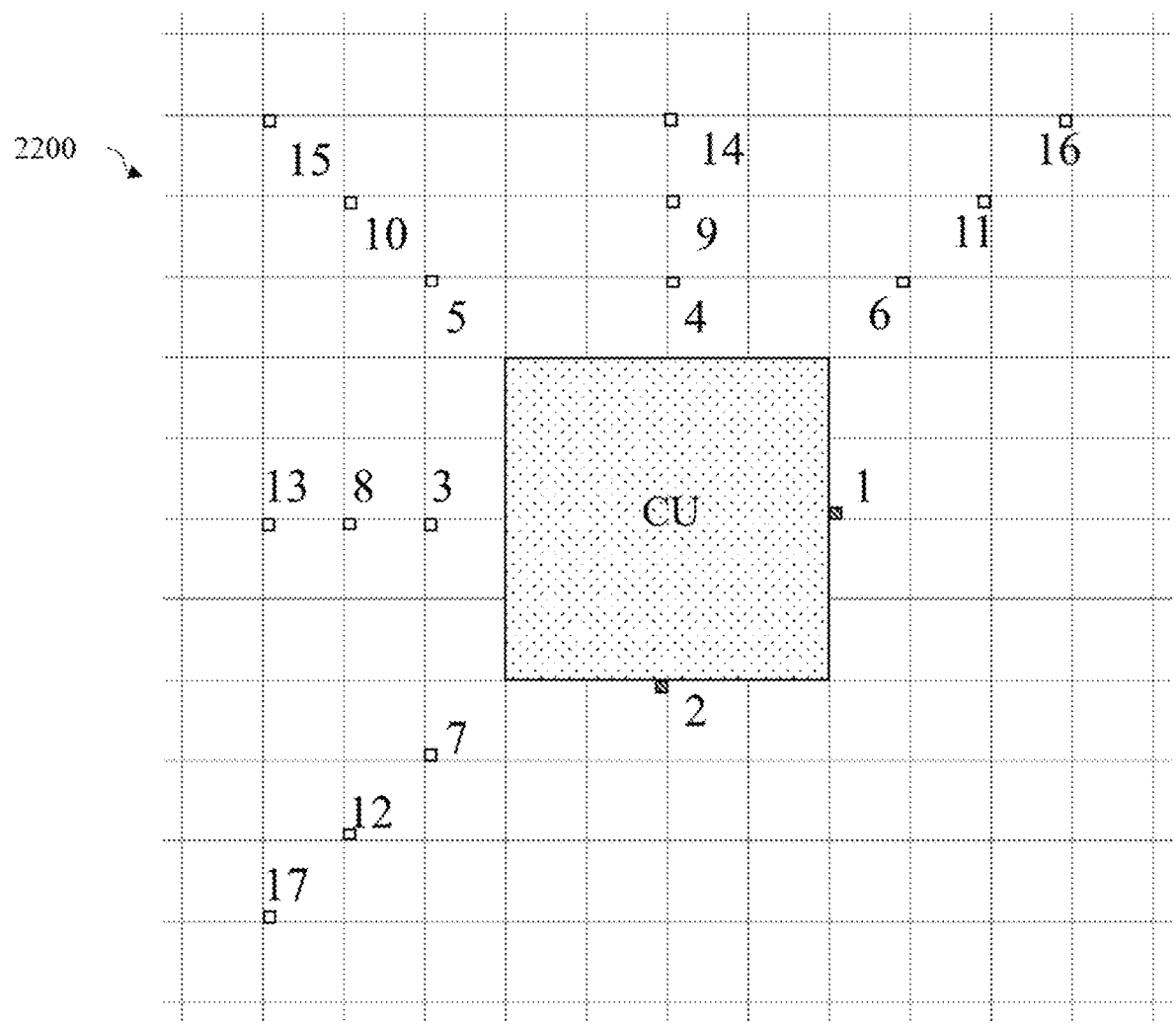
FIG. 22 is an example of the candidates order of a LDMVP+TMVP pattern for R=3 and Rt=1.

The order of LDMVP candidates within one iteration may be, for example, as depicted in FIG. 15 where "sun" LDMVP pattern candidate order 1500 at iteration 1 (R=3) or, alternatively, clockwise or counterclockwise. An example of a candidate order 2200 for LDMVP+TMVP candidates with R=3 and Rt=1 is depicted in FIG. 22.

As shown in the examples of FIGS. 19 to 21, in the present disclosure, the number of positions of the TMVP candidates are less than the number of LDMVP positions.

In one exemplary embodiment, only those TMVP candidates, the positions of which are located within the same CTU row in the collocated reference picture, are added to the MVC candidate list.

Figure 23:
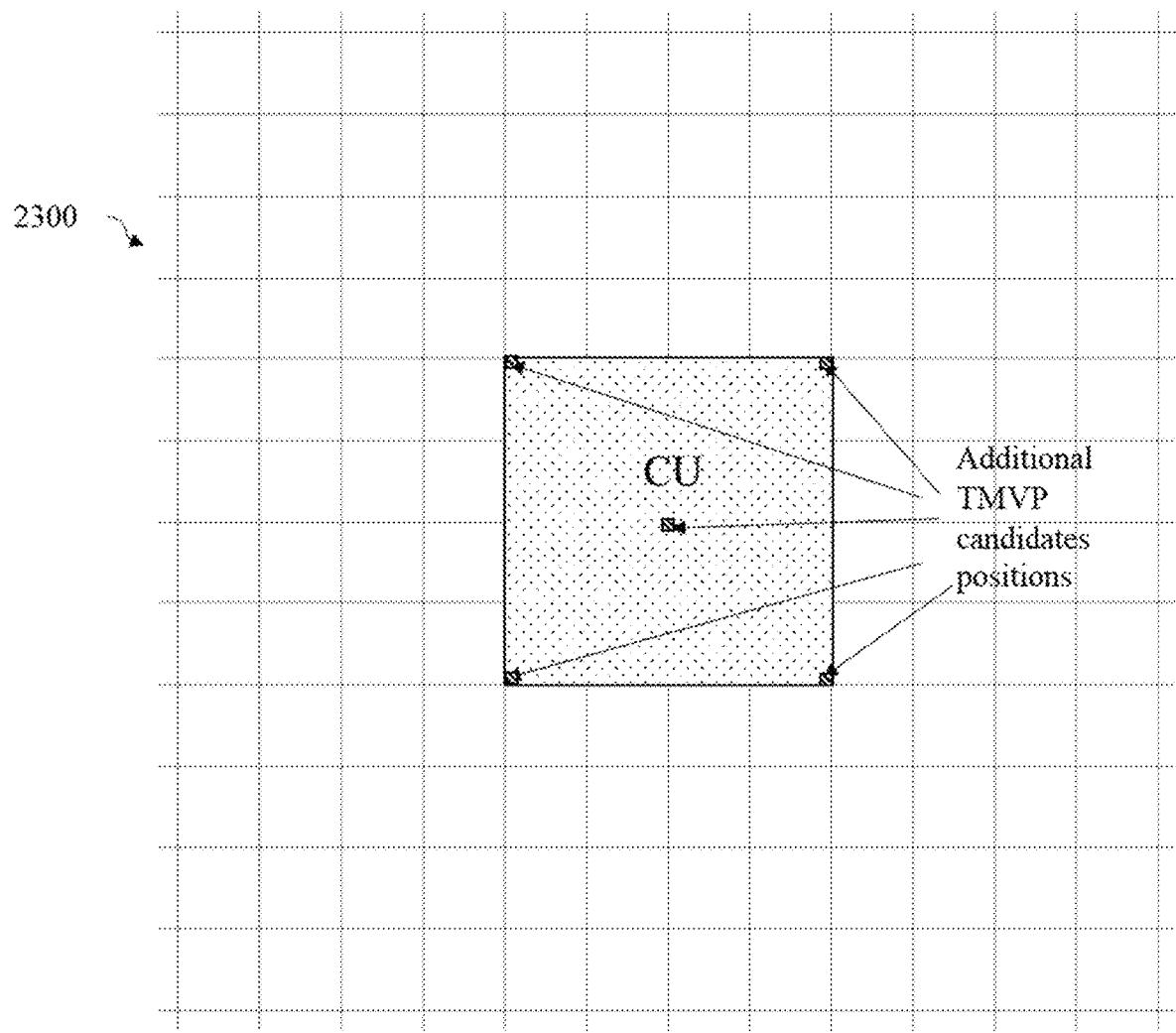
FIG. 23 is a first example of a combined pattern including only TMVP candidates.
Figure 24:
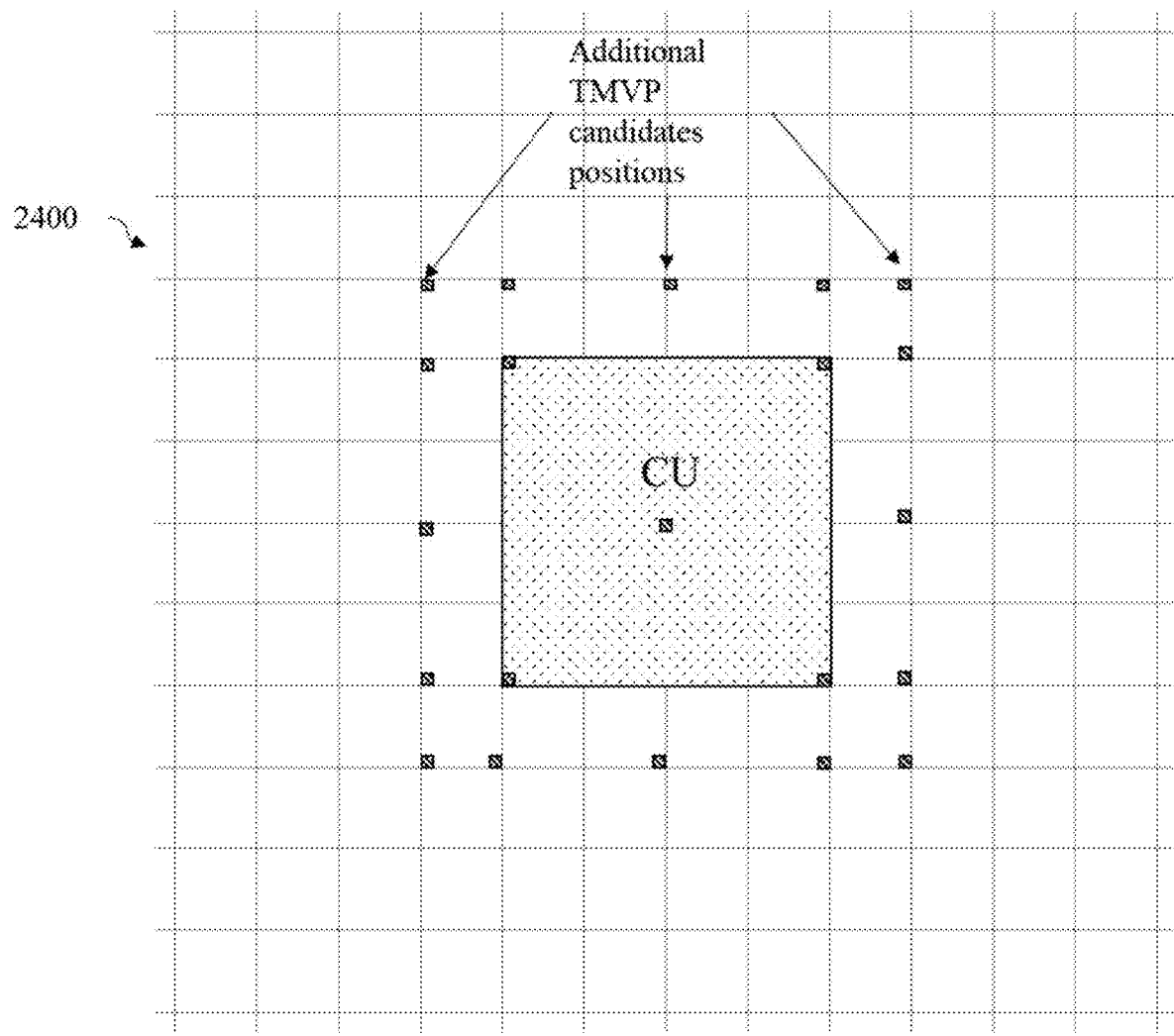
FIG. 24 is a second example of a combined pattern including only TMVP candidates.

In another exemplary embodiment, the combined pattern may contain only the TMVP candidates. Examples of such patterns are depicted in FIG. 23 that shows TMVP-only combined pattern 2300 and FIG. 24 that shows TMVP-only combined pattern 2400. This means that in this case the MVC list contains one or more MVCs from only the TMVP pattern.

According to an embodiment of the present disclosure, the processing circuitry is configured to include into the list of MVCs one or more MVs determined from positions adjacent to the current CU within the current video frame, different from the MV positions of the first pattern.

This means that, in addition to the conventional adjacent merge candidates, shown in FIG. 6, other adjacent candidates may be added to the LDMVP candidates (first pattern). This means that the adjacent candidate positions are also spatial candidate points, which are located around the CU at those positions where motion information is available at the moment of encoding/decoding.

Thus, the LDMVP pattern, generated by the procedure GeneratePattern amended by adjacent candidates, may be considered as a new LDMVP pattern, which is represented may an enlarged set S, including the original set S (i.e. the output of the procedure GeneratePattern) and the adjacent points.

The examples of patterns containing both LDMVP and the additional adjacent candidates are depicted in FIG. 27 that shows LDMVP pattern amended by adding six adjacent candidate points 2700 and FIG. 28 that shows LDMVP pattern amended by adding four adjacent candidate points 2800. As can be seen from the figures, adjacent points may be placed distinctively, for example, along the left or top edge of the current CU. These points may be not covered by the GeneratePattern procedure, unless adjacent points are accounted for specifically.

According to an embodiment of the present disclosure, the determining of the second pattern includes reflecting one or more of the MV positions of the first pattern with reference to a reflection line.

In one exemplary embodiment, the reflection line passes through the bottom-left and top-right corners of the LDMVP pattern. In general, the reflection/morrow line should follow the separation between available motion information (in scanning order or encoding/decoding order) and not available motion information. Thus, the reflection line dissects a frame and/or a picture into two regions.

This means that, for example, according to common encoding/decoding order the top-left part of the picture/frame entail available motion information, while the bottom-right picture art has no available motion information.

Any other reflection line may be suitable for mirroring a LDMVP pattern.

In one exemplary embodiment, the TMVP pattern is generated by mirroring across the reflection line the whole LDMVP pattern.

According to another example, a TMVP pattern may be generated by reflecting only a part of the LDMVP pattern.

Figure 25:
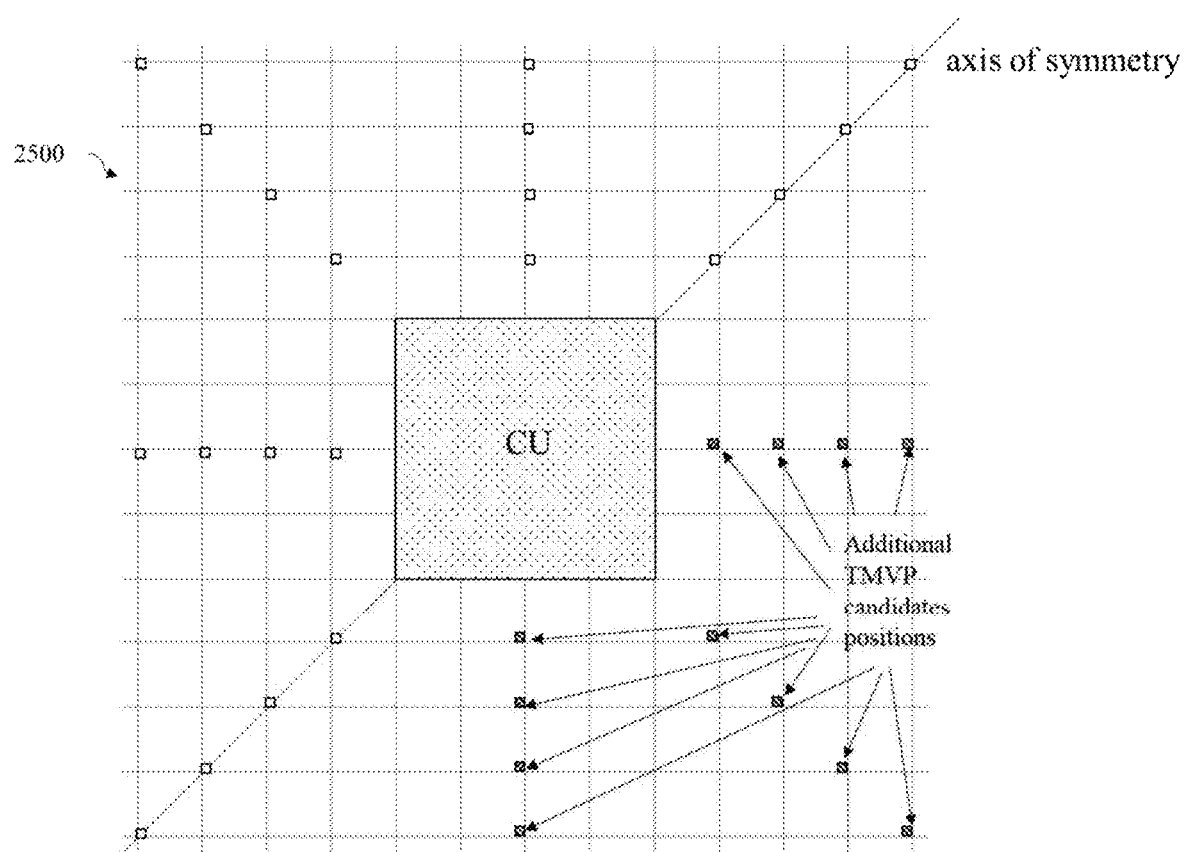
FIG. 25 is a TMVP pattern generated by mirroring an LDMVP pattern of R=3.
Figure 26:
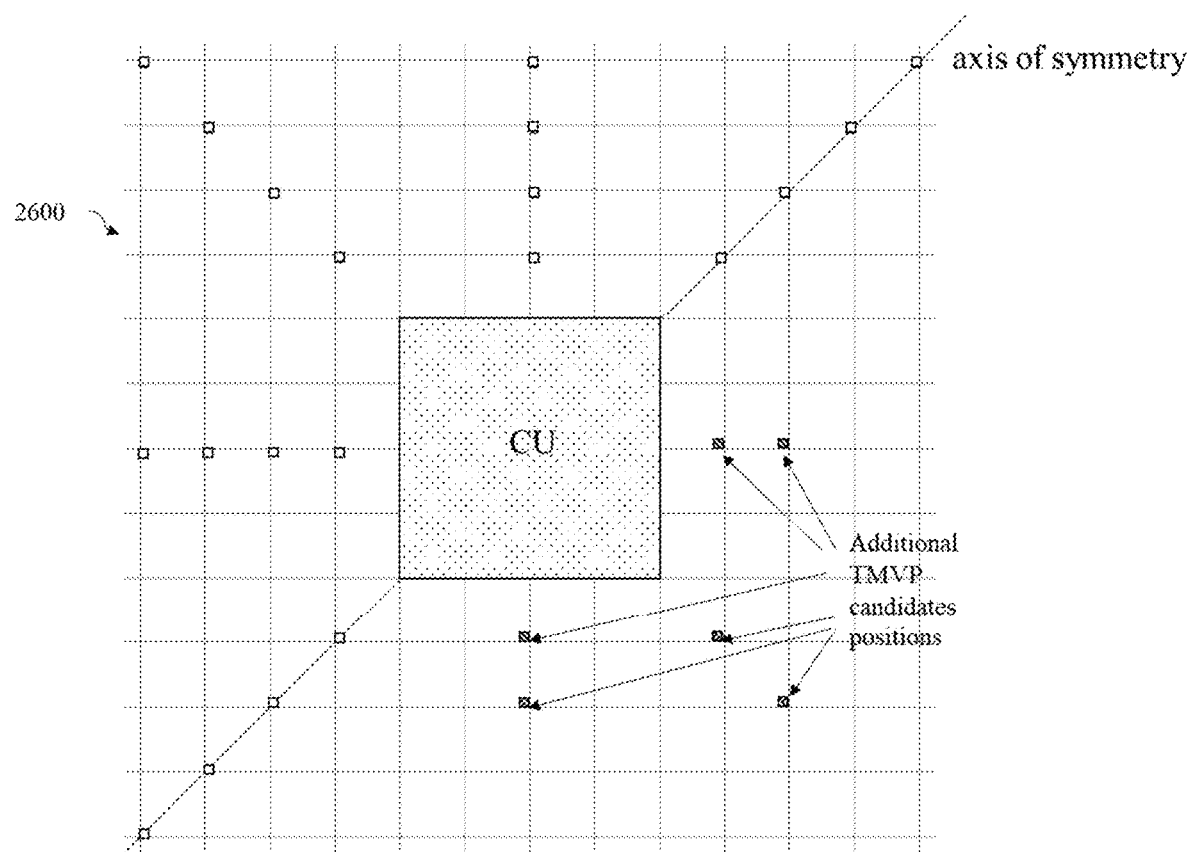
FIG. 26 is a TMVP pattern generated by mirroring a part of LDMVP pattern of R=3.

The examples of the pattern mirroring, including full mirroring and partial mirroring, are shown in FIG. 25 that shows TMVP pattern 2500 mirrored from a LDMVP pattern of R=3 and FIG. 26 that shows TMVP pattern 2600 partially mirrored from a LDMVP pattern of R=3.

Figure 29:
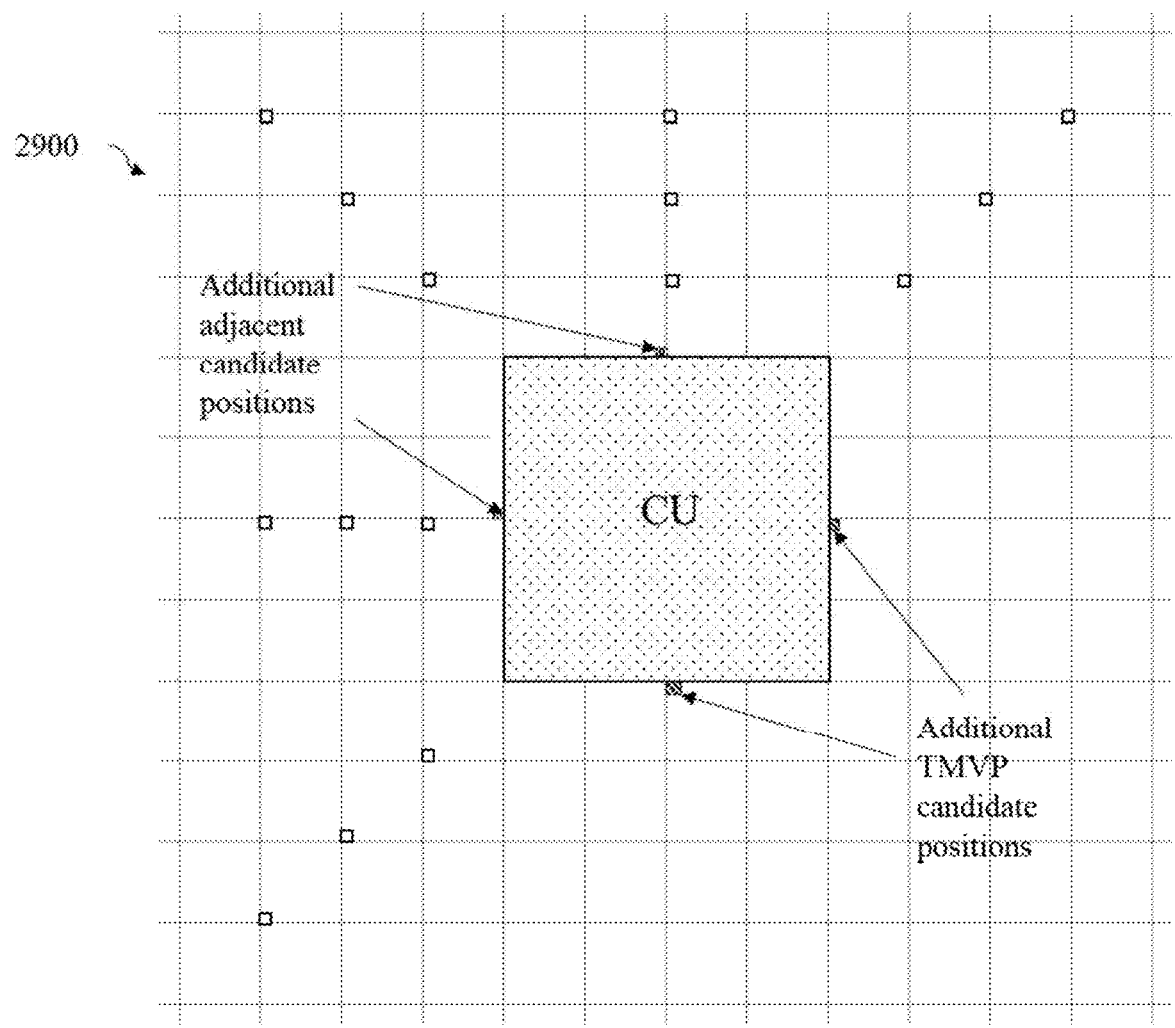
FIG. 29 is an example of a combined pattern, including a LDMVP pattern, TMVP pattern, and adjacent candidate points.

An example of a combined pattern, including a LDMVP pattern amended by adjacent points and a TMVP pattern, is shown in FIG. 29 that shows combined pattern, including a LDMVP pattern, TMVP pattern, and adjacent candidate points 2900.

According to an embodiment of the present disclosure, the processing circuitry of the apparatus determines the first pattern including determining new MV positions for one or more MV positions of the first pattern not available and/or not stored in a buffer so as to be available and/or stored in the buffer.

This means that MV positions of the first pattern, for which motion information is not-available and/or is not stored, are not included into the MVC list. These non-included MV positions of the first pattern (i.e. LDMVP pattern) are referred to as discarded/excluded MV positions from the first pattern. The discarded/excluded MV positions of the first pattern are used for determining the new MV positions. The new MV positions may be determined, for example, by adjusting the positions of the discarded points.

Moreover, in this embodiment not necessarily all of the excluded positions may not be subject to a position adjustment, as discussed in the following with reference to FIGS. 30 to 33. The result of the position adjustment is that the adjusted positions are available and/or stored in the buffer. This means that the motion information for the new MV positions is available and/or stored in the buffer.

Such a buffer, for example, may be a line buffer which has fast read-write access times and is commonly used to store motion information of restricted regions of CTUs neighboring the current CTU for which the motion prediction is performed.

A line buffer is a buffer for storing data from CTUs. In VVC, CTUs are decoded in a raster order (inside one tile/brick). For some tools, for example, for merge mode data from top CTUs is needed. For this purpose, all the data that may be potentially needed from bottom CTUs during the decoding of a current CTU, is stored in specific buffer. This buffer is called "line buffer".

Figure 30:
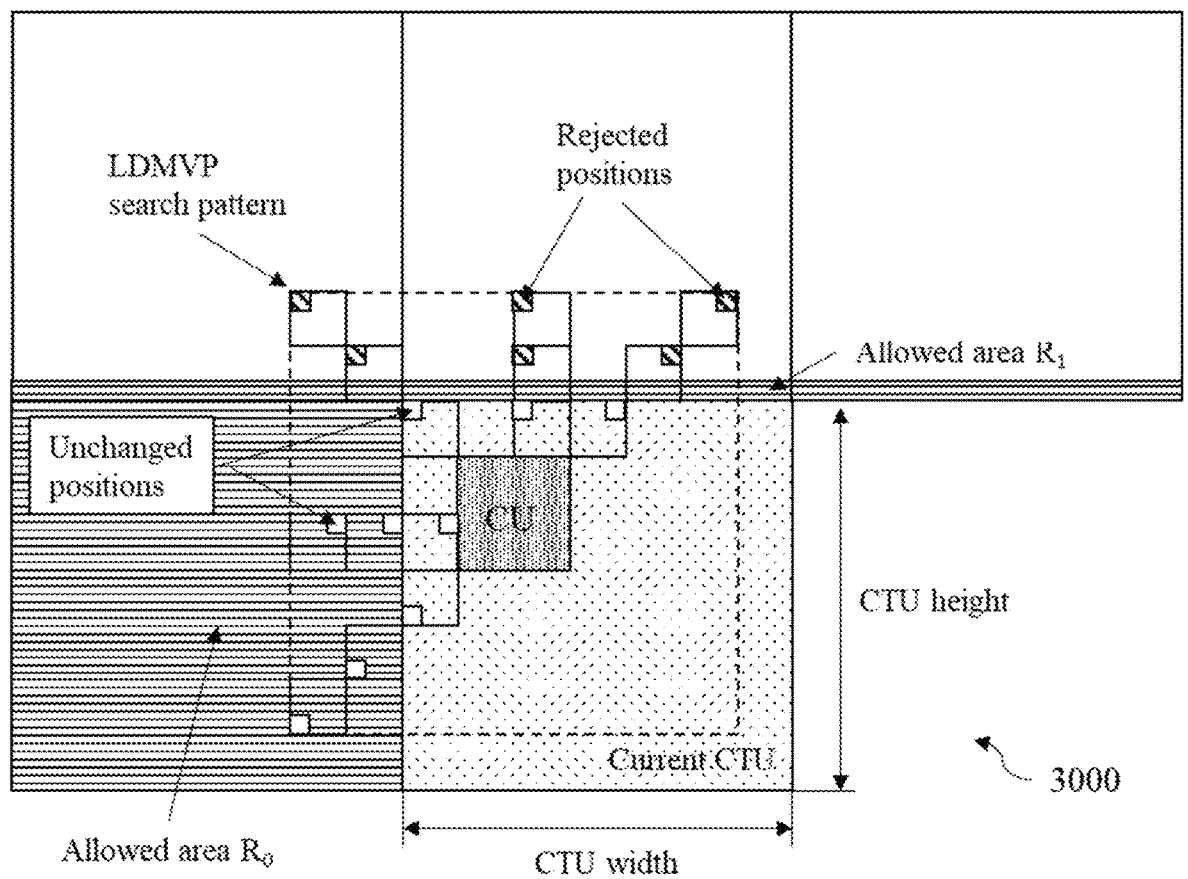
FIG. 30 is an example of a LDMVP pattern referred to as "sun" LDMVP pattern, along with allowed regions R0 and R1.

FIG. 30 shows an exemplary embodiment using the "sun" pattern 3000, generated by the procedure GeneratePattern, as described in one of the previous embodiments. To recall, this pattern differs from the "diagonal" pattern shown in FIG. 8, for example, in that the initial pattern positions are arranged relative to the current CU at its corners at the top-left, top-right, bottom-left along a diagonal direction, and at the mid of the left edge and top edge along the left and top direction. In this way, the "sun" pattern covers the upper "triangle" regions of the CU in an isotropic-like manner.

Therefore, the "sun" pattern may provide an advantage of using motion information restricted from the top of the current CU, with the respective motion information being "distributed" more uniformly in the upper and left region around the current CU.

Figure 32:
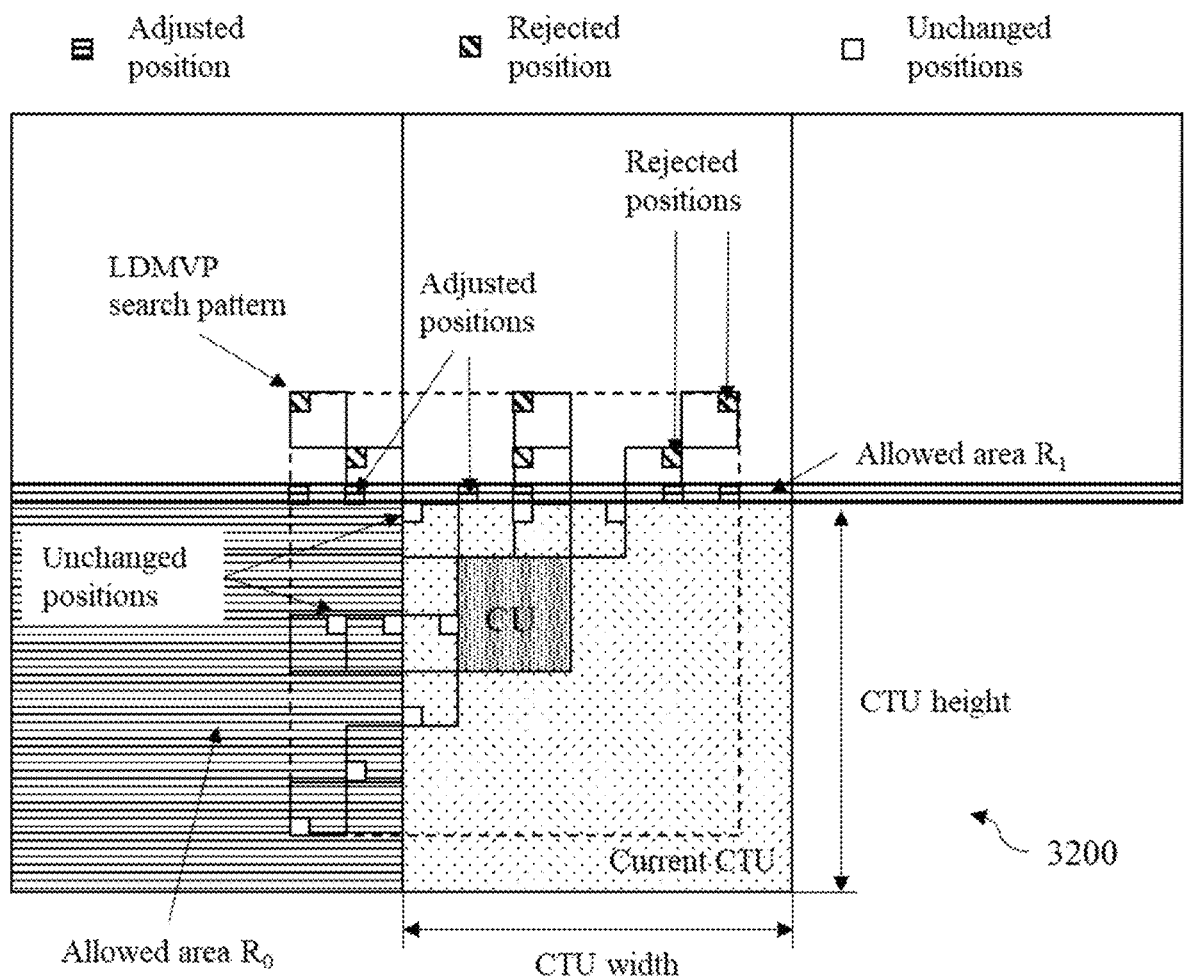
FIG. 32 is an example illustrating the application of the adjustCandidatePositions procedure on the "sun" pattern.

FIG. 30 shows further regions R0 and R1 (horizontal line pattern) around the current CU, which refer to allowed areas defining positions of MVs for which motion information is available. In the example of FIG. 30, R0 covers the entire CTU to the left of the current CTU, whereas R1 entails motion information over the small bottom region of CTUs at the top-left, top, and top-right of the current CTU. Some of the MV positions of the "sun" pattern (i.e. first pattern) are already within the current CTU or within any of the regions R0 or R1, so that motion information for those positions is available and/or stored in the buffer. These MV positions remain unchanged (white squares), as shown in FIG. 32. Positions of the first pattern rejected are marked as bold black-white hashed pattern, and these are subject to a position adjustment.

Figure 31:
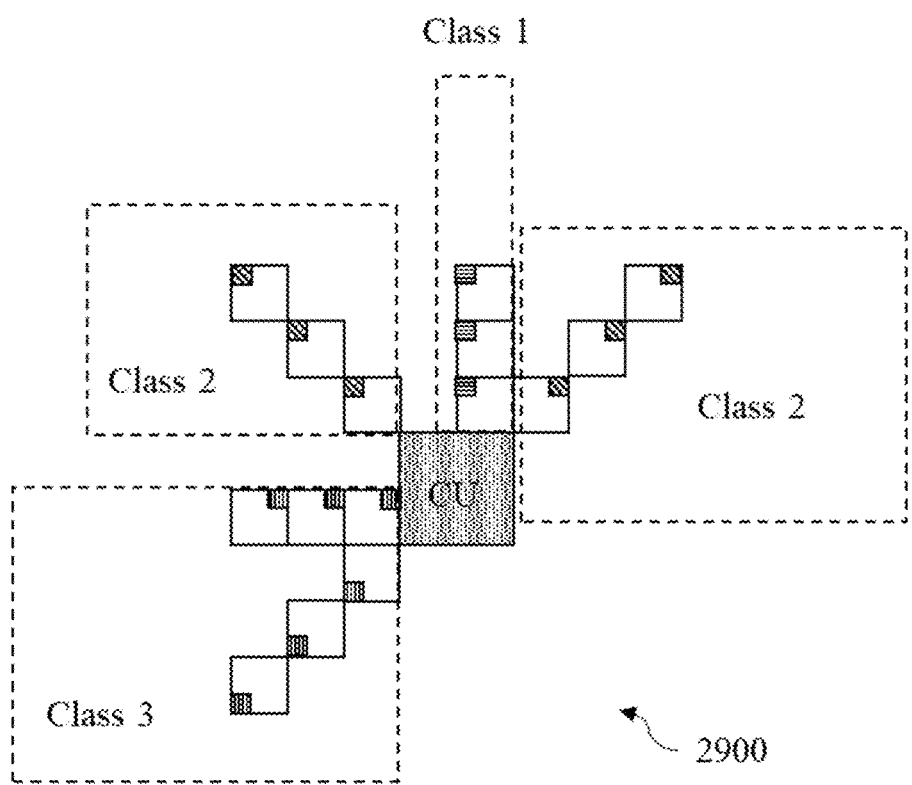
FIG. 31 is an example of dividing the "sun" LDMVP pattern into different classes.

In order to implement that not necessarily all of the excluded pattern positions are adjusted, the pattern positions may be first grouped into classes, as illustrated in the example of FIG. 31.

One option for grouping pattern positions into classes may be splitting the LDMVP pattern positions, i.e. the first pattern positions corresponding to the set S, into subsets Si. To recall, a subset Si may be referred to also as a series. This means that the pattern positions in a series Si are located along a particular direction. Said direction may, for example, be along any of the top, top-right (diagonal), top-left (diagonal), left, and/or bottom-left (diagonal). In the example of FIG. 31, for the "sun" pattern 3100 there are five series S1 to S5, with each series comprising three positions of the sun pattern. A series Si may also be referred to an "arm".

Assuming ni positions in series Si, the respective positions may be represented by positions (x0i, y0i), (x0i+dxi, y0i+dyi), (x0i+2*dxi, y0i+2*dyi), (x0i+ni*dxi, y0i+ni*dyi), where (x0i, y0i) refers to a position of the first position of the series. The first position may, for example, be the position nearest to the current CU. For example, in the series of pattern positions being in the top direction, the first position is the position at the bottom close to the top edge of the current CU. The dxi and dyi refer to offsets between neighboring positions in the series along the horizontal and vertical direction respectively.

The pattern elements, i.e. the positions, may now be grouped into classes, for example, based on the dxi and/or dyi values of the corresponding series. This means that a class of positions may be characterized in terms of the values dxi and/or dyi, including whether they are positive or negative. As a result, each class may include one or more series of the pattern positions.

For example, for the case of FIG. 31, using the above discussed means to classify pattern positions, the pattern positions of the sun pattern may be grouped into their respective classes (here class 1 to 3) according to the following restrictions for dx and dy:

$$dx=0, dy<0 \quad \text{Class 1:}$$

$$dx!=0, dy<0 \quad \text{Class 2:}$$

$$dx<0, dy>=0. \quad \text{Class 3:}$$

The operation "!=" means "not being equal to".

The result of applying the dx-dy-based classification to the sun pattern results in three classes, with class 1 including one series, and classes 2 and 3 comprising each two series.

For example, the pattern positions may be grouped into classes depending on whether one or more pattern positions are located to the left and/or bottom-left of the current CTU. In the example of FIG. 31, this would apply for the pattern positions of class 3. In addition or optionally, pattern positions at the top of the current CTU, i.e. at the top-left, top, and/or top-right, may be grouped further depending on whether or not their x positions and/or y positions are the same. In the example of FIG. 31, the top pattern positions along the left and right diagonal of the CU have both different x and y positions. Thus, they are grouped into a common class 2. In turn, the top pattern positions along the mid upwards of the CU have the same x position, but different y positions. Thus, they are grouped into class 1.

Hence, in summary, the pattern positions in the top upward direction of the CU is class 1, the pattern positions in the top left-right diagonal direction is class 2, and the remaining pattern positions is class 3, as illustrated in FIG. 31. Pattern positions within the current CTU and/or within any of the regions R0 and R1 are not changed, as shown in FIG. 32.

According to an embodiment, the determining of the new MV positions includes assigning x positions and/or y positions of the one or more MV positions to the new MV positions and discarding the one or more MV positions from the first pattern.

This means that the discarded/rejected MV positions of the first pattern (LDMVP pattern) are assigned (new) MV positions along a x direction along a width of the current CTU and/or a y direction along a height of the current CTU.

The x and y direction, respectively, x and y positions are in pixel coordinates with the x pixel axis going along the width of the CTU and the y pixel axis going along the CTU height.

This is illustrated by the example of FIG. 32, where the excluded pattern positions in class 1 and 2 are assigned new positions 3200, i.e. their positions are adjusted. Here, their y position is adjusted along the CTU height, so as to lie in region R1. Since the pattern positions in class 2 have different x positions, their adjusted positions are located in region R1 at different positions. In contrast, the pattern positions of class 1 lie after position adjustment within region R1 at the same position since their x positions were the same originally. The original MV positions of the first pattern outside and of the regions R0 and R1 are discarded/rejected after the assignment to new MV positions.

According to an embodiment, the determining includes assigning to one or more of the new MV positions having same x position or same y position new y positions or new x positions, using a predetermined prescription.

This means that one or more of the new MV positions are subjected to reassignment to new y and/or new x positions in case some of the new MV position are located at the same point.

The prescription may be a function. This means that, for example, the reassigned positions may be calculated using said function with the assigned position as input. The calculation may be performed in dependence on the CU position and/or the pattern position.

In one exemplary embodiment, the predetermined prescription is shifting the assigned y positions or x positions of the new MV positions by a predetermined offset value.

The offset value may be a number of pixels so as to shift the y and/or x position (e.g. in pixel units) by the pixel offset by adding and/or subtracting the offset value to the adjusted y and/or x position value. Alternatively, the predetermined prescription may be a factor by which the y and/or x position may be multiplied and/or divided. Other prescriptions are possible for achieving reassigning of the adjusted positions when their x and/or y position is the same.

The offset value may depend on the CU position and/or the pattern position. For example, the y coordinate may be modified to have a distance less than 4 points (MV storage grid size) from the top CTU border. This means that the offset value may be restricted depending on the CU position and a distance. Alternatively and/or optionally, the offset value may be predetermined. In any case, the new MV positions should be shifted to new y and/or x positions such that they are not located outside the allowed region after the shift.

In the example of FIG. 32, the new MV positions of the pattern positions in class 1 have the same y position. Since their x position are the same both for the adjusted and their original pattern positions, they are located at the same position in region R1. Hence, one of the two new MV positions is assigned a new x position by shifting through an offset. In other words, adjusted positions having the same position may be spread within a region Ri, so that the assigned positions have different positions. This means that they are located at different points. In FIG. 32, this is the case for the class 1 pattern positions which, after position assignment and subsequent position reassignment, have a different position.

In this embodiment, where pattern positions may be grouped into classes, the number of MVC positions is the same as the number of positions of the first/LDMVP pattern. Moreover, the pattern and the regions are chosen in this example to use motion information restricted to CTUs at the top of the current CTU.

In the examples shown in FIGS. 30 to 33, the pattern positions are at the corners of the current CU at the top-left, top-right, bottom-left along the diagonals. Further, positions are located horizontally from the mid of the left edge toward the left, and vertically from the mid of the top edge going upwards. In this disclosure, we refer to this pattern as the "sun" pattern, which is generated by the GeneratePattern procedure according to the prescription shown in the flowchart of FIG. 12, and already discussed in one of the embodiments above.

In this example, it is assumed that the CTU decoding order is from left to right and from top to bottom. Accordingly, the image portions on the top and to the left of the current CTU are available in the current frame as well as MV information. The remaining portions may depend on the current CTU and thus, can only be decoded after decoding the current CTU. However, the present disclosure is not limited thereto. Another decoding order may be used in general, resulting in different availability of the current frame portions.

For the patterns, such as the "sun" pattern, the patterns shown in FIGS. 7 to 10, or any other suitable pattern, the position adjustment of the pattern positions may be implemented through the adjustCandidatePositions procedure as follows.

All candidates are divided into three classes as depicted in FIG. 31.

For the white square candidates position adjustment is not used.

For the black-white hashed candidates (class 1 and class 2) y position is changed to top y position of current CTU decremented by one.

For the black-white hashed left-right candidates (class 2) x position is not changed.

For the black-white hashed mid candidates (class 1) new x position can be calculated for example using AdjustCandidatePositions(x, y, topYposOfCurCtu, xOffsetForOneGrid, log 2Gy) procedure.

As discussed before, the outcome of applying the procedure adjustCandidatePositions on the "sun" pattern is illustrated in FIG. 32.

Figure 33:
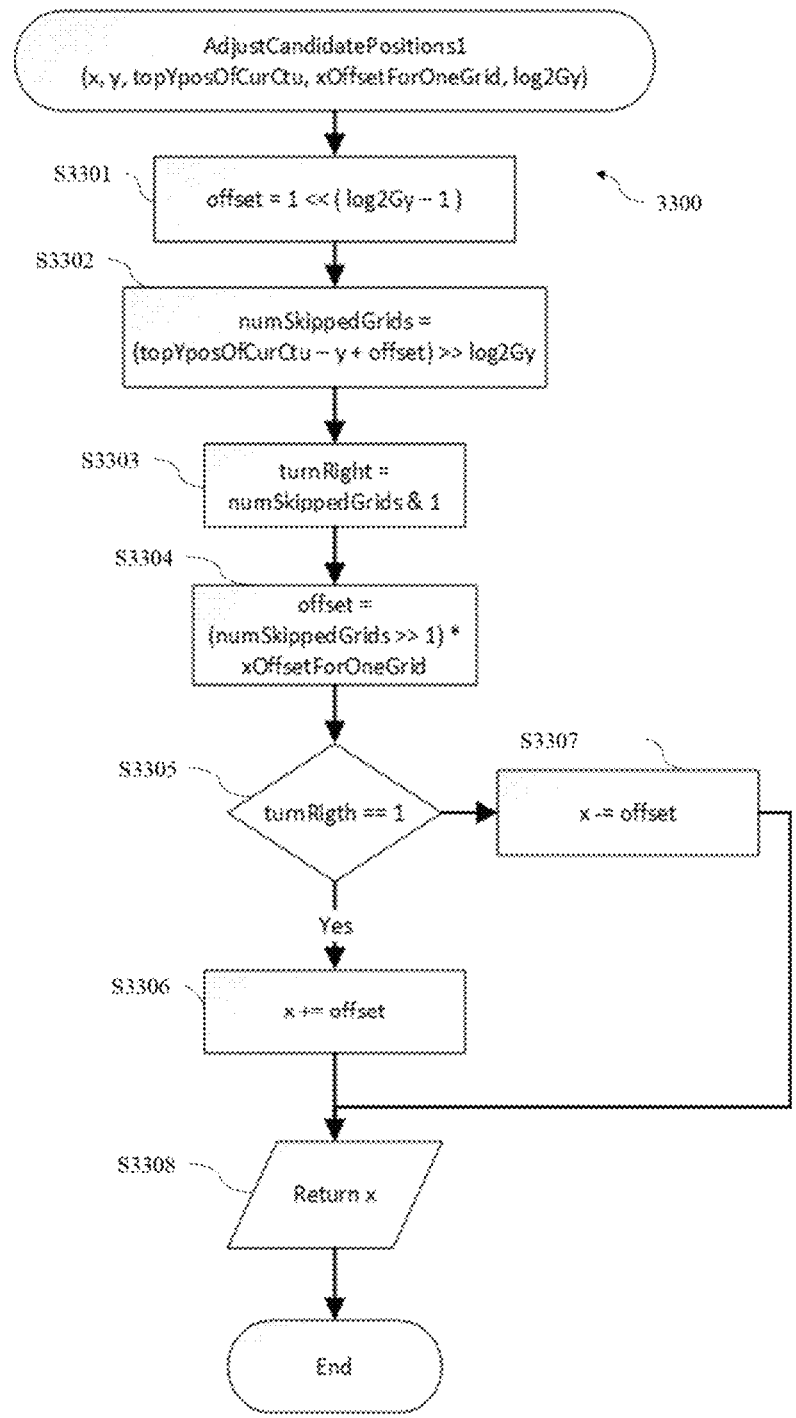
FIG. 33 is a flowchart of the procedure adjustCandidatePositions.

FIG. 33 shows a flowchart of the procedure 3300 for AdjustCandidatePositions(x, y, topYposOfCurCtu, xOffsetForOneGrid, log 2Gy) with an example of an implementation. Here, topYposOfCurCtu is a top y position of the current CTU, and xOffsetForOneGrid may be, for example, w>>2, Gx or Gy, 2 log 2Gy, where w is the width of the current CU and Gx and Gy is width and height of the pattern grid respectively.

The aim is to calculate the offset value, by which, in this example, the x position is shifted to the left or right by subtracting (step S3307) or adding (step S3306) the offset. In step 3301, is shifted (in this example here bitwise by the operator "<<") to the left. This corresponds to a multiplication of the offset value. In step S3302, the number of skipped grids is determined with reference to the top y position of the current CTU, the y position of the point (x,y), and the offset. This value is (bitwise) shifted to the right, corresponding to a division. In step S3303, it is determined whether the number of skipped grids is even or odd (parity check). If the number is odd, the respective value "turnRight" is "1". In step 3304, the offset value is determined using the number of skipped grids and the x offset value for one grid. If turnRight is logical 1 (step S3305), the x position is shifted to the right by adding the offset value to the x value (step S3306). If not, then the x position is shifted to the left by subtracting the offset (step S3307). The adjusted candidate position is returned (step S3308).

The procedure AdjustCandidatePositions may be included as step S3300 into the flowchart of the LDMVP list generation algorithm between the steps S1104 and S1105 (not shown).

According to an embodiment of the present disclosure, the processing circuitry is configured to generate a pattern relative to a position of the current CU in dependence on a size of the current CU, a size of a grid specifying a minimum distance between two MV positions belonging to the pattern, wherein the pattern specifies positions of MVs, and said pattern is the first pattern and/or the second pattern.

The size of the current CU may be the width and/or height of the current CU. The size of the grid may be determined by the grid spacing Gx and/or Gy, specifying a minimal distance between two positions belonging to the pattern. The grid sizes Gx and Gy may be in units of pixels. For example, Gx=4, means that the grid size along the x direction of the current frame has the amount of four pixels.

The size of a grid may be the minimum distance between MV positions belonging to the same pattern. This means that the minimum distance for the first pattern and the second pattern may be different in case the first and second pattern are different. Moreover, the minimum distance may be different along the x and y direction (rectangular grid).

According to an embodiment of the present disclosure the processing circuitry is configured to determine the second pattern and/or the first pattern in dependence on at least one of an iteration value specifying a size of the second pattern and/or the first pattern on the grid, a minimal size configurable for a CU, and a maximal size configurable for a CU.

The iteration value refers to the number of iterations. The iteration value/number R may be predefined, may depend on the grid size or the maximum CU size. For example, in case of some hardware requirements with regard to the size of pattern in pixels, the number of iterations is determined by dividing of the pixel size by the grid size or the maximum CU size. In general, the number R may be recalculated "on the fly", depending on the CU size.

The iteration value relates to how many times a MV position of the first pattern or second pattern is generated along a certain direction for given grid spacing Gx and Gy. MV positions generated along a certain direction of a pattern are also referred to as a series or "arm" of the pattern.

Since the first pattern and the second pattern may have different grid spacings Gx and/or Gy, the size of the first and second pattern may be different for the same iteration value. When the first and the second pattern use the same grid spacings, their size may be different when a different value of the iteration number is used for the first and second pattern. In other words, the apparatus and methods for generating a first pattern and/or a second pattern may use a different iteration value.

For example, the pattern shown in FIG. 18 is a pattern combined from a LDMVP pattern (first pattern) and a TMVP pattern (second pattern), using an iteration value of R=3 for the spatial LDMVP pattern and Rt=1 for the TMVP pattern. For this case, the respective series (i.e. pattern "arm") contains three points or one point for the LDMVP pattern and the TMVP pattern, respectively.

The minimal size for a CU may be 4×4 for VVC. For example, in current VVC, 4×4 blocks are used for intra-prediction, whereas for inter-prediction, a minimum luma block size may be 8×4 or 4×8. Alternatively, a 4×4 Luma blocks may be used only for Affine mode. In this mode, 4 adjacent Chroma blocks corresponding to one Luma block have the same MVs, so that a minimal Chroma block in VVC (considering inter prediction) is also 4×4. The grid size for motion information storage is still 4×4 for VVC.

The maximum size may be, for example, the maximum value of Gx and Gy, i.e. Max(Gx,Gy), with the values of Gx and/or Gy depending on the CU size.

According to an embodiment of the present disclosure, the generation of a pattern, including a first and/or a second pattern, includes adapting the grid size in dependence on the size of the current CU and/or a minimum or maximum value of the grid size.

This means that the horizontal grid size Gx and vertical grid size Gy may depend on the CU size. For example, Gx may be equal to w and Gy may be equal to h. If the number of iterations R is fixed, the pattern size will be small for the small blocks and huge for the big blocks. Having a too small pattern size causes a coding loss, because the search range is rather small. Having a too big pattern size requires access to a big amount of motion information that may not be located in a cache, which may cause problems for software and hardware implementations. This problem may be solved by imposing further restrictions on the grid size.

The minimum and maximum value of the grid size are referred to the parameters minGridSize and maxGridSize.

In one exemplary embodiment of the present disclosure, the grid size depends on the block size and two parameters minGridSize and maxGridSize. This means that the grid size Gx is obtained as minGridSize, if the CU width w is less than minGridSize. It is obtained as maxGridSize, if the CU width w is greater than maxGridSize, and as w in the other cases. The same prescription may be applied for Gy. The value of minGridSize may be, for example, 4, 8 or 16. The value of maxGridSize may be, for example, 32, or 64.

In order to prevent that the patterns are too small or too big, another approach for an adaptive grid size may be used instead of fixing the number of iterations R, the search range is fixed. A search range may be defined as the maximum distance from the CU to the candidate positions in a horizontal and vertical direction. For example, for the pattern depicted in FIG. 18, the search range is restricted to 3*max (Gx, Gy). For the pattern depicted in FIG. 19, the search range is restricted to 4*max(Gx, Gy). The number of iterations R may be calculated as searchRange/max(Gx, Gy).

The drawback of this method is that the number of iterations R is too big for the small blocks. For example, for the search range 128 and a 4×4 block, R is equal to 32. Hence, if the pattern contains 5 positions for each iteration as pattern depicted in FIG. 18, the number of candidate positions in this case is equal to 32*5=160.

This problem may be solved, by restricting iteration number. For example, the maximum number of iterations Rmax may be 4, 5, 6, 7, 8 or more. Thus, the number of iterations R is calculated as min(Rmax, searchRange/max (Gx, Gy)). Foremost cases, the encoding performance with a restriction of Rmax=8 is close to the performance of the unrestricted version. But the final number of checked positions in the pattern in this case may be reduced, for example, from 160 to 40.

For example, the restrictions may be as follows minGridSize=8, maxGridSize=64, and Rmax=6. In this case, for example, for a CU having a size of 4×128 and a searchRange=128, Gx is equal to 8, Gy is equal to 64, and R=2. For a CU having a size of 4×4 and a searchRange=128, Gx is equal to 8, Gy is equal to 8, and R=6.

In case of using the adaptive grid size technique discussed above, the grid may be rectangular if Gx is not equal to Gy. The software and hardware implementation of the LDMVP algorithm may be further simplified by the use of square grids. The side of the square G=Gx=Gy may be calculated depending on the CU width w and CU height h. The square side G may be calculated, for example, using the following equations:

$G=\max(w,h)$.

$G=\min(w,h)$.

$G=(w+h+1)>>1$ (>>x means right shift of integer value, that is the same as integer division on $2x$).

$G=(w+h)>>1$.

G is set equal to a value with power of two that is nearest to $(w+h+1)>>1$.

G is set equal to a value with power of two that is nearest to $(w+h)>>1$.

$1<<((k+r+1)>>1)$ with $w=2k, h=2r$ (<<x means left shift of integer value that is the same as multiplying by $2x$).

$1<<((k+r)>>1)$ with $w=2k, h=2r$.

The apparatuses and methods according to any of the above-discussed embodiments may be applied to any pattern, including LDMVP patterns as a first pattern. Moreover, the apparatuses and methods may be applied individually and/or in any combination thereof on a pattern, including the first pattern and/or the second pattern. This means that the methods may be applied in any order after a LDMVP pattern has been generated. Moreover, the methods may be implemented as separate procedures according to the present disclosure. Alternatively, the procedures may be implemented with any of the methods combined.

According to an embodiment, a method is provided for generating a list of MVCs, for a current CU, comprising the steps of including into the list of MVCs one or more MVs, determined from a first pattern specifying MV positions within a current video frame in which the current CU is located, one or more MVs determined from a second pattern specifying MV positions in a video frame different from the current video frame.

According to an embodiment, a method is provided for generating a list of MVCs, for a current CU, comprising the steps of determining a pattern specifying positions of MVs, relative to a position of the current CU at least in dependence on a size of the current CU, and a size of a grid specifying a minimum distance between two MV positions belonging to said pattern, and include into the list one or more of the MVs specified by the MV positions of said pattern.

The apparatus and method as described by the above embodiments may be used with different LDMVP patterns, for example, with the patterns depicted in FIGS. 7 to 10 and/or the "sun" pattern. The apparatus and method may be used with different LdmvpAlgorithmSpecificChecks(P, xCU, yCU, xCTU, yCTU) procedures. The apparatus and method may be used for both merge technique and advanced MV prediction. The apparatus and method could be used with different schemes of partitioning a CTU into CU, for example, QT, TT, BT and their combinations.

According to an embodiment, an encoder is provided for encoding a current CU, of a current video frame comprising the apparatus for generating a list of MVCs, according to any of the previous embodiments, an inter-PU for determining prediction of the current CU according to at least one MV, out of the MVC list, and a compression unit for encoding the current CU by using the prediction of the CU.

According to an embodiment, a decoder is provided for decoding a current CU, of a video frame comprising the apparatus for generating a list of MVCs, according to any of the previous embodiments, an inter-PU for determining prediction of the current CU according to at least one MV, out of the MVC list, and a decompression unit for decoding the current CU by using the prediction of the CU.

The MVC list may be used for motion prediction using motion information through MVs at the positions of one or more of the MVCs.

The encoding may be performed, for example, by calculating a difference between the current CU and the prediction and by coding the residuals (differences) including quantization and/or entropy coding. The prediction is given by the block to which the best MV. The best MV is determined out of the MVC list by calculating a similarity measure such as sum of absolute differences (SAD). From the encoder, the best MV may be indicated to the decoder within the bitstream of the coded video, e.g. as an index to the list of MVCs. The MVC corresponding (assigned) to the index is the best MV to be also used for the decoding. Here, the term "best" refers to the MV selected by the encoder and to be used by the decoder to obtain prediction for the current block. This may be performed even if there is no residual, since the prediction is already close to the CU, corresponding to a zero (after quantization) residual. In principle, an index to the list may also be determined implicitly at the encoder and the decoder side. This may, for example, be the case for the merge mode, when the number of MVCs is just one candidate, so that signaling of indices is not needed.

According to an embodiment, a computer-readable non-transitory medium is provided for storing a program, including instructions which when executed on a processor cause the processor to perform the method steps.

In the embodiments of the present disclosure discussed so far, the apparatus and method corresponding to the procedure GeneratePattern with the flowchart shown in FIG. 12 is implemented, so as to generate a LDMVP pattern, such as the "sun" pattern. As discussed, the "sun" pattern of the present disclosure has the property that MVC positions are generated in the top region of the current CTU, with the respective points rather uniformly located at the bottom-left, left, top-left, top, and top-right. Said LDMVP "sun" pattern is generated for a current video frame.

With the apparatus and method related to the procedure GeneratePatternTmvp, the LDMVP "sun" pattern may be amended by a TMVP pattern, having pattern positions in bottom-right regions around the current CU and/or current CTU. These "bottom" regions include the bottom, bottom-right, and right part. Since motion information for these regions are not available and/or are not stored in a buffer, the MVC positions are used for a video frame that is different from the current video frame. In practice, said different frame is a previous video frame. This means that said frame is temporal previous to the current video frame. As a result, motion information is available and/or is stored for the "bottom" frame regions at the time of encoding/decoding of the current frame.

With the apparatuses and methods of the present disclosure, the "sun" LDMVP pattern may be extended by adding adjacent candidate positions to the LDMVP pattern.

Once the LDMVP "sun" pattern is generated (and possibly extended by adjacent positions), the apparatus and method related to the procedure AdjustCandidatePosition, one or more candidate positions of the LDMVP pattern that are located outside the current CTU and outside of one or more regions {Ri} may be adjusted such that their new adjusted coordinates are within any of the allowed regions {Ri}.

The apparatus(es) and method(s) of the present disclosure are not limited to generate only the "sun" pattern as LDMVP pattern. Any other pattern suitable for motion prediction and/or MV prediction may be generated, such as those LDMVP patterns shown in FIGS. 7 to 10. Moreover, any of the LDMVP patterns may be subject to changes by (1) adding one or more adjacent points to a LDMVP pattern and/or (2) adjusting a LDMVP candidate position and/or (3) adding TMVP candidate positions from a TMVP pattern to the final MVC list.

Third Embodiment

According to a third embodiment of the present disclosure, the first pattern, i.e. the LDMVP candidate pattern may be subject to further changes of one or more of the LDMVP candidate positions. As described in the following embodiments, the LDMVP list generation algorithm of FIG. 11, may be amended further in addition and/or alternatively by any of the methods of the third embodiment. The method steps of the LDMVP list generation algorithms are not repeated, but rather the method steps related to the second embodiments of the present disclosure are discussed below.

As disclosed in the following exemplary embodiments of the disclosure, the present disclosure exploits a generated MVC list of MV positions, from which the respective motion information is used for the motion prediction and/or MV prediction.

The prediction may be for a current block, i.e. a current CU, which is within a current CTU. The current CTU may be within a current frame, i.e. current video frame, comprised of multiple CTUs.

According to an embodiment, an apparatus is provided for generating a list of one or more MVCs. The MVC list is generated for a current CU in dependence on a position of a pattern relative to a position of the current CU and in dependence on the position of the current CU within a CTU. The pattern defines positions of MVs.

The MVC are used for the motion prediction for the current CU. This means that the motion information of MVs are used at the respective candidate positions for the prediction. Thus, the MV positions are positions of the corresponding vector candidate block. The block may by one pixel/sample and/or a plurality of samples corresponding to a block of samples.

The position of the current CU may be the top-left corner of the current CU, with the positions being in units of pixels or a pixel block unit. The block unit may, for example, be a 2×2 pixel block or any other unit. The position of the current CU, with the CU being within the current CTU, may be a distance of the top-left corner of the current CU to a (pixel/sample) position of the top-left corner of the current CTU.

In other words, the term "motion vector position" may refer to a "position of motion vector candidate block" or a "position of motion candidate block". Moreover, more than one position of the pattern may correspond to one CU, such as in the case when the grid size is 16×16 and neighboring CU size is 128×128 or 64×64, for example. This happens in case the grid size is (much) less than the size of the neighboring CU(s), so that a few pattern positions may be located inside the same neighboring CU. In most cases, only one MV-MV pair correspond to one CU, so that a few pattern positions may refer to the same motion information.

In general, the pattern may be generated on a CU-basis and/or on a grid-basis. In practice, CU-based patterns turn out to be complicated to be handled by the decoder and do not necessarily provide significant gain. Therefore, grid-based patterns are likely to be preferred over the CU-based patterns. For this case, more than one position in the pattern may correspond to one CU.

The LDMVP techniques may be used for two processes.
Merge mode
MV prediction in AMVP mode.

For the first case, two things are borrowed from the respective MVC position MV and reference index. In case of a B-frame, this may be 2 MVs and 2 reference indices.

For the second case, only a MV is borrowed, while a reference index is signaled in a bitstream. LDMVP may be also optionally used for the second case (AMVP). Thus, in general, a LDMVP of the present disclosure may be used for motion prediction and/or MV prediction. Moreover, for the prediction not only MVs may be used, but also reference indices from a "reference" block, which may be a MVC position.

According to an embodiment, the processing circuitry of the apparatus determines the MVCs for the current CU including selecting a subset of MV positions from the pattern positions. In other words, the initial pattern, i.e. the initial positions are subject to additional checks, upon which certain pattern positions may be retained, discarded, and/or altered.

The selecting of the subset from the (initial) pattern is explained in the following with reference to FIGS. 36 to 39 showing examples for the position selection. In the examples of FIGS. 36 to 39, the LDMVP pattern "diagonal" of FIG. 8 has been used throughout for illustration purposes. Any other pattern, such as those shown in FIGS. 7, 9, and/or 10 may be used, including the "sun" pattern(s) generated by the GeneratePattern procedure. Examples of "sun" patterns are shown throughout FIGS. 13 to 16.

According to one embodiment, the selecting includes selecting from the pattern positions those MV positions which are within the current CTU.

Figure 36:
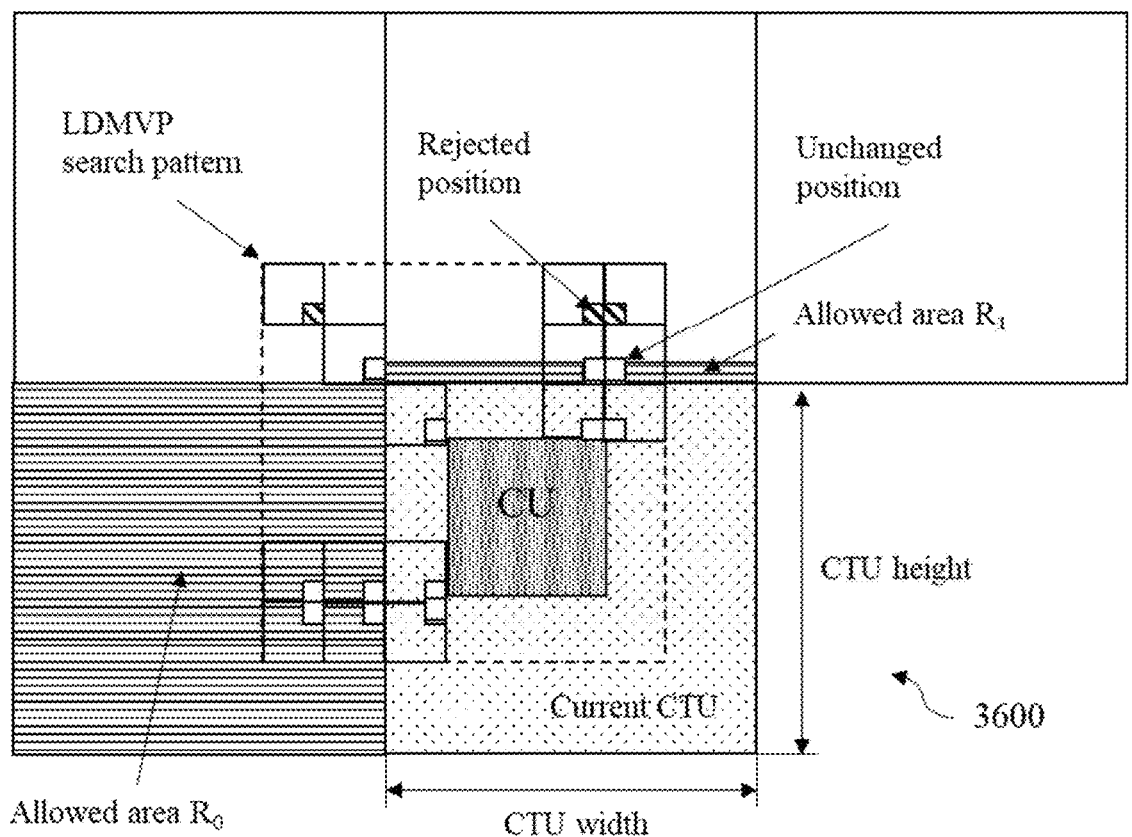
FIG. 36 is a first example to illustrate the application of the additionalChecks procedure on the "diagonal" pattern.

This may be seen in FIG. 36 by the marked white squares of pattern positions, which are located inside the current CTU (coarse dotted square). For these points, motion information is available. The pattern positions remain unchanged (white squares).

According to an embodiment, the selecting of the subset of MV positions is performed by excluding from the pattern positions those MV positions which are not available and/or are not stored in a buffer.

This means that positions may lie outside of a current video frame, i.e. the position is larger than the size of the current frame. Thus, information for that point does not exist. Motion information may also not be available at a position as result of an encoding/decoding order performed for the CUs of the frame. In other words, motion information at the bottom right region of a CTU does not yet exist at a specific time as this region is subject to encoding/decoding at a later time. Thus, even if a position in that region is generated (i.e. is part of the pattern), motion information is not present at that point at that time. Moreover, motion information may also not be stored in a memory (i.e. the buffer) as that the respective information may be accessed. Such a buffer may, for example, be a line buffer which has fast read-write access times and is commonly used to store motion information of restricted regions of CTUs neighboring the current CTU for which the motion prediction is performed.

A line buffer is a buffer for storing data from CTUs. In VVC, CTUs are decoded in a raster order (inside one tile/brick). For some tools, for example, for merge mode data from top CTUs is needed. For this purpose, all the data that may be potentially needed from bottom CTUs during the decoding of a current CTU, is stored in specific buffer. This buffer is called "line buffer". For motion information, including MVs and reference indices, the prediction of the bottom line of motion information is stored in the line buffer. Without the use of LDMVP, in the worst case, the amount of number_of_CTUs_in_a_line*CTU_size/motion_information_storage_grid_size elements should be stored in the line buffer (for the regular merge, that can use neighboring CU from the top CTU).

When the LDMVP pattern is not restricted, much more than just one line of MVs have to be stored. This, however, is not acceptable for the hardware implementation.

Thus, according to the present disclosure, the use of LDMVP pattern for restricting the use of motion information requires storing of a less amount of motion information in the line buffer. Thus, the prediction may be performed more efficiently and fast.

For these cases, some positions of the pattern are excluded, as illustrated in FIG. 36. The coarsely dotted square is the current CTU, which entails a current CU (fine dotted square). The regions R0 and R1 (horizontally line pattern) refer to allowed areas, defining positions of MVs for which motion information is available.

As can be seen in FIG. 36, a few of the pattern positions located outside of the current CTU are discarded. These are those outside-CTU located pattern positions that also lie not in any of the allowed regions R0 and/or R1 (black-white hashed square). This means that discarded positions are rejected entirely from the pattern and not considered further for MVC positions in this embodiment.

As for the other pattern positions, for which motion information is available as they lie within any of the regions R0 or R1, they are retained from the pattern and their positions are not changed (white squares).

Figure 37:
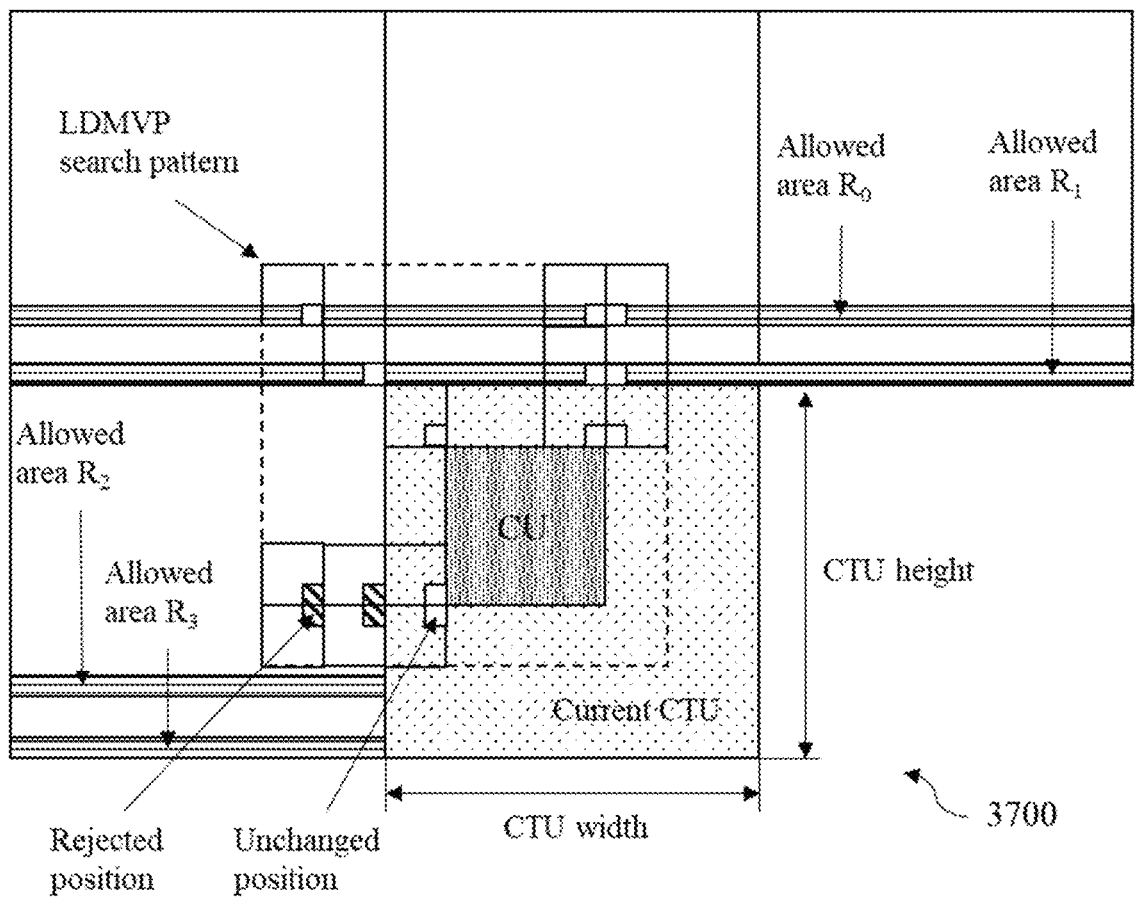
FIG. 37 is a second example illustrating the application of the additionalChecks procedure on the "diagonal" pattern.
Figure 38:
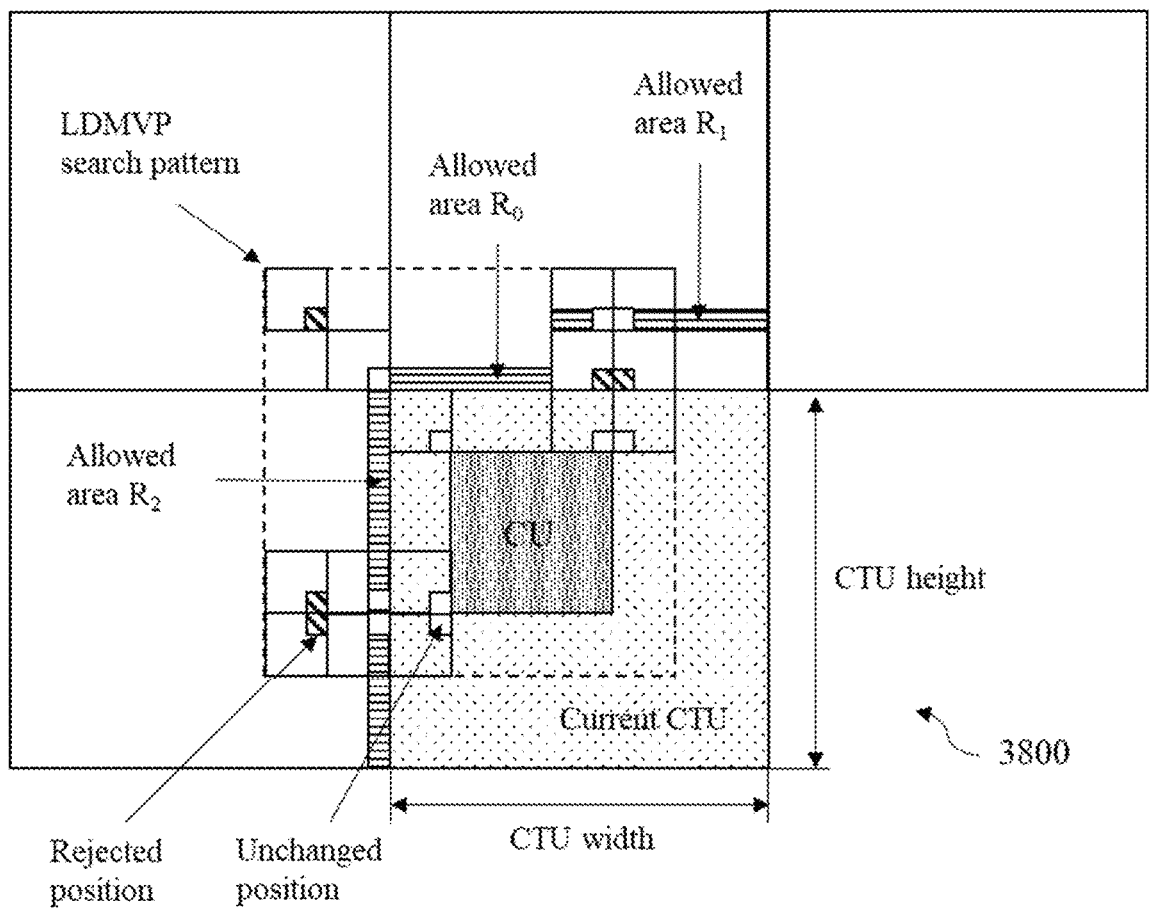
FIG. 38 is a third example illustrating the application of the additionalChecks procedure on the "diagonal" pattern.
Figure 39:
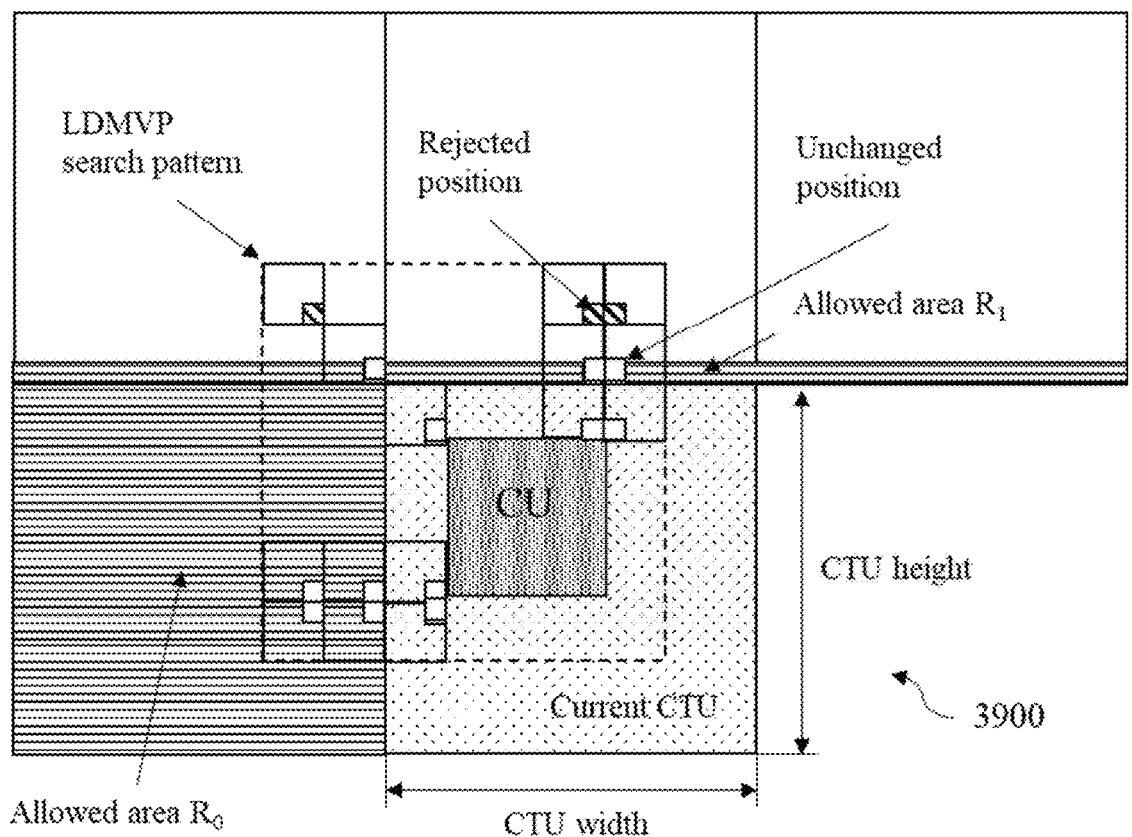
FIG. 39 is a fourth example illustrating the application of the additionalChecks procedure on the "diagonal" pattern.

FIGS. 37 to 39 show examples for the selection of pattern positions as discussed above for the same "diagonal" pattern, but regions of allowed MVs R0, R1, or R3 arranged differently within CTUs neighboring the current CTU. As can be seen from FIG. 36 (which shows Application of additionalChecks on "diagonal" pattern—Result 3600), FIG. 37 (which shows Application of additionalChecks on "diagonal" pattern—Result 3700), FIG. 38 (which shows Application of additionalChecks on "diagonal" pattern—Result 3800), and FIG. 39 (which shows Application of additionalChecks on "diagonal" pattern—Result 3900), in each case the final list of candidate positions as result of the additional checks, is different because the pattern positions relative to the regions R0, R1, or R3 varies with the different arrangement of the regions within the neighboring CTUs. As is clear for a skilled person, the results of the final list will also change with the pattern having different positions, as exemplified by the patterns shown in FIGS. 7 to 10.

Figure 35:
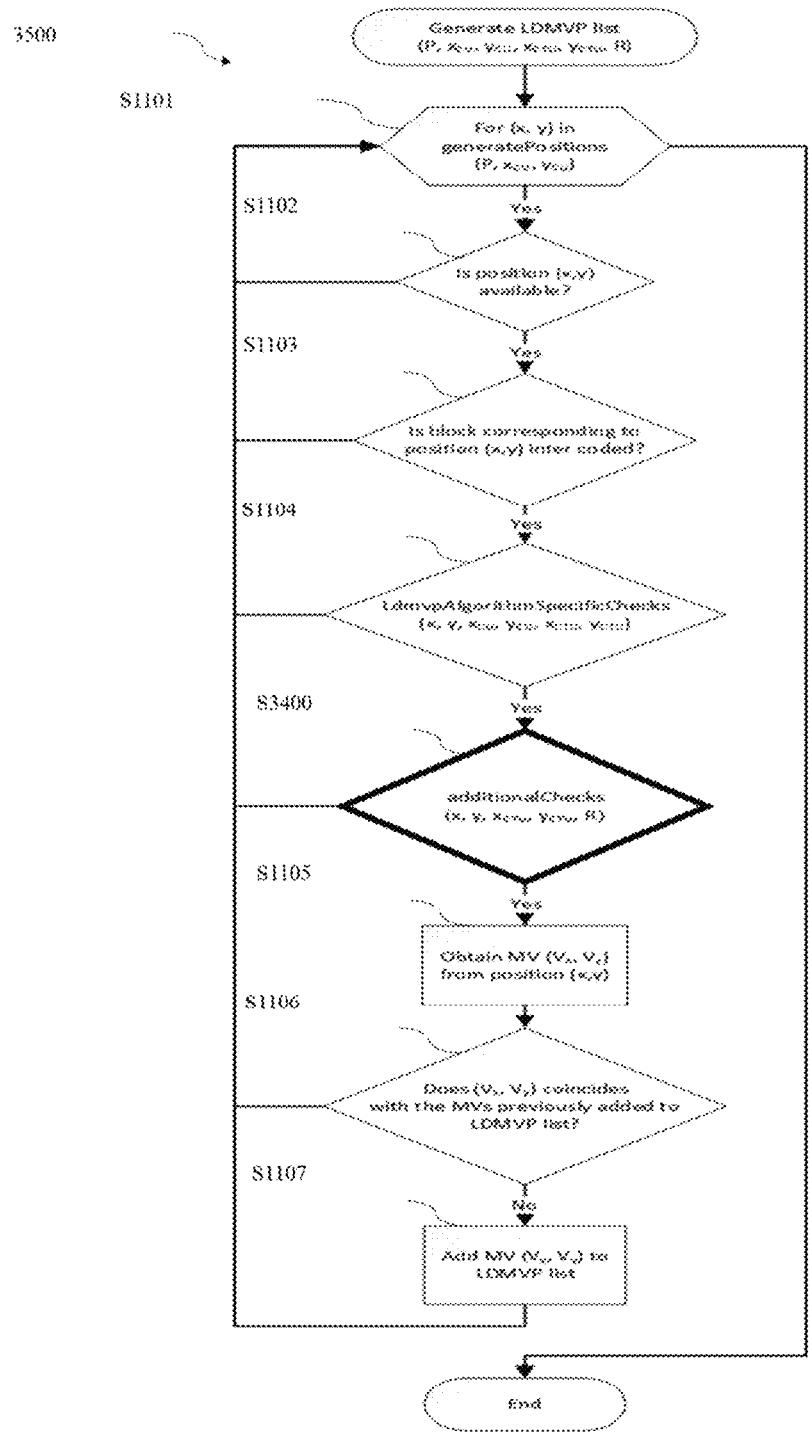
FIG. 35 is a flowchart of the LDMVP list generation algorithm, amended by the procedure additionalChecks.

In an exemplary embodiment of the present disclosure, a procedure additionalChecks(x, y, xCTU, yCTU, R), which performs these checks discussed above, may be added to the LDMVP list generation algorithm, shown by the flowchart of FIG. 35. This routine is added, before the actual motion information is obtained based on the MVC list positions.

The input parameters for this procedure are tested position (x,y), current CTU position (xCTU, yCTU), and a set R of rectangles defining areas in CTU's around the current CTU. Any of these areas correspond to a region defining positions of allowed MVCs, which may be used for the prediction.

Figure 34:
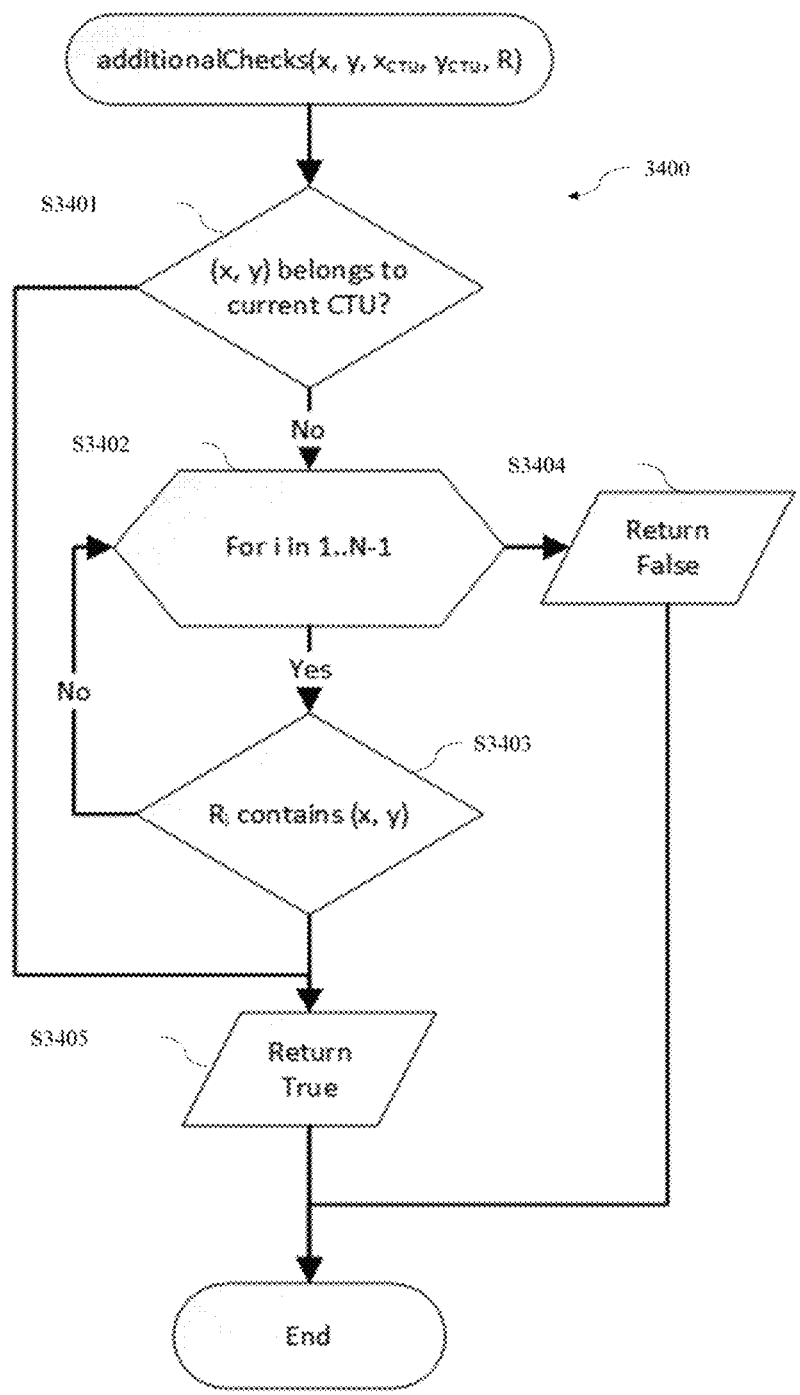
FIG. 34 is a flowchart of the procedure additionalChecks.

FIG. 34 shows the additionalChecks(x, y, xCTU, yCTU, R) procedure 3400 performing a check whether a given position (x,y) belongs to either the current CTU or to one of rectangles Ri, (steps S3401 and S3403). The check S3403 is performed for all the rectangle regions Ri (step S3402). If not, then the position (x,y) is rejected (step S3404). This means that the position is discarded. If yes, the position (x,y) is accepted (step S3405).

The exemplary implementation of the LDMVP list generation algorithm comprising the additional check is depicted by the flowchart in FIG. 35. With respect to the method steps S1101 to 1107 of the LDMVP list generation algorithm, the method steps of the additionalChecks procedure is included as step S3400 into the flowchart of FIG. 35. The set R may be empty, which means that the procedure checks only whether or not the given position belongs to the current CTU.

Figure 8:
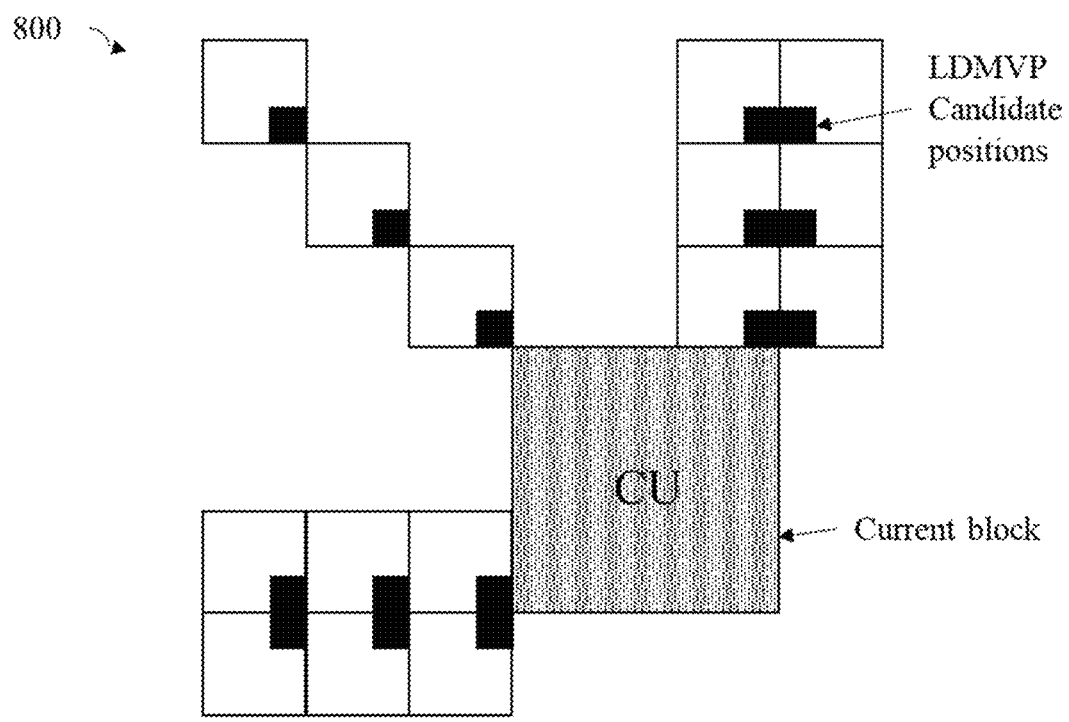
FIG. 8 is an example of a LDMVP pattern referred to as "diagonal" LDMVP pattern.
Figure 9:
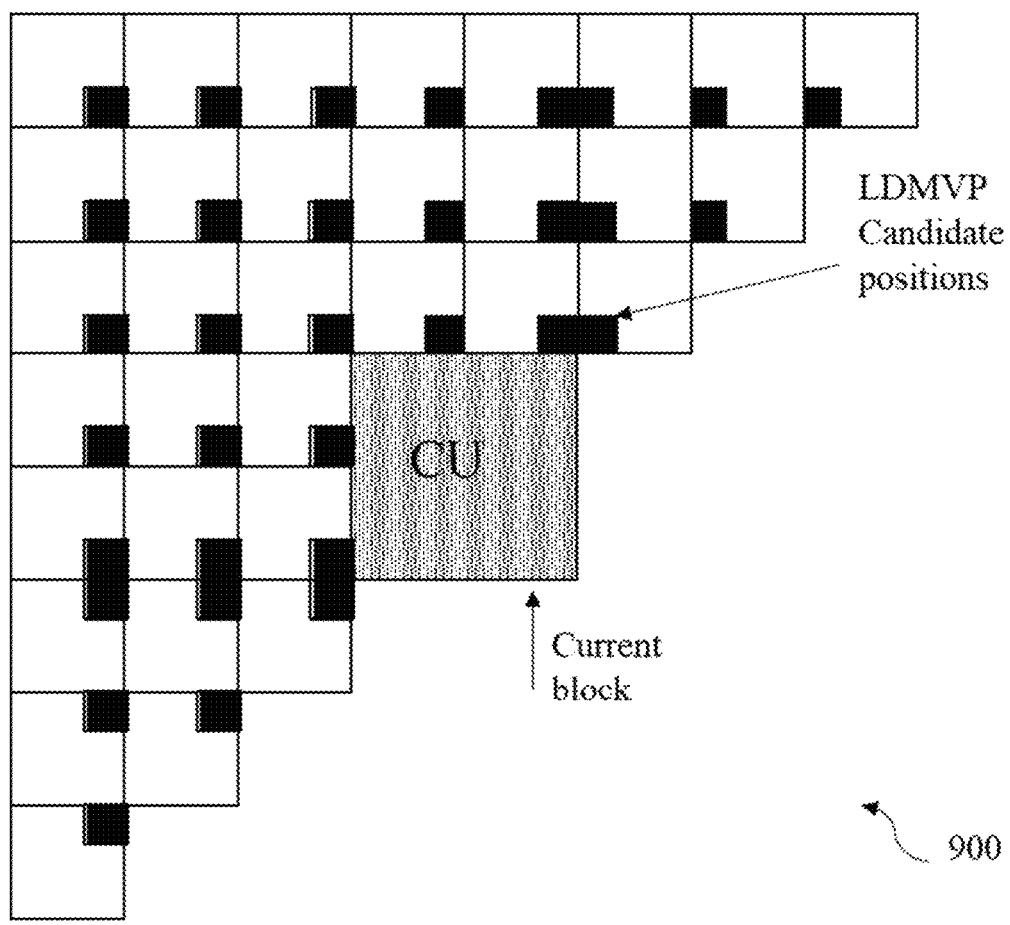
FIG. 9 is an example of a LDMVP pattern referred to as "triangle" LDMVP pattern.
Figure 10:
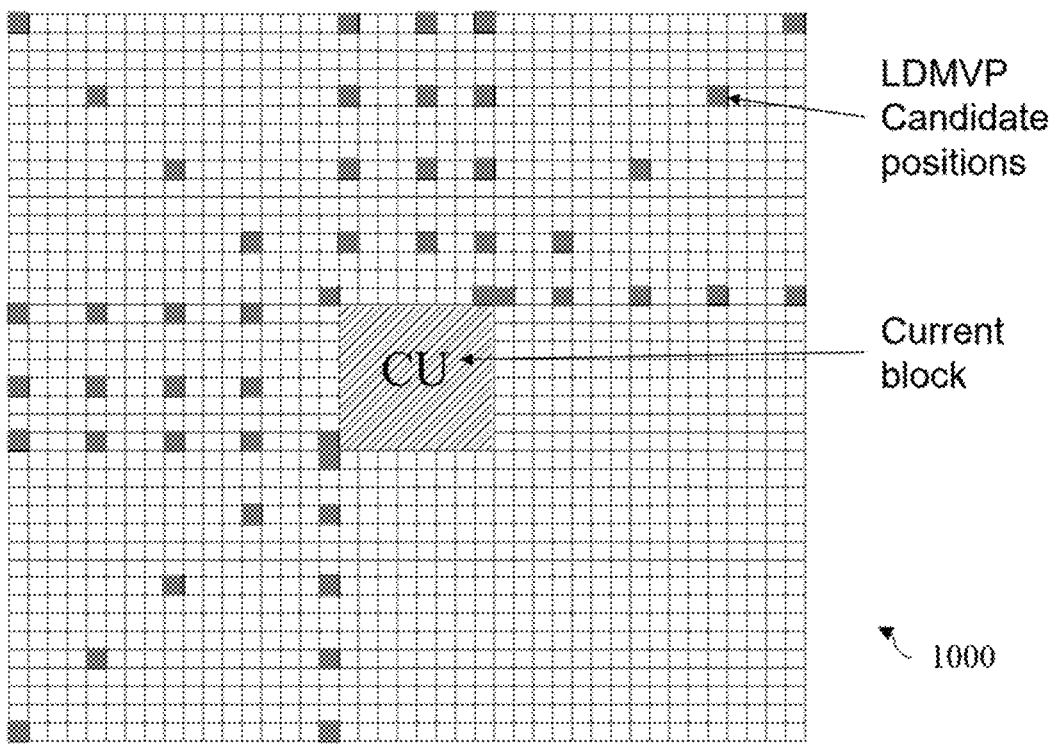
FIG. 10 is an example of a LDMVP pattern referred to as "star" LDMVP pattern.

FIGS. 36 to 39 show some examples illustrating the application of the additionalChecks procedure to the "diagonal" pattern depicted in FIG. 8. Specifically, for the examples of FIGS. 36 to 39, the CU position is (16, 16) pixels relative to the CTU position (xCTU, yCTU). The rectangles Ri in these examples are set as [x0i, y0i, w, h], where (x0i, y0i) is a top left position of the rectangle relative to (xCTU, yCTU), w and h is rectangle's width and height respectively.

Table 1 provides for each of examples 1 to 4 (i.e. FIGS. 36 to 39) the respective settings for the rectangles Ri that matches the rectangle sets {Ri} and the figures, illustrating the application of the additionalChecks procedure to the "diagonal" pattern. The positions that are rejected by the additionalChecks procedure are marked in black-white hashed. The rectangles Ri are marked with a horizontal line pattern.

TABLE 1 additionalChecks procedure applied on examples 1 to 4

| Example Number | Rectangles Set {R_i} | FIG. |
|---|---|---|
| 1 | $R_0$ = [−ctuWidth, 0, ctuWidth, ctuHeight]<br>$R_1$ = [−1, −1, ctuWidth + 1, 1] | FIG. 36 |
| 2 | $R_0$ = [−ctuWidth, −16 − 1, 3 *ctuWidth, 1]<br>$R_1$ = [−ctuWidth, −1, 3 *ctuWidth, 1]<br>$R_2$ = [−ctuWidth, ctu Height − 16 − 1, ctuWidth, 1]<br>$R_3$ = [−ctuWidth, ctuHeight − 1, ctuWidth, 1] | FIG. 37 |
| 3 | $R_0$ = [−1, −1, ctuWidth/2 + 1, 1],<br>$R_1$ = [ctuWidth/2, −16 − 1, ctuWidth − ctuWidth/2, 1]<br>$R_2$ = [−1, 0, 1, ctuHeight] | FIG. 38 |
| 4 | $R_0$ = [−ctuWidth, 0, ctuWidth, ctuHeight]<br>$R_1$ = [−ctuWidth, −1, 3 *ctuWidth, 1] | FIG. 39 |

In many cases, example 4 is advantageous in practice because the CTU left to the current CTU and the bottom line of the CTUs directly to the top of the current CTU are used as allowed regions for motion prediction of the current CU. In other words, as for the bottom line of these CTUs only a restricted number of motion information is utilized for the motion prediction. This makes the motion prediction more efficient and fast as only a limited number of MVs are used. This choice is motivated by the presumption that in particular motion information from the top CTUs neighboring the current CTU contribute mainly to the motion prediction.

In regular merge, only the right column of motion information from the left CTU is used. When selecting regions of neighboring CTUs, an additional criterion to consider may that storing of the left CTU is easier than storing of the top CTU, because additional buffer size does not grow with the width of the frame.

So far, the pattern positions outside the current CU and not being available and/or stored in a buffer (e.g. not inside any of the regions Ri) are discarded. However, the discarded positions may be still exploited for the motion prediction, as discussed next, with reference to FIGS. 40 to 45.

According to an embodiment, the processing circuitry of the apparatus determines the MVCs for the current CU including replacing one or more of the excluded MV positions by substitute MV positions determined in dependency on the excluded MV positions so as to fulfill one or more predetermined conditions.

This means that one or more of the excluded/discarded pattern positions may be subject changes of their coordinate positions such as by replacing or calculating of new positions under the constraints of predetermined conditions.

According to an embodiment, the one or more predefined conditions includes a condition that the substitute MV positions are available and/or are stored in the buffer.

Figure 42:
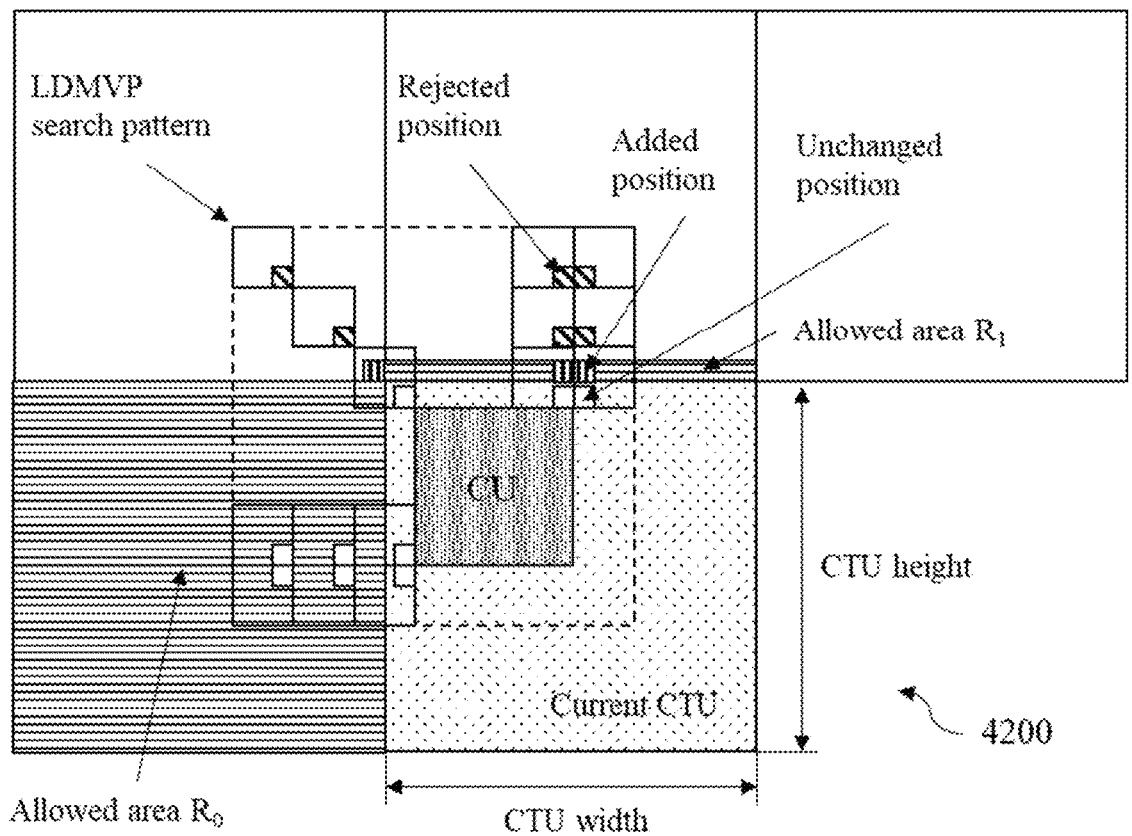
FIG. 42 is a fifth example illustrating the application of the replacePosition procedure on the "diagonal" pattern.

This means that, starting with the excluded pattern positions, their substitute positions are such so as to be available and/or stored in the buffer. This is exemplified in FIG. 42, again for the "diagonal" pattern and using the same labeling of the squared or regions referring to rejected pattern positions and unchanged positions. As can be seen in the example of FIG. 42, in the allowed region R1 there are now two positions added to this region (marked as vertical line pattern). These points would not be part of the region R1 if only the pattern positions were used, as they are not part of the original pattern. In other words, as before the pattern positions not within any of the regions R0 or R1 are still rejected, but they are still used to determine if and where to add one or more new positions such that they are within any of the allowed MV regions.

According to an embodiment, the substitute MV positions are determined to fulfill the condition that a distance between the substitute MV positions and the excluded MV positions is shortest. The term "distance" refers to a measure for the magnitude of a spatial separation between two points along a certain direction. The spatial separation may be in units of the number of pixels along the pixel x and/or pixel y direction, using the pixel as unit for the spatial measure. The distance may be calculated according to a metric, for example, a Euclidean and/or the p-norm with p equal to or larger than one.

For the example of Application of replacePosition on "diagonal" pattern—Result 4200 shown in FIG. 42, applying the shortest distance condition on the discarded pattern positions, then for the second discarded position of the top-left part in the top-left CTU, a new position is added in the bottom-right corner of the top-left CTU, so that the added position lies within region R1. No new position is added for the first discarded position because it has a larger distance to region R1 than the second position. Similar applies to the respective second and first discarded pattern positions within the CTU at the top of the current CTU.

The "distance" condition is one example of a predetermined condition and is not restricted to this condition. For example, the distance condition may be combined with a distance cutoff corresponding to a threshold value, in which case a new position may be added to a region Ri if the distance is equal to or lower than the cutoff value. Other options and or combinations of different conditions may be applicable so as to add one or more new positions to be available and/or stored in the buffer.

Figure 43:
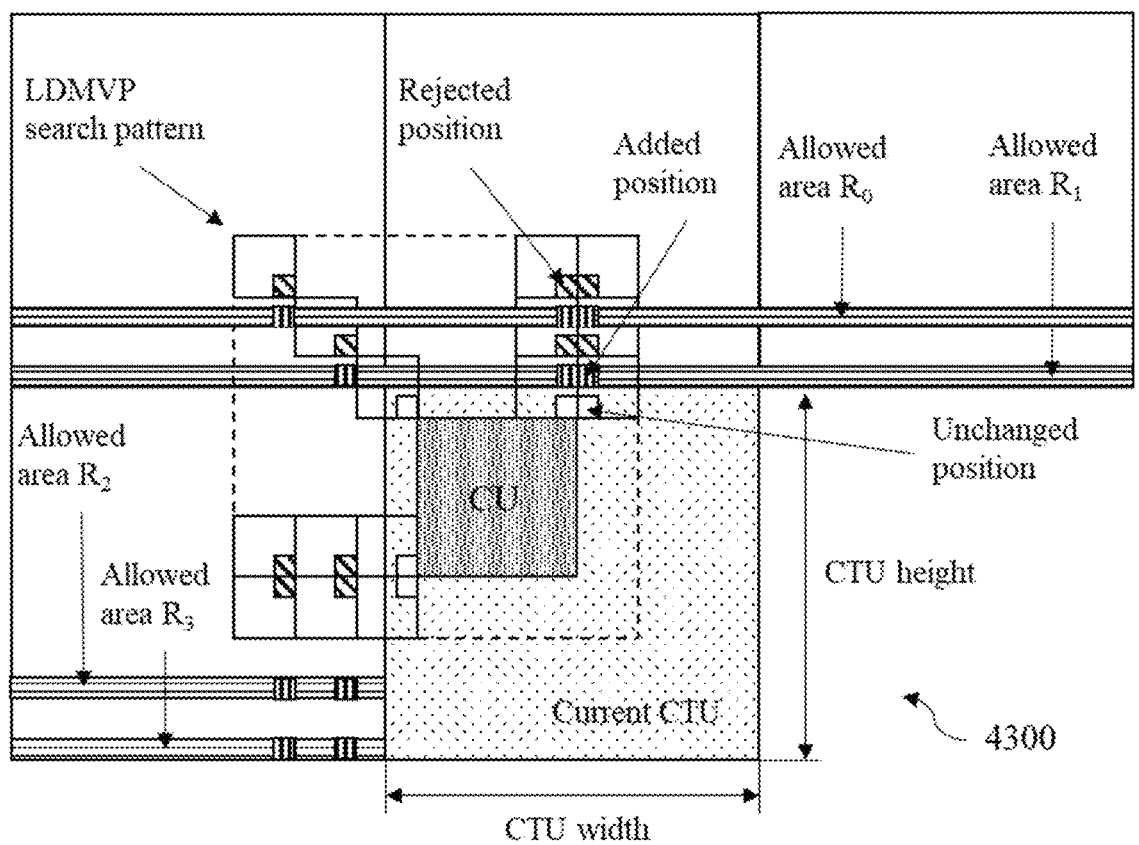
FIG. 43 is a sixth example illustrating the application of the replacePosition procedure on the "diagonal" pattern.
Figure 44:
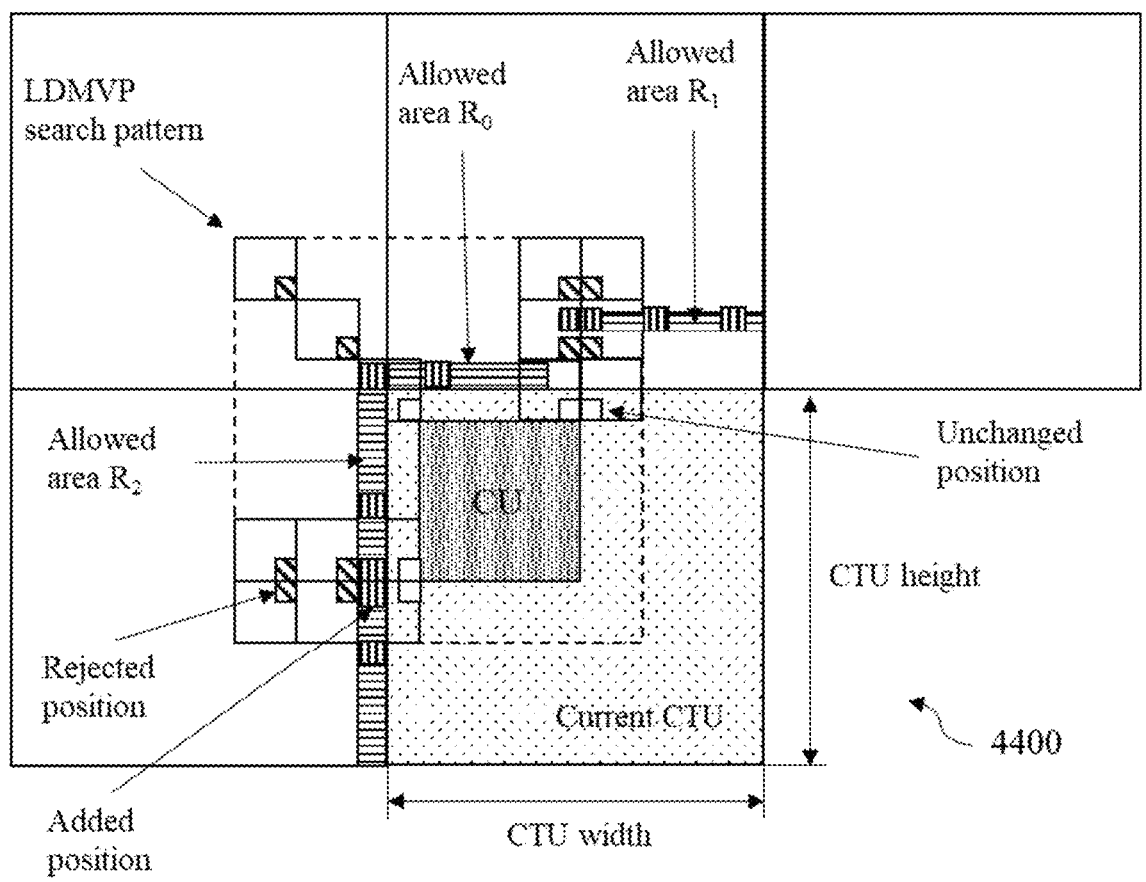
FIG. 44 is a seventh example illustrating the application of the replacePosition procedure on the "diagonal" pattern.
Figure 45:
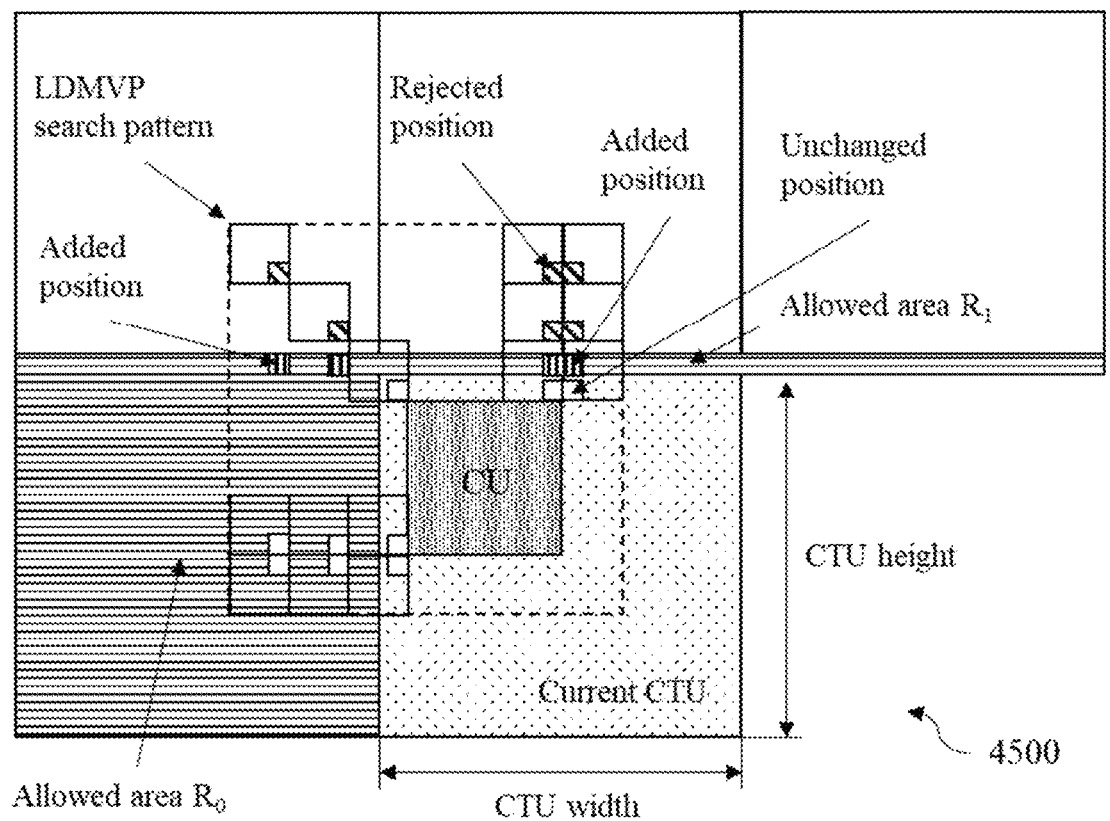
FIG. 45 is an eight example illustrating the application of the replacePosition procedure on the "diagonal" pattern.

FIGS. 43 to 45 show further examples for the addition of new positions by replacing one of the pattern positions according to a predetermined condition, such as the shortest distance of the examples of FIGS. 42 to 45. As can be discerned from FIGS. 43 to 45, the addition of new positions depends on the arrangement of the regions Ri within the CTUs neighboring the current CTU, since this determines besides the pattern itself the relative spatial arrangement of the pattern positions to the regions Ri.

This means that, as a best case scenario, the number of pattern positions may be preserved, since all of the discarded positions of the original pattern are replaced by new positions. This is the case in the example of FIG. 21 which shows combined LDMVP+TMVP pattern 2100 for R=3 and Rt=2, as a result of the particular choice of the regions R0 to R3.

Figure 41:
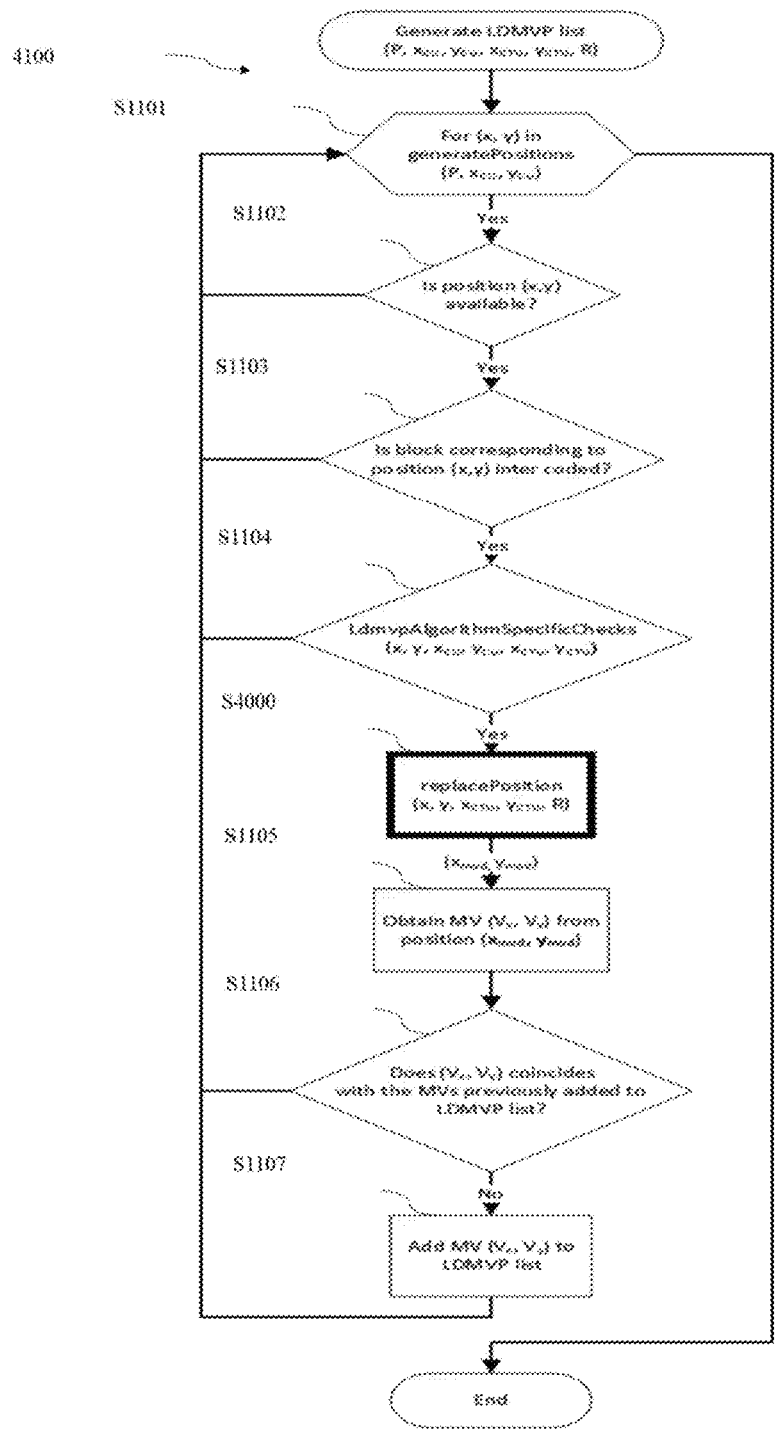
FIG. 41 is a flowchart of the LDMVP list generation algorithm, amended by the procedure replacePosition.

In an exemplary embodiment of the present disclosure, the LDMVP list generation algorithm 4100 comprises a procedure replacePosition(x, y, xCTU, yCTU, R) shown by the flowchart of FIG. 41, which performs replacing one or more pattern positions. With respect to the method steps S1101 to 1107 of the LDMVP list generation algorithm, the method steps of the replacePosition procedure is included as step S4000 into the flowchart of FIG. 41. The input parameters for this procedure are tested position (x,y), current CTU position (xCTU, yCTU), and set R of rectangles defining areas in CTU's around the current CTU, from which allowed MVCs are taken.

Figure 40:
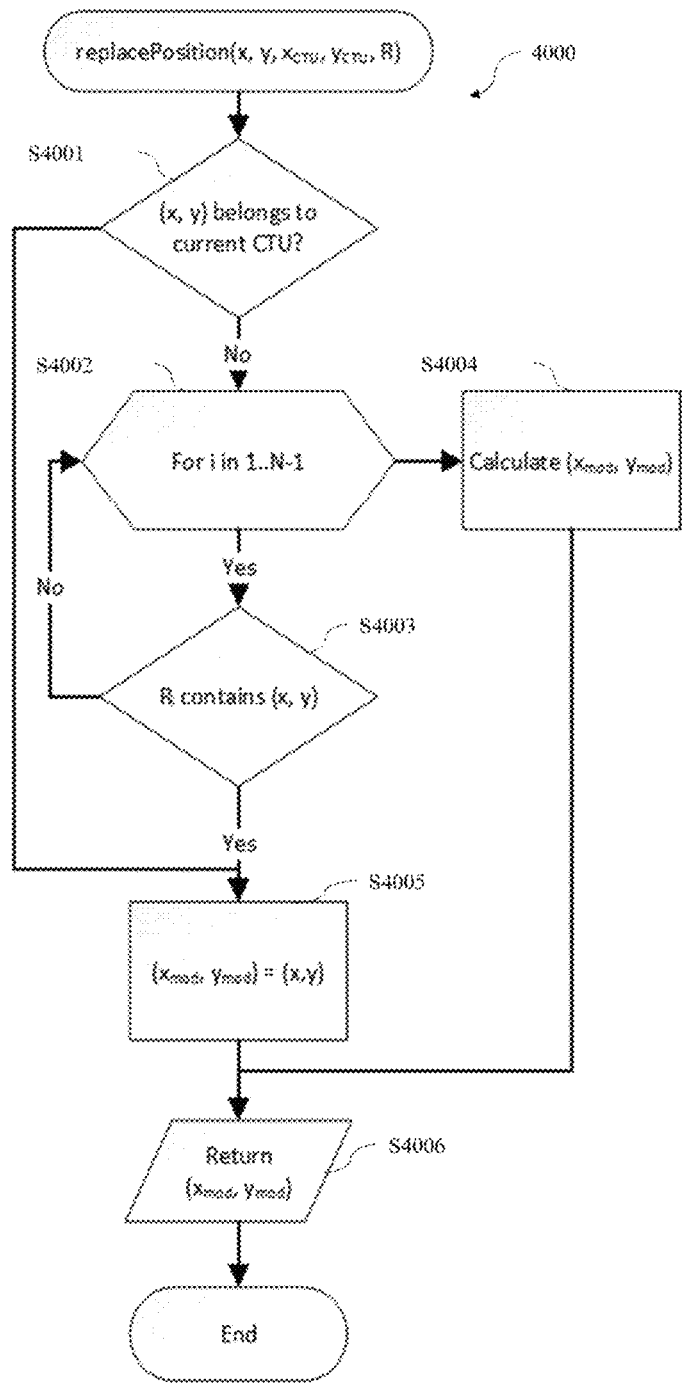
FIG. 40 is a flowchart of the procedure replacePosition.

FIG. 40 shows a flowchart of an exemplary implementation of the procedure replacePosition 4000. The procedure performs a check whether the given position (x,y) belongs to either the current CTU or one of the rectangles Ri (steps S4001 and S4003). The check S4003 is performed for all the rectangle regions Ri (step S4002). If the position (x,y) does not belong to the current CTU or one of the rectangles Ri, then the position (x,y) is modified to a position (x mod, y mod) performed in step 4004, in order to meet the requirements mentioned above, namely the distance between position (x,y) and (x mod,y mod) being shortest. The modified position (x mod, y mod) may be calculated, for example, as being a position nearest to the (x,y) position that belongs to either the current CTU or to one of rectangles Ri. If the position (x,y) belong to the current CTU or to any of the rectangle regions Ri, the modified position (x mod,y mod) is assigned the value of (x,y) in step S4005 with (x mod,y mod)=(x,y). The procedure returns one or more modified positions (x mod,y mod) as output (step S4006).

The term "nearest" refers to a distance between the position (x,y) and the modified position (x mod,y mod). The distance may be calculated using a metric, for example, a Euclidean metric or a p-norm with p being equal to or larger than one. The position (x mod,y mod) may be determined or calculated by any other method fulfilling the requirement mentioned above.

The exemplary implementation of the LDMVP list generation algorithm comprising the replacePosition procedure is depicted by the flowchart in FIG. 41. The set R may be empty, which means that the procedure modifies the input position (x,y) to the position (x mod, y mod) so as to belong to the current CTU. In addition or optionally, the replacePosition procedure may replace two different positions (x0, y0), (x1, y1) to the same position (x mod, y mod). This means that one of the positions (x0, y0) or (x1, y1) is deleted. Thus, in this case the number of MVC positions is reduced by one.

FIG. 42 (which shows Application of replacePosition on "diagonal" pattern—Result 4200), FIG. 43 (which shows Application of replacePosition on "diagonal" pattern—Result 4300), FIG. 44 (which shows Application of replacePosition on "diagonal" pattern—Result 4400), and FIG. 45 (Application of replacePosition on "diagonal" pattern—Result 4500) show some examples illustrating the application of the replacePosition procedure to the "diagonal" pattern depicted in FIG. 8 for the case of the CU position is (8, 8) pixels relative to the CTU position (xCTU, yCTU). The rectangles Ri in these examples are set as [x0i, y0i, w, h], where (x0i, y0i) is a top left position of the rectangle relative to the position (xCTU, yCTU), w and h is rectangle's width and height respectively.

For these exemplary settings, Table 2 provides for each of examples 5 to 8 the respective settings for the rectangles Ri, which matches rectangle sets {Ri} and the figures, illustrating the application of the replacePosition procedure to the "diagonal" pattern. The positions that are removed/rejected by the replacePosition procedure are marked in a black-white hashed pattern, and positions that are added by replacePosition procedure are marked in vertical line pattern. The rectangles Ri are marked with a horizontal line pattern.

TABLE 2 replacePosition procedure applied on examples 5 to 8

| Example Number | Rectangles Set {$R_i$} | Figure |
|---|---|---|
| 5 | $R_0$ = [−ctuWidth, 0, ctuWidth, ctuHeight]<br>$R_1$ = [−1, −1, ctuWidth + 1, 1] | FIG. 42 |
| 6 | $R_0$ = [−ctuWidth, −16 − 1, 3 *ctuWidth, 1],<br>$R_1$ = [−ctuWidth, −1, 3 *ctuWidth, 1],<br>$R_2$ = [−ctuWidth, ctuHeight − 16 − 1, ctuWidth, 1],<br>$R_3$ = [−ctuWidth, ctuHeight − 1, ctuWidth, 1]} | FIG. 43 |
| 7 | $R_0$ = [−1, −1, ctuWidth/2 + 1, 1],<br>$R_1$ = [ctuWidth/2, −16 − 1, ctuWidth − ctuWidth/2, 1],<br>$R_2$ = [−1, 0, 1, ctuHeight]} | FIG. 44 |

TABLE 2-continued replacePosition procedure applied on examples 5 to 8

| Example Number | Rectangles Set {R$_i$} | Figure |
|---|---|---|
| 8 | R$_0$ = [−ctuWidth, 0, ctuWidth, ctuHeight]<br>R$_1$ = [−ctuWidth, −1, 3 *ctuWidth, 1], | FIG. 45 |

While several embodiments have been provided in the present disclosure, it should be understood that the disclosed systems and methods might be embodied in many other specific forms without departing from the spirit or scope of the present disclosure. The present examples are to be considered as illustrative and not restrictive, and the disclosure is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

Summarizing, the present disclosure relates to encoding and decoding of video images. MVs are used as predictors for prediction of an image for a current CU within a current video frame. The MVs are from a list of MVCs, which is generated. The list includes MVs determined from a first and/or second pattern, each pattern specifying MVC positions. The first MV positions are within a current video frame, while the second MV positions are for a video frame different from the current frame. The MVC list is generated for a current CU with the MV positions being relative to a position of the current CU. In particular, the MVC list is generated in dependence on a size of the current CU and a size of a grid specifying a minimum distance between two MV positions. One or more MVs as specified by the MV positions of said pattern are included into the MVC list.

According to an aspect of the present disclosure, an apparatus is provided for generating a list of one or more MVCs, comprising a processing circuitry configured to determine the MVCs for a current CU, in dependence on a position of a pattern relative to a position of the current CU, the pattern defining positions of MVs, and the position of the current CU within a CTU.

The MVCs are used for the motion prediction for the current CU. This means that the motion information of MVs are used at the respective candidate positions for the prediction. Thus, the MV positions are positions of the corresponding vector candidate block. The block may be one pixel/sample and/or a plurality of samples corresponding to a block of samples.

The position of the current CU may be the top-left corner of the current CU, with the positions being in units of pixels or a pixel block unit. The block unit may, for example, be a 2×2 pixel block or any other unit. In VVC, a grid size of 4×4 is more common for motion information storage. Moreover, the sparsity of the motion information storage may be different for the current frame and for the other frames. In VVC, for example, the motion information for a current frame is stored in a 4×4 grid, while an 8×8 grid is used for the other frames. The other frames include, for example, frames from which motion information is used based on TMVP/ATMVP pattern. The position of the current CU, with the CU being within the current CTU, may be a distance of the top-left corner of the current CU to a (pixel/sample) position of the top-left corner of the current CTU. The pattern position relative to the position of the current CU may be predetermined. This means that said relative position may be set to a predefined value.

The determining of MVCs using relative position information between the current CU and a pattern and the current CU position within the CTU may provide an advantage of improving the prediction for a CU of a video frame employing relative position information. In particular, the use of MV positions of a pattern provides an advantageous effect that only a sparse number of position are used from which possible motion information is obtained and/or acquired. Thus, the use of a more limited number of positions as defined by the pattern results in less read-write operations when accessing motion information, for example. Thus, the sparse number of pattern positions makes the prediction more efficient and faster.

Moreover, the pattern may be any pattern suitable for determining motion information based on the MVs at the pattern positions. In other words, the pattern may be adjusted, for example, in terms of its size and/or extension within a video frame relative to the current CU and may be chosen or designed so as to have a particular structure and/or shape. For example, the pattern i.e. the pattern positions may be determined or generated such that the pattern positions have a "square", "diagonal", "triangle", or "star" structure, as shown by the pattern examples of FIGS. 7 to 10. The pattern is not limited to the ones shown in FIGS. 7 to 10, and may have any other shape/structure suitable for restricting motion information obtained at positions based on the pattern. Thus, using a pattern may provide an advantage of making the prediction more flexible so as to use only motion information from positions restricted by the pattern positions. This may include pattern positions that may be added and/or substituted or the like.

According to an aspect of the present disclosure, the processing circuitry of the apparatus is configured to determine the MVCs for the current CU including selecting a subset of MV positions from the pattern positions.

This means that the initial pattern, i.e. the initial positions may be subject to additional checks, upon which certain pattern positions may be retained, discarded, and/or altered. In other words, one or more of the pattern positions may be selected.

The selection of a subset of MV positions may provide an advantage of complexity reduction. This means, in particular, that unnecessary data read/write operations and/or unnecessary access to data from some neighboring blocks is avoided. A further technical advantage may be that, therefore, the storing of additional data is avoided. As a result, the memory requirements may be reduced. Moreover, the subset selection may provide an advantage of a further adaptation of some of the pattern positions, which improves further the accuracy of the prediction.

In one exemplary embodiment of the present disclosure, the selecting includes selecting from the pattern positions those MV positions which are within the current CTU.

This may provide an advantage of avoiding unnecessary data read-write to/from the buffer (e.g. a line buffer) as said information is already available for positions within the current CTU.

In one exemplary embodiment of the present disclosure, the selecting of the subset of MV positions is performed by excluding from the pattern positions those MV positions which are not available and/or are not stored in a buffer.

This means that some pattern positions may lie outside of a current video frame, i.e. the position is larger than the size of the current frame. Thus, information for that point does not exists. This may result also in restricting the size/extension of the pattern when the pattern is generated.

Motion information may also not be available at a position as result of an encoding/decoding order performed for the CUs of the frame. In other words, motion information at the bottom right region of a CTU does not yet exist at a specific time as this region is subject to encoding/decoding at a later time. Thus, even if a position in that region is generated (i.e. is part of the pattern), motion information is not present for that point at that time.

Moreover, motion information may also not be stored in a memory (i.e. the buffer) as that the respective information may be accessed. Such a buffer may, for example, be a line buffer which has fast read-write access times and is commonly used to store motion information of restricted regions of CTUs neighboring the current CTU for which the motion prediction is performed. Line buffers are fast data are read and/or written for the entire buffer line in parallel.

The exclusion of pattern positions not available and/or stored in the buffer may provide an advantage of not using pattern positions and hence not possibly obtaining motion information from those positions for which said motion information does not exists. Thus, excluding those points may reduce further the number of pattern positions to those positions for which motion information is actually available. Thus, the prediction may become faster as less pattern positions may be used for the motion prediction. Moreover, unnecessary read-write access of motion information at those MV positions for which said information is not available may be avoided. This makes the prediction more efficient and faster.

According to an aspect of the present disclosure, the processing circuitry is configured to determine the MVCs for the current CU including replacing one or more of the excluded MV positions by substitute MV positions determined in dependency on the excluded MV positions so as to fulfill one or more predetermined conditions.

This means that one or more of the excluded/discarded pattern positions may be subject to changes of their coordinate positions such as by replacing or calculating new positions under the constraints of predetermined conditions.

The replacement is directed toward the discarded positions and is performed based on the discarded positions, corresponding to those pattern positions for which motion information is not available and/or not stored in the buffer. The discarded positions are also referred to as rejected positions and/or excluded positions, and are alternative terms.

The position replacement of discarded positions may provide an advantage of not reducing the number of positions of possible MVCs compared to the number of positions of the original pattern. In other words, a sufficient number of MV positions may be needed for performing a prediction with high accuracy and quality. This may be achieved by replacing some of the excluded pattern positions by positions for which motion information is available. This may maintain the number of MV positions near the number of pattern positions.

The replacement positions are determined in dependency on the discarded positions such that the replaced positions fulfill some predetermined conditions. In other words, replaced positions are determined using positional information of the discarded positions, combined with one or more constraints. This may provide an advantage that parts of the position information of the original pattern, the shape/structure of which, for example, may have been chosen specific to the content of a video frame, is transferred completely and/or in part onto the replaced positions.

According to one exemplary embodiment of the present disclosure, the one or more predetermined conditions includes a condition that the substitute MV positions are available and/or are stored in the buffer.

According to one exemplary embodiment of the present disclosure, the substitute MV positions are determined to fulfill the condition that a distance between the substitute MV positions and the excluded MV positions is shortest.

The term "distance" refers to a measure for the magnitude of a spatial separation between two points along a certain direction. The spatial separation may be in units of the number of pixels along the pixel x and/or pixel y direction, using the pixel as unit for the spatial measure. The distance may be calculated according to a metric, for example, a Euclidean and/or the p-norm with p equal to or larger than one.

The "distance" condition is one example of a predetermined condition and is not restricted to this condition. For example, the distance condition may be combined with a distance cutoff corresponding to a threshold value. A discarded position may be replaced by a position located such that the distance is equal to or lower than the cutoff value. In other words, the distance may not be minimal. Other options and or combinations of different conditions may be applicable so as replaced positions are available and/or stored in the buffer.

The position replacement may result, in the best-case scenario, in having the same number of positions as the number of discarded positions, providing an advantageous effect that the number of positions is preserved. Moreover, determining the replaced positions with respect to the distance between replaced positions and discarded positions being shortest may prove an advantage that the spatial location of MVC positions are close to the shape/structure of the original pattern. Thus, the shortest distance enables the preservation of the shape/structure of the original pattern. As a result, the prediction may be performed accurately and with high precision.

According to an aspect of the present disclosure, the processing circuitry of the apparatus is further configured to determine the MVCs for the current CU including adjusting the excluded MV positions to adjusted MV positions determined so as to be available and/or stored in the buffer.

This means that the discarded pattern positions are subject to adjustment and thus determine adjusted MV positions such that they are available and/or stored in the buffer. Since in this embodiment all of the discarded positions are subject to adjustment, the number of MVC positions is the same as the number of pattern positions. In other words, the number of MV positions is preserved.

This may provide an advantage that the prediction is performed with a sufficiently larger number of candidate positions, improving the accuracy of the prediction.

In addition or optionally, two different pattern positions may be substituted by only one position. In this case, the number of MVC positions is reduced by one.

According to one exemplary embodiment of the present disclosure, the determining of the adjusted MV positions includes assigning the excluded MV positions to assigned MV positions along a x direction along a width of the current CTU and/or a y direction along a height of the current CTU.

The x and y direction, respectively, x and y positions are in pixel coordinates with the x pixel axis going along the width of the CTU and the y pixel axis going along the CTU height.

Thus, discarded positions may be assigned to a position for which motion information is available with respect to any of its x and/or y position components. In other words, the position assignment may be performed in any direction.

This may provide an advantage of performing the assignment in a very flexible manner, allowing for a fine-tuning of MVC positions. As a result, the prediction accuracy may be improved further due to the spatial fine-tuning of MVC positions.

According to another exemplary embodiment of the present disclosure, the determining includes reassigning x positions or y positions of one or more assigned MV positions having the same x position or the same y position to reassigned y positions or x positions using a predetermined prescription.

The prescription may be a function. This means that, for example, the reassigned positions may be calculated using said function with the assigned position as input.

According to an exemplary embodiment of the present disclosure, the predetermined prescription is shifting the y or x components of the assigned MV positions by a predetermined offset value.

The offset value may be a number of pixels so as to shift the y and/or x position (e.g. in pixel units) by the pixel offset by adding and/or subtracting the offset value to the adjusted y and/or x position value. Alternatively, the predetermined prescription may be a factor by which the y and/or x position may be multiplied and/or divided. Other prescriptions are possible for achieving the reassignment of the assigned positions when their x and/or y position is the same.

Thus, the reassignment of positions performed, for example, by shifting any of the x or y components of assigned positions results in a spread of those assigned positions that may have the same x and/or y position. In other words, some of the discarded positions may be located at the same position after the position assignment. The component-wise reassignment of the assigned positions having the same x or y position is spreading these positions to different locations, which are still available and/or stored in a buffer.

This may provide an advantage that position redundancy is avoided as some candidate positions may be located at the same position and thus would provide the same motion information. Spreading of assigned positions thus increases the number of candidate positions that may have different motion information as they are at different positions. Thus, the prediction is performed more accurately with a sufficiently larger number of MVC positions.

Once the MVC positions are determined using any of the above embodiments of the present disclosure, it is checked whether the MVs for these candidate positions are already included in the MVC list. If not, then the MV is included into the list.

According to an aspect of the present disclosure, an encoder is provided for encoding a current CU, of a video frame comprising an apparatus for generating a list of one or more MVCs according to any of the above aspects of the present disclosure, an inter-PU for determining prediction of the current CU according to at least one MV, out of the MVCs of said list, and a compression unit for encoding the current CU by using the prediction of the CU.

According to an aspect of the present disclosure, a decoder for decoding a current CU, of a video frame comprising an apparatus for generating a list of one or more MVCs according to any of the above aspects of the present disclosure, an inter-PU for determining prediction of the current CU according to at least one MV, out of the MVCs of said list, and a decompression unit for decoding the current CU by using the prediction of the CU.

The MVCs may be used for motion prediction utilizing motion information from the MVs obtained at the MVC positions. The current CU may be encoded and/or decoded by calculating a difference between the CU and the prediction. Alternatively or in addition, an index to the list of MVCs may be encoded, e.g. even if there is no residual since the prediction is already close to the CU, i.e. the residual is nearly zero. In principle, the index to the list may be also determined implicitly at the encoder and the decoder side.

According to an aspect of the present disclosure, a method is provided for generating a list of one or more MVCs, comprising the steps of determining the MVCs for a current CU, in dependence on a position of a pattern relative to a position of the current CU, the pattern defining positions of MVs, and the position of the current CU within a CTU.

According to an aspect of the present disclosure, a computer-readable non-transitory medium is provided for storing a program, including instructions which when executed on a processor cause the processor to perform the method steps.

Definitions of Acronyms and Glossaries

MV Motion vector
MVP Motion vector prediction
LDMVP Long-distance motion vector predictor
TMVP Temporal motion vector prediction
CTU Coding tree unit
LCU Largest coding unit
CU Coding unit

What is claimed is:

1. An apparatus for generating a list of motion vector candidates (MVCs) for a current coding unit (CU), wherein the apparatus comprises:
   a processor; and
   a memory coupled to the processor and configured to store instructions that, when executed by the processor, cause the apparatus to be configured to:
      determine a first pattern specifying a first plurality of MV positions within a current video frame, wherein the first pattern is not available in a buffer or not stored in the buffer, wherein the current video frame comprises the current CU;
      determine at least one first motion vector (MV) based on the first pattern;
      include, into the list, the at least one first MV;
      determine at least one second MV based on a second pattern specifying a second plurality of MV positions in another video frame that is different from the current video frame;
      include, into the list, the at least one second MV;
      determine a subset of MV positions for the first plurality of MV positions, wherein the subset of MV positions is not available in the buffer or not stored in the buffer, and wherein the subset of MV positions comprise discarded MV positions;

assign position information to the subset of MV positions comprising assigning to the subset of MV positions at least one of a plurality of x positions of the first plurality of MV positions or a plurality of y positions of the first plurality of MV positions; and determine adjusted MV positions for the subset of MV positions, wherein the adjusted MV positions comprise a plurality of new x positions or a plurality of new y positions based on the position information and at least one of an x-offset value or a y-offset value.

2. The apparatus of claim 1, wherein the instructions further cause the apparatus to be configured to:
determine at least one third MV based on a third plurality of MV positions adjacent to the current CU within the current video frame, wherein the third plurality of MV positions are different than the first plurality of MV positions; and
include, into the list of MVCs, the at least one third MV.

3. The apparatus of claim 1, wherein the instructions further cause the apparatus to be configured to discard the first plurality of MV positions after assigning the plurality of x positions or the plurality of y positions to the subset of MV positions.

4. The apparatus of claim 3, wherein the instructions further cause the apparatus to be configured to:
assign to one of the subset of MV positions that has a same x position as the first plurality of MV positions the plurality of new x positions using a predetermined prescription; or
assign to one of the subset of MV positions that has a same y position as the first plurality of MV positions the plurality of new y positions using the predetermined prescription.

5. The apparatus of claim 4, wherein the predetermined prescription shifts the plurality of new y positions or the plurality of new x positions by a predetermined offset value.

6. The apparatus of claim 1, wherein the instructions further cause the apparatus to be configured to reflect one of the first plurality of MV positions with reference to a reflection line.

7. The apparatus of claim 1, wherein the instructions further cause the apparatus to be configured to generate a third pattern relative to a position of the current CU based on a first size of the current CU and a second size of a grid specifying a minimum distance between two MV positions belonging to the third pattern, wherein the third pattern specifies positions of a plurality of MVs, and wherein the third pattern is the first pattern or the second pattern.

8. The apparatus of claim 7, wherein the instructions further cause the apparatus to be configured to determine the second pattern or the first pattern based on at least one of an iteration value specifying a third size of the second pattern on the grid or a fourth size of the first pattern on the grid, a minimal size configurable for a CU, or a maximal size configurable for the CU.

9. An apparatus for generating a list of motion vector candidates (MVCs) for a current coding unit (CU), wherein the apparatus comprises:
a processor; and
a memory coupled to the processor and configured to store instructions that, when executed by the processor, cause the apparatus to be configured to:

determine a pattern that is not available in a buffer or not stored in the buffer, wherein the pattern specifies a first plurality of motion vector (MV) positions relative to a position of the current CU based on a first size of the current CU and a second size of a grid specifying a minimum distance between two of the first plurality of MV positions belonging to the pattern, wherein the pattern is at least one of not available in a buffer or not stored in the buffer;

include, into the list, at least one MV based on the first plurality of MV positions of the pattern;

determine a subset of MV positions for the first plurality of MV positions wherein the subset of MV positions is not available in the buffer or not stored in the buffer, and wherein the subset of MV positions comprise discarded MV positions;

assign position information to the subset of MV positions comprising assigning to the subset of MV positions at least one of a plurality of x positions of the first plurality of MV positions or a plurality of y positions of the first plurality of MV positions; and determine adjusted MV positions for the subset of MV positions, wherein the adjusted MV positions comprise a plurality of new x positions or a plurality of new y positions based on the position information and at least one of an x-offset value or a y-offset value.

10. The apparatus of claim 9, wherein the instructions further cause the apparatus to be configured to determine the first plurality of MV positions based on a first iteration value, a minimal size configurable for a CU, or a maximal size configurable for the CU.

11. The apparatus of claim 9, wherein the instructions further cause the apparatus to be configured to adapt the second size based on the first size or a minimum and maximum value of the grid.

12. The apparatus of claim 9, wherein the instructions further cause the apparatus to be configured to:
determine adjacent positions specifying a third plurality of MV positions within a current video frame that are different from the pattern; and
combine the adjacent positions with the pattern.

13. The apparatus of claim 11, wherein the apparatus further comprises an inter-prediction system coupled to the processor and configured to:
predict the current CU according to at least one third MV from the list of MVCs to obtain a prediction; and
a compression system coupled to the processor and configured to encode the current CU using the prediction.

14. The apparatus of claim 1, further comprising:
an inter-prediction system coupled to the processor and configured to predict the current CU according to at least one third MV from the list of MVCs list to obtain a prediction; and
a decompression system coupled to the processor and configured to decode the current CU using the prediction.

15. A method for generating a list of motion vector candidates (MVCs) for a current coding unit (CU), wherein the method comprises:
determining a first pattern specifying a first plurality of MV positions within a current video frame, wherein the first pattern is not available in a buffer or not stored in the buffer, wherein the current video frame comprises the current CU;
determining at least one first motion vector (MV) based on the first pattern;

including, into the list, the at least one first MV;

determining at least one second MV based on a second pattern specifying a second plurality of MV positions in another video frame that is different from the current video frame;

including, into the list, the at least one second MV;

determining a subset of MV positions for the first plurality of MV positions, wherein the subset of MV positions is not available in the buffer or not stored in the buffer, and wherein the subset of MV positions comprise discarded MV positions;

assigning position information to the subset of MV positions comprising assigning to the subset of MV positions at least one of a plurality of x positions of the first plurality of MV positions or a plurality of y positions of the first plurality of MV positions; and determining adjusted MV positions for the subset of MV positions, wherein the adjusted MV positions comprise a plurality of new x positions or a plurality of new y positions based on the position information and at least one of an x-offset value or a y-offset value.

16. The method of claim 15, further comprising:

determining at least one third MV based on a third plurality of MV positions adjacent to the current CU within the current video frame, wherein the third plurality of MV positions are different than the first plurality of MV positions; and including, into the list of MVCs, the at least one third MV.

17. A method for generating a list of motion vector candidates (MVCs) for a current coding unit (CU), wherein the method comprises:

determining a pattern that is not available in a buffer or not stored in the buffer, wherein the pattern specifies a plurality of motion vector (MV) positions relative to a position of the current CU based on a first size of the current CU and a second size of a grid specifying a minimum distance between two of the plurality of MV positions belonging to the pattern, wherein the pattern is at least one of not available in a buffer or not stored in the buffer;

including, into the list, at least one MV based on the plurality of MV positions of the pattern;

determining a subset of MV positions for the plurality of MV positions, wherein the subset of MV positions is not available in the buffer or not stored in the buffer, and wherein the subset of MV positions comprise discarded MV positions;

assigning position information to the subset of MV positions comprising assigning to the subset of MV positions at least one of a plurality of x positions of the plurality of MV positions or a plurality of y positions of the plurality of MV positions; and determining adjusted MV positions for the subset of MV positions, wherein the adjusted MV positions comprise a plurality of new x positions or a plurality of new y positions based on the position information and at least one of an x-offset value or a y-offset value.

18. The method of claim 17, further comprising determining the first plurality of MV positions based on a first iteration value, a minimal size configurable for a CU, or a maximal size configurable for the CU.

19. The apparatus of claim 1, wherein the adjusted MV positions comprise a plurality of new x positions or a plurality of new y positions based on the position information and at least one of an x-offset value or a y-offset value.

20. The method of claim 15, wherein the adjusted MV positions comprise a plurality of new x positions or a plurality of new y positions based on the position information and at least one of an x-offset value or a y-offset value.

* * * * *